United States Patent
Braedt

(10) Patent No.: US 11,230,350 B2
(45) Date of Patent: Jan. 25, 2022

(54) DERAILLEUR HANGER

(71) Applicant: SRAM DEUTSCHLAND GmbH, Schweinfurt (DE)

(72) Inventor: Henrik Braedt, Hambach (DE)

(73) Assignee: SRAM Deutschland GmbH, Schweinfurt (DE)

( * ) Notice: Subject to any disclaimer, the term of this patent is extended or adjusted under 35 U.S.C. 154(b) by 322 days.

(21) Appl. No.: 16/389,361

(22) Filed: Apr. 19, 2019

(65) Prior Publication Data
US 2019/0322333 A1 Oct. 24, 2019

(30) Foreign Application Priority Data

Apr. 20, 2018 (DE) .................... 10 2018 206 104.1

(51) Int. Cl.
| | |
|---|---|
| *B62M 9/125* | (2010.01) |
| *B62M 9/121* | (2010.01) |
| *B62M 9/1242* | (2010.01) |
| *B62M 9/126* | (2010.01) |
| *B62M 9/127* | (2010.01) |

(52) U.S. Cl.
CPC ............ *B62M 9/125* (2013.01); *B62M 9/121* (2013.01); *B62M 9/126* (2013.01); *B62M 9/127* (2013.01); *B62M 9/1242* (2013.01)

(58) Field of Classification Search
CPC ...... B62M 9/125; B62M 9/121; B62M 9/126; B62M 9/127; B62M 9/124; B62M 9/1242; B62M 9/1244; B62M 9/135; B62M 9/136; B62M 9/137
See application file for complete search history.

(56) References Cited

U.S. PATENT DOCUMENTS

| | | | | |
|---|---|---|---|---|
| 2,108,941 | A * | 2/1938 | Morgan ................. | B62M 9/124 474/80 |
| 3,803,933 | A * | 4/1974 | Huret ................... | B62M 9/1242 474/82 |
| 3,979,962 | A * | 9/1976 | Kebsch ................. | B62M 25/04 474/82 |
| 3,994,167 | A * | 11/1976 | Juy ........................ | B62M 9/126 474/82 |

(Continued)

FOREIGN PATENT DOCUMENTS

| | | |
|---|---|---|
| CN | 108622302 | 10/2018 |
| DE | 2260252 | 6/1973 |

(Continued)

*Primary Examiner* — Michael R Mansen
*Assistant Examiner* — Raveen J Dias

(57) ABSTRACT

A bracket element configured for installation on an axial inner side of an associated bracket portion of a bicycle frame for the purposes of installing a rear gearshift mechanism of a derailleur system on the bicycle frame is provided. The bracket element may include a first portion, which has an opening or aperture assigned to the axle and which, in the installed state, is subjected to a clamping force which acts between the rear bracket portion. The bracket element may also include a second portion having an installation opening which is radially offset in relation to the opening or aperture in the installed state with respect to the axis and to which an attachment end of a base element of the rear gearshift mechanism is fixable.

20 Claims, 32 Drawing Sheets

(56) References Cited

U.S. PATENT DOCUMENTS

| | | | | |
|---|---|---|---|---|
| 4,038,878 A | * | 8/1977 | Dian | B62M 9/1242 474/82 |
| 4,061,048 A | * | 12/1977 | Huret | B62M 9/1242 474/82 |
| 4,306,871 A | * | 12/1981 | Nagano | B62M 9/127 474/82 |
| 4,565,383 A | | 1/1986 | Isaac | |
| 4,573,951 A | * | 3/1986 | Nagano | B62M 9/1242 474/80 |
| 4,789,379 A | * | 12/1988 | Ozaki | B62M 9/1242 474/82 |
| 5,397,273 A | * | 3/1995 | Ando | B62M 9/1248 474/82 |
| 5,957,792 A | * | 9/1999 | Ando | B62M 9/125 474/83 |
| 5,961,409 A | * | 10/1999 | Ando | B62M 9/1244 474/80 |
| 6,287,228 B1 | * | 9/2001 | Ichida | B62M 9/1248 474/80 |
| 8,899,606 B2 | * | 12/2014 | Cocalis | B62K 3/02 280/281.1 |
| 9,227,465 B2 | * | 1/2016 | Nakajima | B60B 35/004 |
| 9,308,961 B2 | * | 4/2016 | McDonald | B62K 25/02 |
| 9,545,971 B2 | * | 1/2017 | Beutner | B62K 19/16 |
| 10,472,019 B2 | * | 11/2019 | Pfeiffer | B62K 3/10 |
| 10,793,222 B1 | * | 10/2020 | Harris | B62M 9/1244 |
| 2003/0171176 A1 | * | 9/2003 | Shahana | B62M 9/125 474/82 |
| 2004/0110586 A1 | * | 6/2004 | Shahana | B62M 9/125 474/80 |
| 2004/0116222 A1 | * | 6/2004 | Shahana | B62M 9/125 474/82 |
| 2004/0254038 A1 | * | 12/2004 | Chamberlain | B62M 9/12 474/144 |
| 2007/0021246 A1 | * | 1/2007 | Shahana | B62M 9/126 474/82 |
| 2007/0021248 A1 | * | 1/2007 | Shahana | B62M 9/16 474/83 |
| 2007/0026985 A1 | * | 2/2007 | Yamaguchi | B62M 9/1242 474/82 |
| 2008/0272253 A1 | * | 11/2008 | Tseng | B62M 9/125 248/200 |
| 2009/0280938 A1 | * | 11/2009 | Yamaguchi | B62M 9/125 474/80 |
| 2010/0137082 A1 | * | 6/2010 | Gratz | B62K 25/02 474/78 |
| 2010/0201097 A1 | * | 8/2010 | Schaffer | B62M 9/125 280/283 |
| 2013/0241175 A1 | | 9/2013 | Talavasek et al. | |
| 2016/0039494 A1 | * | 2/2016 | Mikesell | B62K 3/02 280/261 |
| 2017/0113759 A1 | * | 4/2017 | Watarai | B62M 9/122 |
| 2018/0265169 A1 | | 9/2018 | Braedt | |
| 2020/0062343 A1 | * | 2/2020 | Braedt | B62M 9/124 |
| 2020/0198728 A1 | * | 6/2020 | Braedt | B62K 25/02 |
| 2020/0298933 A1 | * | 9/2020 | Braedt | B62K 25/02 |
| 2020/0339220 A1 | * | 10/2020 | Boehm | B62M 9/125 |

FOREIGN PATENT DOCUMENTS

| | | |
|---|---|---|
| DE | 202009000904 | 6/2010 |
| DE | 102014105376 | 10/2014 |
| DE | 102018001253 | 9/2018 |
| EP | 0875444 | 11/1998 |
| EP | 1342658 | 9/2003 |
| EP | 1764297 | 3/2007 |
| EP | 2557029 | 2/2013 |
| EP | 2716534 | 4/2014 |
| EP | 3095684 | 11/2016 |
| EP | 3187402 | 7/2017 |
| EP | 3388324 | 10/2018 |
| FR | 2164106 | 7/1973 |
| TW | 201834921 | 10/2018 |

* cited by examiner

Stand der Technik

--PRIOR ART--

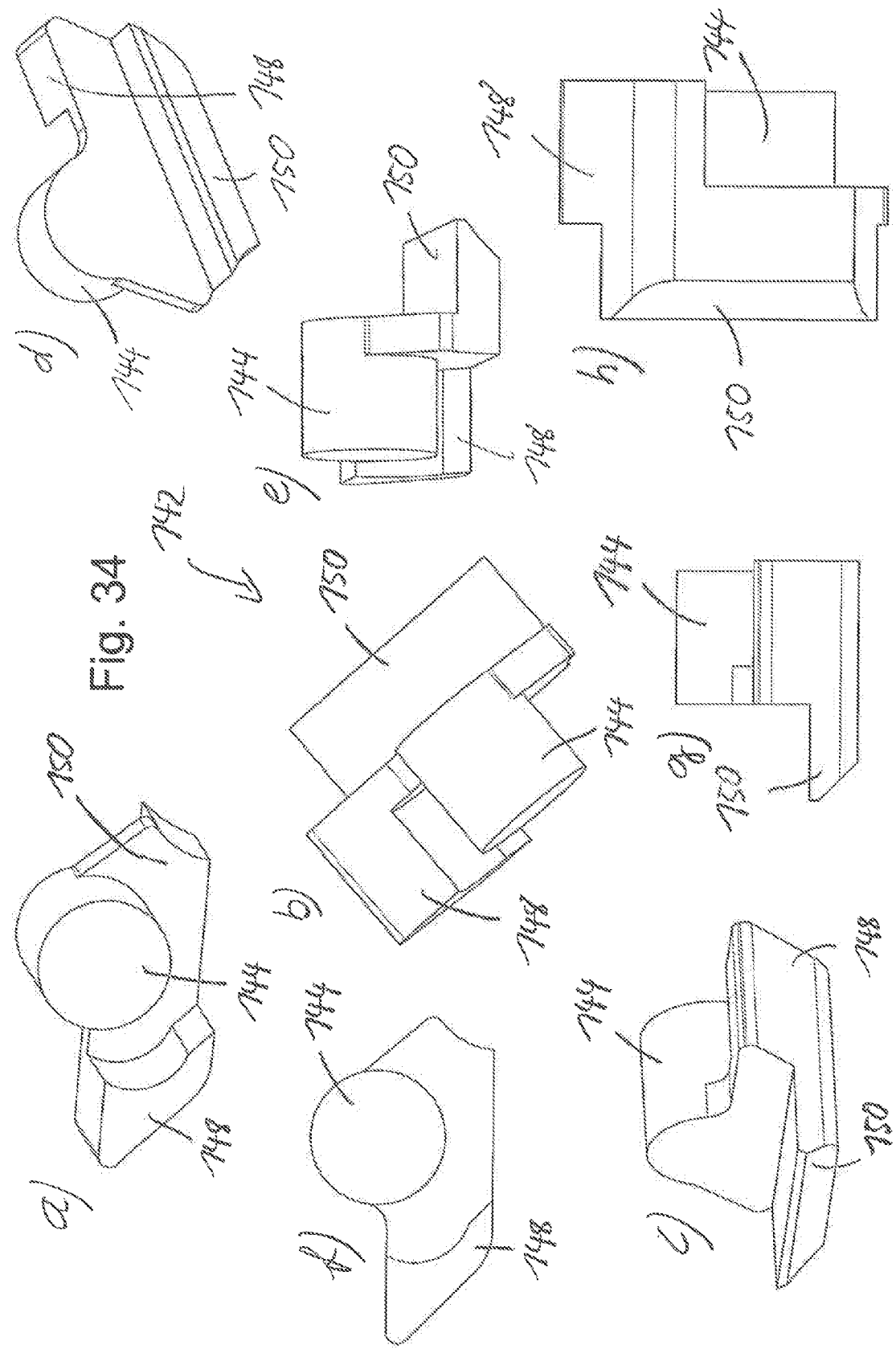

DERAILLEUR HANGER

This application claims priority to, and/or the benefit of, German patent application DE 10 2018 206 104.1, filed on Apr. 20, 2018, the disclosure of which is included by reference herein in its entirety.

FIELD OF THE INVENTION

The present invention relates generally to a rear gearshift mechanism of a bicycle derailleur system, and to the manner of installation of the rear gearshift mechanism in relation to a rear-wheel axle on a bicycle frame.

BACKGROUND

Rear gearshift mechanisms are commonly fastened to the right-hand dropout of the frame by means of a derailleur hanger. The derailleur hanger is generally a bracket element which is separate in relation to the bicycle frame (cf. for example DE 20 2009 000 904 U1, EP 3 095 684 B1, EP 3 187 402 B1 and US 2013/0241175 A1) and which is installed on the right-hand dropout and has an installation opening, radially offset in relation to the rear-wheel axle, for the attachment of the base element of the gearshift mechanism. Even if the expression "derailleur hanger" related originally to the installation opening itself, in the technical terminology the bracket element that has the installation opening is referred to as "derailleur hanger". In the English technical terminology, the expression "hanger" is common for the bracket element. Also known are bicycle frames with a derailleur hanger which is integrated into, in particular in one piece with, the right-hand dropout (cf. for example U.S. Pat. No. 4,565,383 and DE-A 2 260 252), which are however of lesser interest in the context of the present invention.

For the installation of the rear gearshift mechanism, the derailleur hanger, which is separate in relation to the bicycle frame, is generally fixed at one end thereof to the frame coaxially with respect to the rear-wheel axle, and connected at the other end thereof to the base element (also referred to as "B knuckle") of the gearshift mechanism. The base element is rotatable relative to the derailleur hanger about an axis of rotation (B axis) in order to be able to rotationally set the gearshift mechanism, and thus a sprocket assembly of a rear wheel, into a relative setpoint position in relation to the rear axle. It is thus possible for a chain guide arrangement which is mounted on a movable element (also referred to as "P knuckle") so as to be rotatable about an axis of rotation (P axis) to be brought into the correct initial position. The movable element is connected to the base element by means of a motion mechanism, in particular pivot mechanism.

Derailleur hangers differ greatly from one another depending on manufacturer and type of attachment. They may—as already mentioned—be formed in one piece with the frame or—as is of particular interest here—be provided as a separate component. Separate derailleur hangers are generally clamped to the frame either by means of quick-release axles or by means of plug-in axles. Clamping is possible both on the frame outer side and on the frame inner side. This has the result that, depending on the derailleur hanger used, the gearshift mechanism assumes a different position relative to the rear-wheel axle and also relative to the sprocket assembly. These differences in position in an axial and in a radial direction complicate the design of the gearshift mechanism and the installation thereof. The gearshift mechanism must be newly set in a manner dependent on the derailleur hanger. The additional component adds tolerances which have an adverse effect on the positioning accuracy of the gearshift mechanism.

Furthermore, derailleur hangers, specifically as separate components, are susceptible to damage and are often unstable. In the case of large sprocket assemblies and correspondingly large gearshift mechanism dimensions, increased lever forces arise, which can be only unsatisfactorily accommodated by an exchangeable derailleur hanger. Furthermore, the enlarged gearshift mechanism dimensions with the lengthened lever ratios additionally have an adverse effect on the positioning accuracy of the gearshift mechanism. Conflicting with this is the fact that, specifically, an increased number of sprockets arranged closely adjacent to one another demands increased positioning accuracy.

The rear wheel comprises, inter alia, a rear-wheel hub with a hollow hub axle (also referred to as hollow axle). For the fastening of the rear wheel to the frame, a separate plug-in axle or quick-release axle is led through the hub axle of the rear-wheel hub and is clamped to the frame.

Gearshift mechanisms for coaxial installation on the rear-wheel axle are also known which make do without a derailleur hanger. For example, EP 0 875 444 A1, EP 1 342 658 A1 and EP 1 764 297 A1 describe gearshift mechanisms of said type, in which the separate derailleur hanger is omitted. The axis of rotation of the base element runs along the rear-wheel axle, that is to say is coaxial with respect thereto.

Normally, the known gearshift mechanisms for coaxial installation on the rear-wheel axle comprise a base element with a fastening end which has an opening for receiving an axle. The fastening end is, similarly to a derailleur hanger, fastened to the frame either on the outside or on the inside. For this purpose, said fastening end is clamped to the frame in non-positively locking fashion by means of a plug-in axle or quick-release axle. These known coaxial designs however have deficiencies.

Firstly of note is the lack of stability of the arrangement. Modern sprocket assemblies comprise an ever increasing number of eleven or more sprockets. To be able to operate these with the gearshift mechanism installed coaxially with respect to the rear-wheel axle, the gearshift mechanism dimension is increased. In association with this, the lever forces acting on the gearshift mechanism also increase, such that the gearshift mechanism has a tendency to tilt relative to the planes of rotation of the sprockets. Only a gearshift mechanism positioned exactly vertically below the sprocket assembly permits precise shifting.

Secondly, the dependency on frame tolerances is a problem. Since conventional gearshift mechanisms for installation coaxially with respect to the rear-wheel axle are fastened directly to the frame and are referenced in relation thereto, manufacturing tolerances of the frame also have a direct effect on the gearshift mechanism. The positioning accuracy and settability of the gearshift mechanism suffer as a result.

With regard to these and other disadvantages of the prior art, the applicant SRAM Deutschland GmbH has developed a new type of rear gearshift mechanism for coaxial installation on a rear-wheel axle, to which pending patent applications are directed, specifically the German patent application with file reference 10 2018 001 253.1 filed on 16 Feb. 2018, which claims the inner priority of the German patent application with file reference 10 2017 002 629.7 filed on 20 Mar. 2017, and the European patent application with file reference 18 000 255.2, which was filed on 14 Mar. 2018 and which claims the priorities of said two German patent applications. Furthermore, corresponding applications have been filed in Taiwan (TW, file reference 107 107 712, filing date 7 Mar. 2018), in China (CN, file reference 2018 1021 7966.9, filing date 16 Mar. 2018) and in the USA (US, file reference Ser. No. 15/926,194, filing date 20 Mar. 2018). The disclosure of these applications is, by reference, incorporated in its entirety into the disclosure of the present patent application.

SUMMARY AND DESCRIPTION

In an embodiment, a bracket element is provided. The bracket element is configured for installation on an axial inner side of an associated bracket portion of a bicycle frame for the purposes of installing a rear gearshift mechanism of a derailleur system on the bicycle frame. The bracket element includes a first portion, which has an opening or aperture assigned to the axle and which, in the installed state, is subjected to a clamping force which acts between the rear bracket portions. The bracket element also includes a second portion having an installation opening which is radially offset in relation to the opening or aperture in the installed state with respect to the axis and to which an attachment end of a base element of the rear gearshift mechanism is fixable. An abutment surface of the second portion, which abutment surface surrounds the installation opening and is provided for forming a support surface for the attachment end of the installed base element, is offset in relation to an abutment surface of the first portion, which abutment surface surrounds the opening or aperture and is on the same side of the bracket element, said offset being in the direction of the other side of the bracket element.

BRIEF DESCRIPTION OF THE DRAWINGS

The present invention is explained in greater detail below with reference to the appended drawings, in which:

FIGS. 1 to 12 and 14 to 26 relate to a bicycle derailleur system having a rear gearshift mechanism of a new (second) type, and FIG. 13 relates to a derailleur system of the prior art, having a rear gearshift mechanism of a conventional (first) type. In these figures:

FIG. 1 shows a perspective outside view of a rear gearshift mechanism of the new (second) type in a state installed on a bicycle frame;

FIG. 2 is a sectional illustration of the rear gearshift mechanism of FIG. 1 along the axis A without the hub arrangement shown in FIG. 1;

FIG. 3 shows a side view of the rear gearshift mechanism of the new (second) type;

FIG. 4 shows a perspective inside view of a base element, installed on the frame, of the rear gearshift mechanism of the new (second) type;

FIG. 5 shows a perspective partial section of the base element from FIG. 4 with an associated adapter installed in a frame opening;

FIG. 6 shows an enlarged view of the base element of FIG. 5 without elements of the hub arrangement shown in FIG. 4;

FIG. 7 is a fully sectional illustration of the arrangement from FIG. 6;

FIG. 8 is an exploded illustration of the base element with the adapter of FIGS. 5 to 7;

FIG. 10 shows a partial section through a first design variant (second embodiment) of the rear gearshift mechanism of the new (second) type in a state installed on the bicycle frame, which rear gearshift mechanism is distinguished by a setting aid;

FIG. 11 shows an inside view of a second design variant (third embodiment) of the rear gearshift mechanism of the new (second) type in a state installed on the bicycle frame, specifically in an inner abutment position;

FIG. 12 shows a rear view of the second design variant in an outer abutment position;

FIG. 14 is a sectional illustration of a third design variant (fourth embodiment) of the rear gearshift mechanism of the new (second) type in a state installed on the bicycle frame;

FIG. 16 shows an enlarged view of a detail from FIG. 15*b*;

FIG. 17 shows a view of selected parts from FIG. 16;

FIG. 18 shows a further view of selected parts from FIG. 16;

FIG. 19 is an enlarged exploded illustration of the adapter of the fourth design variant;

FIG. 21 is a sectional illustration of the entire rear-wheel axle arrangement with plug-in axle according to the fourth design variant (fifth embodiment);

FIG. 22 is a sectional illustration of selected parts of the rear-wheel axle arrangement from FIG. 21;

FIG. 23 is a sectional illustration of selected parts from FIG. 22;

FIG. 26 shows an exemplary embodiment for the rear right-hand dropout of a bicycle frame provided for the installation of a rear gearshift mechanism of the new (second) type.

FIGS. 27 to 34 relate to a bracket element or derailleur hanger according to the invention for the installation of a rear gearshift mechanism of said type on a bicycle frame, possibly but not imperatively on a bicycle frame actually provided for the installation of a rear gearshift mechanism of the new (second) type. In these figures:

FIG. 27 shows an exploded view of a multi-part derailleur hanger of a first exemplary embodiment with an associated adapter for the purposes of fastening to the frame;

FIG. 28 shows the derailleur hanger of FIG. 27 in the state assembled with the adapter, without the associated dropout of the frame, specifically in a sectional view in FIG. 28a) and in a perspective view in FIG. 28b);

FIG. 29 shows an exploded view of a multi-part derailleur hanger of a second exemplary embodiment with an associated adapter for the purposes of fastening to the frame;

FIG. 30 shows the derailleur hanger of FIG. 29 in the state assembled with the adapter, without the associated dropout of the frame, specifically in a sectional view in FIG. 30a) and in a perspective view in FIG. 30b);

FIG. 31 shows a derailleur hanger similar to the derailleur hanger of FIGS. 27 and 28 in the state installed on the frame, together with the associated adapter and a plug-in axle;

FIG. 32 shows a derailleur hanger similar to the derailleur hanger of FIGS. 27 and 28 in the state installed on the frame, together with the associated adapter and a plug-in axle according to a design variant;

FIG. 33 shows an enlarged detail view of FIG. 32 with an added hub end cap;

FIG. 34 shows, in sub-figures a) to e), various perspective views and, in sub-figures f) to h), various plan views, of various sides of an auxiliary part, optionally associated with a derailleur hanger according to the invention, for adaptation to a frame interface.

DETAILED DESCRIPTION OF THE DRAWINGS

Figure 1:
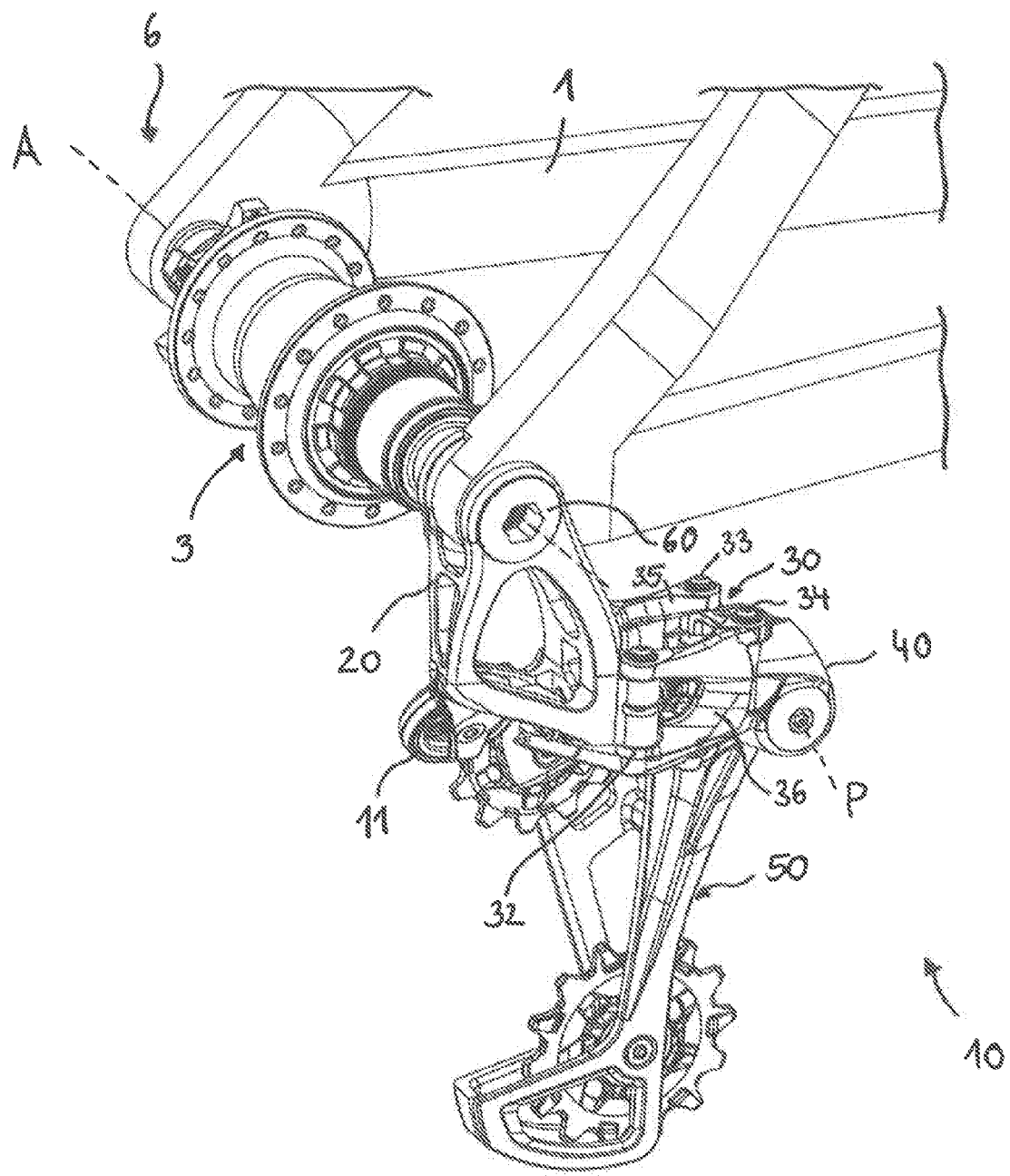

According to one aspect of the invention, the installation of the rear gearshift mechanism on the associated rear, typically right-hand bracket portion (also referred to below, in accordance with the common technical terminology, as "dropout") of the bicycle frame by means of a so-called derailleur hanger, very generally and—according to a further aspect of the invention—as an alternative to coaxial installation of the rear gearshift mechanism in relation to the rear-wheel axle using a rear gearshift mechanism designed specifically for the purpose.

The provision of a bicycle equipped with a derailleur system having such a rear gearshift mechanism of the new type can expediently be performed on the basis of the following and further conventional components: a rear wheel with a stator arrangement, which comprises a rear-wheel axle arrangement, and with a rotor arrangement, which is mounted or mountable so as to be rotatable relative to the stator arrangement and which comprises a rotor hub which bears a sprocket assembly of the derailleur system; and a bicycle frame which has a left-hand rear bracket portion and a right-hand rear bracket portion for an inner axle of the rear-wheel axle arrangement of the rear wheel, which bracket portions have a predetermined defined axial spacing along a geometrical axis of the inner axle installed on the frame by means of the bracket portions, and which bracket portions form in each case one counterbearing for a component group which is arranged on the inner axle and which in the installed state is clamped between the bracket portions and which comprises an assembly of the stator arrangement; and the rear gearshift mechanism of the new type (hereinafter referred to as rear gearshift mechanism of a second type) for coaxial installation in relation to the geometrical axis, comprising: a base element, a motion mechanism designed preferably as a pivot mechanism, a movable element, and a chain guide arrangement, wherein the motion mechanism connects the base element to the movable element, and the chain guide arrangement is connected, so as to be rotatable about an axis of rotation, to the movable element. Said gearshift mechanism of the new (second) type is distinguished by the fact that the base element comprises a first attachment end for coaxial installation on the rear-wheel axle and a second attachment end for coupling to the motion mechanism, wherein the first attachment end has a clamping portion which, in the case of the rear gearshift mechanism of the second type being installed on the bicycle frame, is positioned on the axial inner side of the associated one of the rear bracket portions and which belongs to the component group which in the installed state is clamped between the bracket portions.

Despite the highly advantageous rear gearshift mechanism of the new (second) type, there will also be a demand for bicycles which are equipped with a derailleur system having a conventional rear gearshift mechanism. In this regard, in the context, consideration is given here specifically to derailleur systems whose rear gearshift mechanism is installed on the frame, specifically non-coaxially in relation to the rear-wheel axle, by means of a derailleur hanger which is separate in relation to the bicycle frame, of the type discussed above. The provision of a bicycle equipped with a derailleur system having such a conventional rear gearshift mechanism can expediently be performed (in a manner known per se) on the basis of the following and further conventional components: a rear wheel with a stator arrangement, which comprises a rear-wheel axle arrangement, and with a rotor arrangement, which is mounted or mountable so as to be rotatable relative to the stator arrangement and which comprises a rotor hub which bears a sprocket assembly of the derailleur system; and a bicycle frame which has a left-hand rear bracket portion and a right-hand rear bracket portion for an inner axle of the rear-wheel axle arrangement of the rear wheel, which bracket portions have a predetermined defined axial spacing along a geometrical axis of the inner axle installed on the frame by means of the bracket portions, and which bracket portions form in each case one counterbearing for a component group which is arranged on the inner axle and which in the installed state is clamped between the bracket portions and which comprises an assembly of the stator arrangement; and the rear gearshift mechanism of the conventional type (hereinafter also referred to as rear gearshift mechanism of a first type) for non-coaxial installation in relation to the geometrical axis, comprising: a base element, a motion mechanism designed preferably as a pivot mechanism, a movable element, and a chain guide arrangement, wherein the motion mechanism connects the base element to the movable element, and the chain guide arrangement is connected, so as to be rotatable about an axis of rotation, to the movable element. In the case of the conventional (first) type of the rear gearshift mechanism as discussed here, the base element comprises a first attachment end for installation on the bicycle frame in a manner radially offset with respect to the geometrical axis, and a second attachment end for coupling to the motion mechanism. A bracket element which is separate in relation to the bicycle frame and which can be referred to in the technical terminology as derailleur hanger serves for the installation of the rear gearshift mechanism of the first type on the bicycle frame, wherein, here, consideration is given specifically to a bracket element which is positionable or positioned on an axial inner side of an associated one of the rear bracket portions. In the case of the rear gearshift mechanism of this conventional (first) type being installed on the bicycle frame, a bracket element (derailleur hanger) of said type belongs to the component group which in the installed state is clamped between the bracket portions. An installation opening of the bracket element, by means of which installation opening the first attachment end of the base element is fixable to the bracket element, is then radially offset with respect to the geometrical axis.

According to a first aspect of the present invention, it is now proposed that a bicycle frame which, with regard to the design of the rear bracket portions and specifically the axial spacing thereof along the geometrical axis, is intended for being equipped with the rear gearshift mechanism of the new (second) type, be equipped selectively with the rear gearshift mechanism of the conventional (first) type or with the rear gearshift mechanism of the new (second) type. It is thus the case that the same frame types are equipped both with a derailleur system having a rear gearshift mechanism of the conventional (first) type and with a derailleur system having the rear gearshift mechanism of the new (second) type, and the invention also provides specific solutions as regards how this can be realized in a particularly advantageous manner. The number of different frame types that must be produced and stocked is thus considerably reduced.

This does not involve trivial or obvious technical teaching, simply because a rear gearshift mechanism of the new (second) type with the clamping portion of its expertly dimensioned base element will generally take up more axial space between the rear bracket portions than a conventional bracket element (derailleur hanger), arranged on the inner side of the associated bracket portion, for the installation of the rear gearshift mechanism of the conventional (first) type. Further refinements of the specific embodiments of the rear gearshift mechanism of the new (second) type as described in the discussed pending patent applications also point in the direction of the use of a frame which, at its rear bracket portions, is designed specifically for the installation of the rear gearshift mechanism of the new (second) type and is in fact not intended for the installation of a bracket element (derailleur hanger) which could permit the non-coaxial installation of a rear gearshift mechanism of the conventional (first) type as an alternative.

According to the first aspect of the invention, more specifically, a set of components is proposed which serves for providing a bicycle equipped with a derailleur system, wherein the derailleur system can be implemented selectively with a rear gearshift mechanism of the first type or with a rear gearshift mechanism of the second type, comprising: at least one rear wheel with a stator arrangement, which comprises a rear-wheel axle arrangement, and with a rotor arrangement, which is mounted or mountable so as to be rotatable relative to the stator arrangement and which comprises a rotor hub which bears a sprocket assembly of the derailleur system; at least one bicycle frame which has a left-hand rear bracket portion and a right-hand rear bracket portion for an inner axle of the rear-wheel axle arrangement of the rear wheel, which bracket portions have a predetermined defined axial spacing along a geometrical axis of the inner axle installed on the frame by means of the bracket portions, and which bracket portions form in each case one counterbearing for a component group which is arranged on the inner axle and which in the installed state is clamped between the bracket portions and which comprises an assembly of the stator arrangement;—at least one rear gearshift mechanism of the first type for non-coaxial installation in relation to the geometrical axis, comprising: a base element, a motion mechanism designed preferably as a pivot mechanism, a movable element, and a chain guide arrangement, wherein the motion mechanism connects the base element to the movable element, and the chain guide arrangement is connected, so as to be rotatable about an axis of rotation, to the movable element, and wherein the base element comprises a first attachment end for installation on the bicycle frame in a manner radially offset with respect to the geometrical axis, and a second attachment end for coupling to the motion mechanism; and at least one bracket element which is separate in relation to the bicycle frame and which is positionable on an axial inner side of an associated one of the rear bracket portions and which serves for the installation of the rear gearshift mechanism of the first type on the bicycle frame. In the case of the rear gearshift mechanism of the first type being installed on the bicycle frame, the bracket element belongs to the component group which in the installed state is clamped between the bracket portions, and an installation opening of the bracket element, by means of which the first attachment end of the base element is fixable to the bracket element, is radially offset with respect to the geometrical axis.

According to the invention, this set of components additionally includes: at least one rear gearshift mechanism of the second type for coaxial installation in relation to the geometrical axis, comprising: a base element, a motion mechanism designed preferably as a pivot mechanism, a movable element, and a chain guide arrangement, wherein the motion mechanism connects the base element to the movable element, and the chain guide arrangement is connected, so as to be rotatable about an axis of rotation, to the movable element, and wherein the base element comprises a first attachment end for coaxial installation on the rear-wheel axle and a second attachment end for coupling to the motion mechanism, wherein the first attachment end has a clamping portion which, in the case of the rear gearshift mechanism of the second type being installed on the bicycle frame, is positioned on the axial inner side of the associated one of the rear bracket portions and which belongs to the component group which in the installed state is clamped between the bracket portions.

On the basis of the set of components according to the invention, a bicycle manufacturer or bicycle fitter can build a respective bicycle using the same frame type and selectively using a derailleur system having the first type of rear gearshift mechanism or using a derailleur system having the second type of rear gearshift mechanism, which increases flexibility and yields great cost advantages. The various components of the set according to the invention can be produced, procured and stocked independently of one another without being explicitly related to one another and being identified as components of a set of components according to the invention. A bicycle manufacturer or bicycle fitter has a set of components according to the invention in his or her possession if he or she can readily access the components discussed in the definition of the set of components according to the invention, in particular because said components are in his or her possession without said components necessarily having to be provided at a common location, and if the bicycle manufacturer or bicycle fitter can, with selected ones of these components and using an identical type of bicycle frame, equip a respective bicycle with a derailleur system which has either the rear gearshift mechanism of the first type or the rear gearshift mechanism of the second type. It is not necessary for both types of the rear gearshift mechanism to actually be used, and installed on a respective bicycle frame, at one point in time or in a time period under consideration.

Preferred refinements of the rear gearshift mechanism of the second type and thus of the set of components according to the invention emerge from the pending patent applications discussed above, to the content of which reference is expressly made.

Preferred refinements of the rear gearshift mechanism of the second type and thus of the set of components according to the invention, and preferred refinements of the rear gearshift mechanism of the first type and thus of the set of components according to the invention, and further components preferably belonging to the set, will also emerge from the appended set of claims and from the statements below.

With regard to the rear gearshift mechanism of the second type, it is preferable if the first attachment end has a first arm, which forms the clamping portion, and a second arm, which arms are arranged spaced apart from one another in an axial direction, preferably such that the second arm is positioned on an axial outer side of the frame in the case of the rear gearshift mechanism of the second type being installed on the bicycle frame. By means of the two mutually spaced-apart arms of the base element, it is possible for two axially spaced-apart fastening points to be provided, which in the installed state of the gearshift mechanism ensure a stable orientation of the gearshift mechanism parallel to the plane of rotation of the sprockets and thus perpendicular to the rear-wheel axle. It is also thus possible for tilting of the gearshift mechanism out of said plane to be prevented in an effective manner even in the presence of relatively high forces. The two axially spaced-apart fastening points of the base element, which act directly or indirectly on the rear-wheel axle or on the frame, can accommodate the forces acting on the gearshift mechanism much more effectively than is possible in the case of known gearshift mechanisms with only one fastening end.

The set of components may expediently comprise at least one adapter, which adapter is insertable into a frame opening of that one of the rear bracket portions which is assigned to the bracket element and to the clamping portion, which adapter is fixable by means of a positively locking connection designed preferably as a screw connection to said bracket portion, which adapter is provided, in the case of the rear gearshift mechanism of the first type being installed on the bicycle frame, for engaging into or extending through an associated opening or aperture of the bracket element, and which adapter is provided, in the case of the rear gearshift mechanism of the second type being installed on the bicycle frame, for engaging into or extending through an associated opening or aperture of the clamping portion or of the first arm, and if desired for engaging into or extending through an associated opening or aperture of the second arm (if provided).

An adapter suitable for the installation of both types of rear gearshift mechanisms is however not imperative. It is alternatively envisaged that the set of components has at least one adapter of a first type, which adapter of a first type is insertable into a frame opening of that one of the rear bracket portions which is assigned to the bracket element and to the clamping portion, which adapter of a first type is fixable by means of a positively locking connection designed preferably as a screw connection to said bracket portion, and which adapter of a first type is provided, in the case of the rear gearshift mechanism of the first type being installed on the bicycle frame, for engaging into or extending through an associated opening or aperture of the bracket element. It is furthermore envisaged that the set of components has at least one adapter of a second type, which adapter of a second type is insertable into a frame opening of that one of the rear bracket portions which is assigned to the bracket element and to the clamping portion, which adapter of a second type is fixable by means of a positively locking connection designed preferably as a screw connection to said bracket portion, and which adapter of a second type is provided, in the case of the rear gearshift mechanism of the second type being installed on the bicycle frame, for engaging into or extending through an associated opening or aperture of the clamping portion or of the first arm, and if desired for engaging into or extending through an associated opening or aperture of the second arm (if provided). The set of components preferably has at least one adapter of the first type and at least one adapter of the second type.

It is advantageously possible for the adapter to be configured, on a bolt portion, with an abutment region and a compensation region. The abutment region is preferably dimensioned so as to bear against the inner diameter of the frame opening. By contrast, the compensation region may for example taper conically and exhibit somewhat greater play in relation to the frame opening. Owing to the increased play, the bolt portion and thus the adapter as a whole can be oriented relative to the frame opening. Frame inaccuracies can thus be compensated. The adapter can thus be oriented coaxially with the rear-wheel axle even if the frame opening axis deviates therefrom owing to tolerances.

Provision may advantageously be made for the adapter or the adapter of the first type, on the one hand, and the associated opening or aperture of the bracket element, on the other hand, to be dimensioned relative to one another such that the adapter or the adapter of the first type, in the installed state, centers the bracket element in relation to the geometrical axis. Such centering is of importance for the correct positioning of the rear gearshift mechanism in relation to the sprocket assembly of the rear wheel.

In the case of the discussed embodiment of the first attachment end with the second arm, the adapter or the adapter of the second type can, in the case of the rear gearshift mechanism of the second type being installed on the bicycle frame, expediently engage into or extend through an associated opening or aperture of the second arm, whereby the base element of the gearshift mechanism of the second type can be held in a particularly secure and accurately positioned manner in its position coaxial with respect to the rear-wheel axle, and correct in relation to the sprocket assembly, on the frame. In this context, provision may furthermore be made whereby, in the installed state, the adapter which extends through the associated opening or aperture of the second arm engages over an outer side of the second arm in regions, and via the latter exerts a clamping force on the associated rear bracket portion. Both arms of the base element of the gearshift mechanism would then be clamped together with the associated rear bracket portion in the installed state, whereby the base element could be fixed particularly firmly and securely on the rear bracket element. There are however also reasons for omitting such fixing by firmly clamping the base element on the associated rear bracket portion by means of the adapter, in order, during the course of the installation, after the installation of the adapter, to provide rotatability of the base element relative to the rear axle for alignment purposes.

It is advantageously possible for the adapter or the adapter of the second type, on the one hand, and the associated opening or aperture of the clamping portion or first arm and/or the associated opening or aperture of the second arm, on the other hand, to be dimensioned relative to one another such that the adapter or the adapter of the second type, in the installed state, centers the attachment end of the base element in relation to the geometrical axis. Such centering is of importance for the correct positioning of the rear gearshift mechanism in relation to the sprocket assembly of the rear wheel, as already mentioned with regard to the bracket element. Good centering, which is highly resistant to the action of forces acting on the base element, is achieved if the first arm and the second arm are centered in this way.

Provision is preferably made whereby, in the installed state, the inner axle extends through the axial region of the bracket element or of the clamping portion or first arm, preferably through a/the opening or aperture of the bracket element or through a/the opening or aperture of the clamping portion or first arm. Here, it is envisaged in particular that the inner axle is designed as a plug-in axle. Consideration is however also given to an embodiment of the inner axle as a quick-release axle, which could then have a clamping or counterbearing element which is separate in relation to the adapter and which lies on the latter on the outside. It would then not be necessary to realize the screw engagement, proposed below as being expedient, between the inner axle and the adapter or the adapter of the first type or the adapter of the second type, and it would be possible for the clamping force to be imparted in a manner known per se in the case of quick-release axles.

In a refinement, it is proposed that the inner axle, designed in particular as a plug-in axle, is, at a thread engagement end, screwed or screwable together with an associated thread of the adapter or of the adapter of the first type or of the adapter of the second type, wherein, preferably, the clamping force which in the installed state clamps the component group comprising the assembly of the stator arrangement between the bracket portions can be applied by virtue of the thread engagement end being screwed together with the associated thread of the adapter or of the adapter of the first type or of the adapter of the second type. Provision may advantageously be made here whereby the adapter or the adapter of the first type and the bracket element are axially fixable to one another by means of positively locking engagement, for example are screwable to one another, and/or whereby the adapter or the adapter of the second type and the clamping portion or the first arm are axially fixable to one another by means of positively locking engagement, for example are screwable to one another.

With regard to the latter refinement possibilities, there are numerous possibilities for the physical implementation, wherein, in conjunction with the installation of the gearshift mechanism of the first type and in conjunction with the installation of the gearshift mechanism of the second type, different solutions are taken into consideration and are also favored, but are not imperative.

Accordingly, in conjunction with the installation of the gearshift mechanism of the first type, the adapter or the first adapter could be screwed directly together with the bracket element, for which purpose said bracket element could have a screwing-in opening into which a stud bolt portion, which has an external thread, of the adapter is screwed. The adapter or first adapter, which for this purpose is preferably of single-piece design, could then be fixed via the bracket element to the associated rear bracket portion of the frame. This is the preferred design in the case of the gearshift mechanism of the first type being used.

In conjunction with the installation of the gearshift mechanism of the first type, the adapter or the first adapter could however also be of two-part form, having a first adapter element, which is designed with a stud bolt portion which has an external thread, and a second adapter element, which is designed with a nut portion which has a screwing-in opening. For the fixing of the adapter or first adapter on the associated bracket portion, it would then be possible for the first adapter element to be screwed with its stud bolt from the outer side of the associated bracket portion into the screwing-in opening of the second adapter element positioned on the inner side of the bracket portion. Direct axial and rotational fixing, which is independent of the clamping force acting in the installed state, of the adapter or adapter of the first type and of the bracket element to one another or to the rear bracket portion of the frame by means of firm clamping to one another would then not imperatively have to be realized, though could by all means expediently be taken into consideration, for which purpose the second adapter element could be arranged on an inner side of the bracket element.

Accordingly, in conjunction with the installation of the gearshift mechanism of the second type, the adapter or the second adapter could be of two-part form, having a first adapter element, which is designed with a stud bolt portion which has an external thread, and a second adapter element, which is designed with a nut portion which has a screwing-in opening. For the fixing of the adapter or second adapter on the associated bracket portion, it would then be possible for the first adapter element to be screwed with its stud bolt from the outer side of the associated bracket portion, or from the outer side of the second arm arranged on the outside on the bracket portion, into the screwing-in opening of the second adapter element positioned on the inner side of the bracket portion. This is the preferred design in the case of the gearshift mechanism of the second type being used. Direct axial and rotational fixing, which is independent of the clamping force acting in the installed state, of the adapter or adapter of the second type and of the clamping portion or first arm to one another or to the rear bracket portion of the frame by means of firm clamping to one another would then preferably not be realized, but is likewise taken into consideration, for which purpose the second adapter element could be arranged on an inner side of the clamping portion or first arm. There are however reasons for omitting such fixing by firmly clamping the base element on the associated rear bracket portion by means of the adapter, in order, during the course of the installation, after the installation of the adapter, to provide rotatability of the base element relative to the rear axle for alignment purposes. For such an implementation, it is proposed, in a refinement, that the base element has at least one abutment and the adapter has at least one counterpart abutment, which limit such a relative rotation. If, during the course of installation, the adapter is rotated in a predefined direction of rotation (for example clockwise), it abuts with its counterpart abutment against the abutment of the base element and concomitantly rotates said base element. The rotation of the adapter relative to the base element is limited by the abutments. The abutment on the base element may be formed for example by a pin arrangement, for example two pins, on the first arm of the base element, which pins interact with a projection arrangement, for example two projections, of the second adapter element.

In one preferred refinement of the two-part adapter or second adapter in conjunction with the installation of the gearshift mechanism of the second type, provision is made whereby, during the course of the installation and in the installed state, the adapter is arranged with a head portion of the first adapter element directly on the outer side of the associated rear bracket portion, within the opening or aperture of the second arm, which is likewise arranged directly on the outer side of the associated rear bracket portion, of the base element, and whereby, during the course of the installation and in the installed state, the adapter is arranged with the nut portion of the second adapter element directly on the inner side of the associated rear bracket portion, within the opening or aperture of the first arm, which is likewise arranged directly on the inner side of the associated rear bracket portion, of the base element. Provision may however alternatively also be made whereby the second adapter element is arranged at least with one portion axially between the first arm and the associated rear bracket portion, and/or whereby the first adapter element is arranged at least with one portion axially between the second arm and the associated rear bracket portion. It is also not intended to rule out that the first arm is arranged at least with one portion axially between the second adapter element and the associated rear bracket portion, and/or that the second arm is arranged at least with one portion axially between the first adapter element and the associated rear bracket portion.

Irrespective of these refinement possibilities, the two adapter elements of the adapter or second adapter preferably form, during the course of the installation, a type of rotary bearing for the base element before the latter is rotationally and possibly also axially fixed in non-positively locking fashion, with a setpoint orientation of the base element in relation to the geometrical axis also being produced if necessary, by application of the clamping force which acts on the first arm.

In conjunction with the installation of the gearshift mechanism of the second type, the adapter or the second adapter could however also be screwed directly together with the clamping portion or first arm, for which purpose said clamping portion or first arm could have a screwing-in opening into which a stud bolt portion, which has an external thread, of the adapter is screwed. The adapter or second adapter, which for this purpose is preferably of single-piece design, could then be fixed via the clamping portion or first arm to the associated rear bracket portion of the frame.

According to one preferred refinement, the plug-in axle has a centring surface on an outer circumference, which centering surface, in the installed state, interacts with a centering surface on an inner circumference of the clamping portion or first arm in the region of the opening or aperture thereof for the purposes of centering the base element in relation to the plug-in axle. It is thus possible for centering of the base element by means of the adapter and/or by means of the plug-in axle to be provided, wherein in each case in particular direct centering engagement between the clamping portion or first arm, on the one hand, and the adapter or the plug-in axle, on the other hand, is envisaged.

The stator assembly will generally have an abutment element (for example a so-called hub end cap or an axle nut or a similar functional part) or abutment end (for example an end portion of a hollow hub axle which bears the rotor hub via a rotary bearing arrangement and which is also referred to as hollow axle) which serves for supporting the clamping force which acts between the bracket portions.

In the case of the derailleur system being implemented with the rear gearshift mechanism of the first type, the abutment element or abutment end preferably bears in the installed state against an abutment surface of the adapter or of the adapter of the first type and supports the acting clamping force on said abutment surface, wherein the adapter or the adapter of the first type supports the clamping force directly or indirectly preferably via the bracket element, fixed axially to said adapter, on the associated one of the rear bracket portions. In this context, it is envisaged that the adapter or adapter of the first type is in the installed state screwed directly to the bracket element, wherein the abutment surface of the adapter or of the adapter of the first type is preferably flush with a surface of the bracket element at a portion which is subjected to the clamping force which clamps the component group between the bracket portions.

In conjunction with the embodiment of the derailleur system with the rear gearshift mechanism of the first type, it is however alternatively also envisaged that the abutment element bears in the installed state against an abutment surface of the bracket element and supports the acting clamping force directly or indirectly on said abutment surface and thus via the bracket element on the associated one of the rear bracket portions. For this refinement, too, it is envisaged that the adapter or adapter of the first type is in the installed state screwed directly to the bracket element.

In the case of the derailleur system being implemented with the rear gearshift mechanism of the second type, the abutment element or abutment end preferably bears in the installed state against an abutment surface of the clamping portion or first arm, and the acting clamping force is supported directly or indirectly on said abutment surface and thus via the clamping portion or first arm on the associated one of the rear bracket portions. Indirect support on the rear bracket portion could be realized via the adapter or second adapter. In conjunction with the embodiment of the derailleur system with the rear gearshift mechanism of the second type, it is however not intended to rule out that the abutment element or abutment end bears in the installed state against an abutment surface of the adapter or of the adapter of the second type and supports the acting clamping force on said abutment surface. In this case, it would be possible for the adapter or the adapter of the second type to support the clamping force directly or indirectly via the clamping portion or first arm on the associated one of the rear bracket portions.

Provision is preferably made whereby the clamping portion or first arm has, adjacent to or in the region of its opening or aperture, at least one guide and/or centring surface or guide and/or centering structure for the guidance and/or centring of the stator assembly in particular at its abutment element or abutment end. The installation process can thus be facilitated, and/or correct centering of the stator assembly can be ensured. In particular, it is envisaged that the installation of the rear wheel is facilitated by means of at least one guide surface or guide structure, which can be referred to generally as a guide (possibly hub guide), by virtue of the stator assembly, in particular the abutment element or abutment end thereof, or generally the hub, being able to slide into its end position along the guide, in particular by way of guide surfaces of the guide which converge on one another.

In order to permit the alternative selective installation of a rear gearshift mechanism of the first type by means of the separate bracket element or of a rear gearshift mechanism of the second type without the separate bracket element on a bicycle frame of the same type with a predefined axial spacing between the rear bracket portions (dropouts) of the frame in a simple manner, the clamping portion or first arm, on the one hand, and the bracket element, on the other hand, preferably each have at least approximately the same axial thickness at their portions which in the installed state are subjected to the clamping force which clamps the component group between the bracket portions.

Provision may however also be made whereby that portion of the clamping portion or first arm which in the installed state is subjected to the clamping force which clamps the component group between the bracket portions is axially thicker than that portion of the bracket element which in the installed state is subjected to the clamping force which clamps the component group between the bracket portions. In this case, the set of components may comprise at least one spacer element which is assigned to or associated with the bracket element and which, in the case of the rear gearshift mechanism of the first type being installed on the bicycle frame, belongs to the component group which in the installed state is clamped between the bracket portions, and is subjected to the clamping force which clamps the component group between the bracket portions. The spacer element may then advantageously be dimensioned such that that portion of the bracket element which in the installed state is subjected to the clamping force which clamps the component group between the bracket portions has, together with the at least one spacer element, an axial thickness which is at least approximately equal to the axial thickness of that portion of the clamping portion or first arm which in the installed state is subjected to the clamping force which clamps the component group between the bracket portions.

It is proposed as being highly expedient that the bracket element is axially thicker at its portion which in the installed state is subjected to the clamping force which clamps the component group between the bracket portions than at its portion which has the installation opening, such that an abutment surface of said portion, which abutment surface surrounds the installation opening and on which abutment surface the first attachment end of the base element of the gearshift mechanism of the first type is seated in the installed state, is axially offset in relation to an abutment surface of the portion subjected to the clamping force, which abutment surface supports the clamping force in the installed state directly or indirectly on the associated one of the rear bracket portions, said offset being in the direction of the other of the rear bracket portions. It is thus possible in a simple manner firstly to ensure an optimum axial installation position for the base element of the rear gearshift mechanism of the first type in relation to the associated sprocket assembly, and secondly, at the same time, an adequately stable design of that portion of the bracket element which is subjected to the clamping force, and thus also of the clamping portion or first arm which is alternatively positionable at the same location, and which preferably has approximately the same axial thickness, in the case of the rear gearshift mechanism of the second type being used, and/or an axial thickness sufficient for achieving the required clamping force of that portion of the bracket element which in the installed state is subjected to the clamping force, is made possible.

It is pointed out that the clamping element or the first arm could expediently have an axial thickness in the range from approximately 7 to 9 mm, more specifically for example an axial thickness of approximately 8 mm. Specifically, a thickness of 8 mm may be used without restricting the general nature.

The bracket element, in an edge region, directly adjacent to the associated one of the rear bracket portions, of its portion which in the installed state is subjected to the clamping force which clamps the component group between the bracket portions, may advantageously be designed with a collar which projects axially in the direction of the other of the rear bracket portions. Such a collar may be adapted to the geometry of an interface of the associated rear bracket portion with respect to the bracket element, for example of a receptacle for an associated region of the bracket element, and may also serve as installation aid, for example by virtue of the collar of the already-installed bracket element being utilized, during the further installation, as a positioning guide or insertion bevel for at least one component of the rear-wheel axle arrangement. It is thus possible to achieve a helpful effect similar to that achieved by means of the discussed guide (possibly hub guide) of the clamping portion or first arm in the case of the rear gearshift mechanism of the second type being used.

In a particularly preferred refinement, the bracket element is of multi-part design, having a lug-like metal part which is planar preferably on both sides, which metal part, in a first region which in the installed state is subjected to the clamping force which clamps the component group between the bracket portions, has an opening or aperture assigned to the adapter or adapter of the first type and/or to the inner axle, and which metal part, in a second region, has the installation opening, and having at least one further component assigned to the metal part. Thus, as a component assigned to the metal part, there may advantageously be provided at least one plastics part which is combined or combinable with the metal part at its first region and has a spacer region, which spacer region is planar preferably on both sides and has an opening or aperture assigned to the adapter or adapter of the first type and/or to the inner axle and which spacer region, in the installed state, lies on the first region of the metal part and is subjected to the clamping force which clamps the component group between the bracket portions. The plastics part may advantageously have the axially projecting collar (if provided) and, with a transition region between the collar and the spacer region, overlap an edge region of the metal part at least in portions. The plastics part permits, with regard to a given metal part, an adaptation to the geometry of a/the interface of the associated rear bracket portion for the bracket element, for example of a/the receptacle for an associated region of the bracket element, and also an adaptation to the axial spacing between the rear bracket portions of a given bicycle frame in order to achieve the desired clamping force in the installed state. By means of the collar and the spacer region, a clamping or snap-action connection to the first region, which is or can be received in between preferably at least at an edge region, of the metal part can be provided, such that the resulting bracket element can be handled as a unit.

Provision may particularly expediently be made whereby the adapter or adapter of the first type is, in the installed state, screwed together with the lug-like metal part. Provision may however alternatively also be made whereby the adapter or adapter of the first type is, in the installed state, screwed together with the plastics part. For this purpose, it would be possible for the plastics part to have an axially projecting sleeve portion, which in the installed state is inserted into the frame opening of the associated rear bracket portion and has an internal thread for screwing together with the adapter or adapter of the first type.

With regard to the adaptation function discussed above, it is proposed in a refinement that the set of components comprises at least one lug-like metal part and a set of plastics parts which are alternatively combinable with said metal part and which are adapted to different use or installation situations. Thus, the lug-like metal part can be used for the installation of a rear gearshift mechanism of the first type on frames of different types, which differ with regard to the interface of the associated rear bracket portion and/or with regard to the axial spacing of the rear bracket portions.

Alternatively or in addition, as a component assigned to the metal part, there may advantageously be provided at least one auxiliary part which is combined or combinable with the metal part at its first region or at a third region, adjacent to said first region, of the metal part, which auxiliary part serves for adaptation to an interface of the associated rear bracket portion and/or as a rotational abutment for the support of rotational forces on at least one associated abutment surface of the associated rear bracket portion, and is preferably formed as a plastics part. It is envisaged here in particular that, in the case of the embodiment as a plastics part, the auxiliary part is a plastics part which is separate in relation to the plastics part which has the spacer region, if the plastics part which has the spacer region is provided. It is however not intended to rule out that the auxiliary part and the plastics part which has the spacer region are formed by an integral and possibly unipartite component.

In one expedient refinement, the auxiliary part may have a holding portion, which is inserted or insertable into a holding opening or holding aperture of the lug-like metal part, and at least one adaptation and/or abutment portion, which is connected integrally to said holding portion.

With regard to the adaptation function discussed above, it is proposed in a refinement that the set of components comprises at least one lug-like metal part and a set of auxiliary parts which are alternatively combinable with said metal part and which are adapted to different use or installation situations. Thus, the lug-like metal part can be used for the installation of a rear gearshift mechanism of the first type on frames of different types, which differ with regard to the interface of the associated rear bracket portion and/or with regard to the surfaces, which may be used as abutment surfaces, of the rear bracket portion.

A bracket element (derailleur hanger) of the type discussed above is also of interest independently of the first aspect of the invention, because it is advantageous, entirely independently of the possibility of equipping bicycles with a derailleur system which has a rear gearshift mechanism of the new (second) type, for the optimum installation of a rear gearshift mechanism of the conventional (first) type on a bicycle frame.

According to an independent second aspect, the invention thus proposes a bracket element which is positionable on an axial inner side of an associated bracket portion of the rear bracket portions, which serve for holding an axle of a rear-wheel axle arrangement of a rear wheel, of a bicycle frame for the purposes of installing a rear gearshift mechanism of a derailleur system on the bicycle frame, comprising a first portion, which has an opening or aperture assigned to the axle and which, in the installed state, with the cooperation of further components, is subjected to a clamping force which acts between the rear bracket portions, and comprising a second portion, which second portion has an installation opening which is radially offset in relation to the opening or aperture in the installed state with respect to the axis and to which an attachment end of a base element of the rear gearshift mechanism is fixable. The proposed bracket element is characterized according to the invention in that an abutment surface of the second portion, which abutment surface surrounds the installation opening and is provided for forming a support surface for the attachment end of the installed base element, is offset in relation to an abutment surface of the first portion, which abutment surface surrounds the opening or aperture and is on the same side of the bracket element, said offset being in the direction of the other side of the bracket element. It is thus possible in a simple manner firstly to ensure an optimum axial installation position for the base element of the rear gearshift mechanism of the conventional (first) type in relation to the associated sprocket assembly, and secondly, at the same time, an adequately stable design and/or an adequate axial thickness for achieving the required clamping force of that portion of the bracket element which in the installed state is subjected to the clamping force is made possible.

In a refinement, it is proposed that the other side of the bracket element is of planar design over a surface region which encompasses at least one surface portion of the first portion and at least one surface portion of the second portion, and/or that the first region is axially thicker than the second region. Such a bracket element can be produced easily.

The bracket element may be designed with an axially projecting collar in an edge region of the first portion on the other side. Such a collar may be adapted to the geometry of an interface of the associated rear bracket portion with respect to the bracket element, for example of a receptacle for an associated region of the bracket element, and may also serve as installation aid, for example by virtue of the collar of the already-installed bracket element being utilized, during the further installation, as a positioning guide or insertion bevel for at least one component of the rear-wheel axle arrangement.

In a particularly preferred refinement, the bracket element is of multi-part design, having a lug-like metal part which is planar preferably on both sides, which metal part, in a first region assigned to the first portion, has an opening or aperture assigned to the axle, and in a second region assigned to the second portion, has the installation opening, and having at least one further component assigned to the metal part. Thus, as a component assigned to the metal part, there may advantageously be provided at least one plastics part, which plastics part is combined or combinable with the metal part at its first region and has a spacer region, which spacer region is assigned to the first portion and is planar preferably on both sides and has an opening or aperture assigned to the axle and which spacer region, in the installed state, lies on the first region of the metal part in order to form the first portion of the bracket element. The plastics part may advantageously have the axially projecting collar (if provided) and, with a transition region between the collar and the spacer region, overlap an edge region of the metal part at least in portions. The plastics part permits, with regard to a given metal part, an adaptation to the geometry of a/the interface of the associated rear bracket portion for the bracket element, for example of a/the receptacle for an associated region of the bracket element, and also an adaptation to the axial spacing between the rear bracket portions of a given bicycle frame in order to achieve the desired clamping force in the installed state. By means of the collar and the spacer region, a clamping or snap-action connection to the first region, which is or can be received in between preferably at least at an edge region, of the metal part can be provided, such that the resulting bracket element can be handled as a unit.

It is advantageously possible for the lug-like metal part to have a thread arrangement, for example an internal thread, for screwing together with a fastening element for the purposes of fixing to the rear bracket portion of the frame. It is however alternatively also possible for the plastics part to be implemented with such a thread arrangement, in particular with an internal thread, for screwing together with a fastening element for the purposes of fixing to the rear bracket portion of the frame. In this context, the plastics part may advantageously have an axially projecting sleeve portion, which is insertable into a frame opening of the associated rear bracket portion and has an internal thread for said screw connection.

Alternatively or in addition, as a component assigned to the metal part, there may advantageously be provided at least one auxiliary part which is combined or combinable with the metal part at its first region or at a third region, adjacent to said first region, of the metal part, which auxiliary part serves for adaptation to an interface of the associated rear bracket portion and/or as a rotational abutment for the support of rotational forces on at least one associated abutment surface of the associated rear bracket portion, and is preferably formed as a plastics part. It is envisaged here in particular that, in the case of the embodiment as a plastics part, the auxiliary part is a plastics part which is separate in relation to the plastics part which has the spacer region, if the plastics part which has the spacer region is provided. It is however not intended to rule out that the auxiliary part and the plastics part which has the spacer region are formed by an integral and possibly unipartite component. In an embodiment, the auxiliary part, which may be formed of metal, and a plastic part are integrally formed as a single piece.

In one expedient refinement, the auxiliary part may have a holding portion, which is inserted or insertable into a holding opening or holding aperture of the lug-like metal part, and at least one adaptation and/or abutment portion, which is connected integrally to said holding portion.

According to the second aspect, with regard to the adaptation function discussed above, the invention also provides a set of components which comprises at least one lug-like metal part and a set of plastics parts which are alternatively combinable with the metal part and which are adapted to different use or installation situations, and/or comprises a set of auxiliary parts which are alternatively combinable with the metal part and which are adapted to different use or installation situations. Thus, the lug-like metal part can be used for the installation of a rear gearshift mechanism of the first type on frames of different types, which differ with regard to the interface of the associated rear bracket portion and/or with regard to the axial spacing of the rear bracket portions and/or with regard to the surfaces, which may be used as abutment surfaces, of the rear bracket portion. The combination of the lug-like metal part and any of the plastics parts yields in each case one bracket element according to the invention. The combination of the lug-like metal part and any of the auxiliary parts yields in each case one bracket element according to the invention. The combination of the lug-like metal part and one plastics part, assigned to the respective use or installation situation, of the plastics parts and one auxiliary part, assigned to the respective use or installation situation, of the auxiliary parts yields in each case one bracket element according to the invention.

Furthermore, according to the first and/or second aspect, the invention provides a bicycle which has a bicycle frame with a left-hand rear bracket portion and a right-hand rear bracket portion for an axle of a rear-wheel axle arrangement of a rear wheel, which bracket portions have a predetermined defined axial spacing along a geometrical axis of the axle installed on the frame by means of the bracket portions, and which bracket portions form in each case one counterbearing for a component group which is arranged on the axle and which in the installed state is clamped between the bracket portions. The bicycle according to the invention is equipped with a derailleur system, the rear gearshift mechanism of which is installed on the frame non-coaxially in relation to the geometrical axis, wherein a base element of the rear gearshift mechanism has an attachment end which is installed on the bicycle frame, so as to be radially offset with respect to the geometrical axis, by means of a bracket element which is separate with respect to the frame and which is positioned on an axial inner side of an associated one of the rear bracket portions. According to the invention, as bracket element, a bracket element according to the second aspect of the invention is installed, and/or the bicycle is or can be constructed according to the invention using selected components including the bicycle frame, the bracket element and the rear gearshift mechanism of the first type of a set of components according to the first aspect of the invention. The bicycle may be characterized by further features mentioned above, which relate to the components of the set of components and/or to the installed state in conjunction with the use of the rear gearshift mechanism of the first type.

Furthermore, according to the first aspect, the invention provides a bicycle which has a bicycle frame with a left-hand rear bracket portion and a right-hand rear bracket portion for an axle of a rear-wheel axle arrangement of a rear wheel, which bracket portions have a predetermined defined axial spacing along a geometrical axis of the axle installed on the frame by means of the bracket portions, and which bracket portions form in each case one counterbearing for a component group which is arranged on the axle and which in the installed state is clamped between the bracket portions; wherein the bicycle is equipped with a derailleur system, the rear gearshift mechanism of which is installed on the frame coaxially in relation to the geometrical axis. According to the invention, the bicycle is or can be constructed using selected components including the bicycle frame and the rear gearshift mechanism of the second type of a set of components according to the first aspect of the invention. The bicycle may be characterized by further features mentioned above, which relate to the components of the set of components and/or to the installed state in conjunction with the use of the rear gearshift mechanism of the second type.

The invention also proposes a method for producing a bicycle, comprising: providing or stocking bicycle components which together comprise a set of components according to the first aspect of the invention; deciding whether the bicycle is to be provided with a derailleur system having a rear gearshift mechanism of the first type or with a derailleur system having a rear gearshift mechanism of the second type; constructing the bicycle, with installation of the rear gearshift mechanism of the first type of the set of components using the bracket element of the set of components, or with installation of the rear gearshift mechanism of the second type of the set of components on the bicycle frame of the set of components, depending on the decision made.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

After a brief discussion of the relevant prior art, a detailed description of preferred embodiments of a rear gearshift mechanism of a new (second) type with associated components, which may belong to a set of components according to the invention, will follow.

Figure 13:
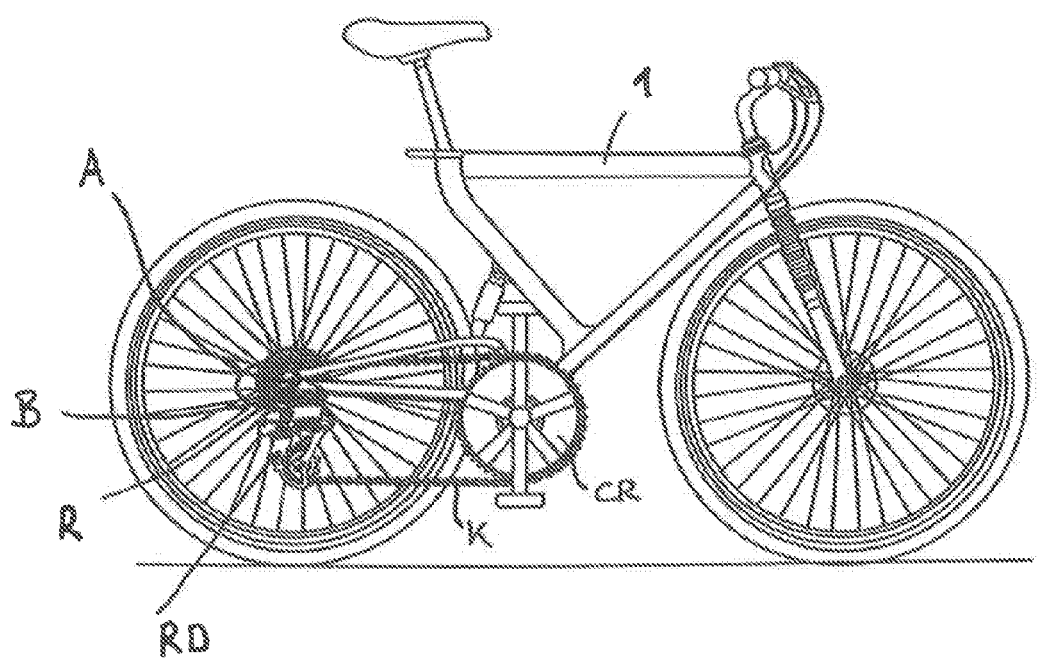
FIG. 13 shows a bicycle with a gearshift mechanism of a conventional (first) type, which is installed on a bicycle frame by means of a derailleur hanger.

FIG. 13 shows, by way of example, a bicycle with a bicycle drive known from the prior art. The bicycle drive comprises a front sprocket CR, a rear sprocket assembly R, and a chain K which can be moved from one sprocket to the next by means of the rear gearshift mechanism RD of a conventional (first) type. The directional terms right/left and front/rear used below relate to a bicycle in a direction of travel. The bicycle frame 1 has a left-hand and a right-hand rear dropout, between which the rear wheel is installed. The rear wheel rotates together with the sprocket assembly R about the rear-wheel axle. "Axially" relates to the rear-wheel axle or the axis of rotation A of the multi-sprocket arrangement R. The largest sprocket is situated axially further to the inside than the smaller sprockets. The teeth are arranged radially at the outside on the sprockets. The outer diameter of a sprocket is the radially outer end, and the inner diameter is the radially inner end of the sprocket. The gearshift mechanism RD shown here is fastened in the conventional manner by means of a derailleur hanger, which is separate in relation to the frame, to the right-hand dropout of the frame. Thus, the known gearshift mechanism RD is spaced apart from the rear-wheel axle and is installed non-coaxially with respect thereto. The gearshift mechanism RD rotates about the B axis, which is spaced apart from the axis A. The pivot mechanism of the gearshift mechanism is designed as an oblique parallelogram.

For improved understanding of the invention, the figures show various stages of installation of the gearshift mechanism of the new (second) type and of the rear-wheel axle arrangement on different scales.

FIG. 1 shows a perspective view of the rear gearshift mechanism 10 according to the invention installed coaxially on the rear-wheel axle 6. For better clarity, the rear wheel and the sprocket assembly have not been illustrated. It is possible to see the rear-wheel hub 3, which is arranged between the two dropouts of the frame 1, and the gearshift mechanism 10, which engages around the right-hand dropout. The base element 20 is installed on the frame 1 coaxially with respect to the axis A by means of the adapter 60.

Figure 2:
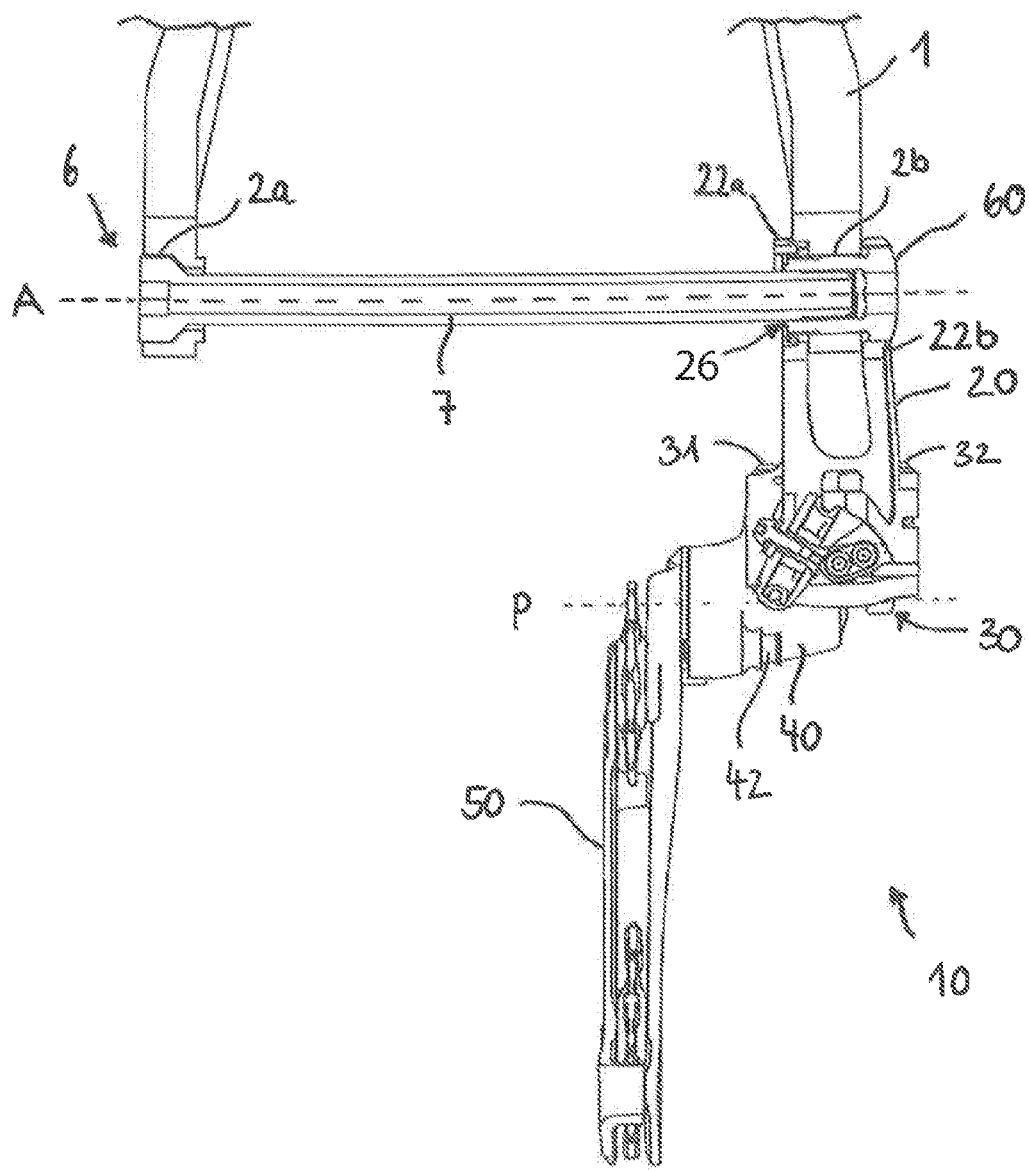

FIG. 2 shows a section along the axis A of the gearshift mechanism 10 illustrated in FIG. 1 in a rear view. The geometrical axis A extends along the rear-wheel axle 6. For the sake of simplicity, only the plug-in axle 7 and not the other parts of the axle and hub arrangement are shown in this illustration. The base element 20 is fastened to the right-hand dropout by means of the adapter 60. For this purpose, the adapter 60 engages through the right-hand frame opening 2b. The plug-in axle 7 is inserted into the left-hand frame opening 2a and screwed together with the adapter 60. The adapter 60 simultaneously serves as a counternut for the plug-in axle 7. When the plug-in axle 7 is tightened, it is screwed further into the adapter 60 and is clamped relative to the frame 1.

Figure 3:
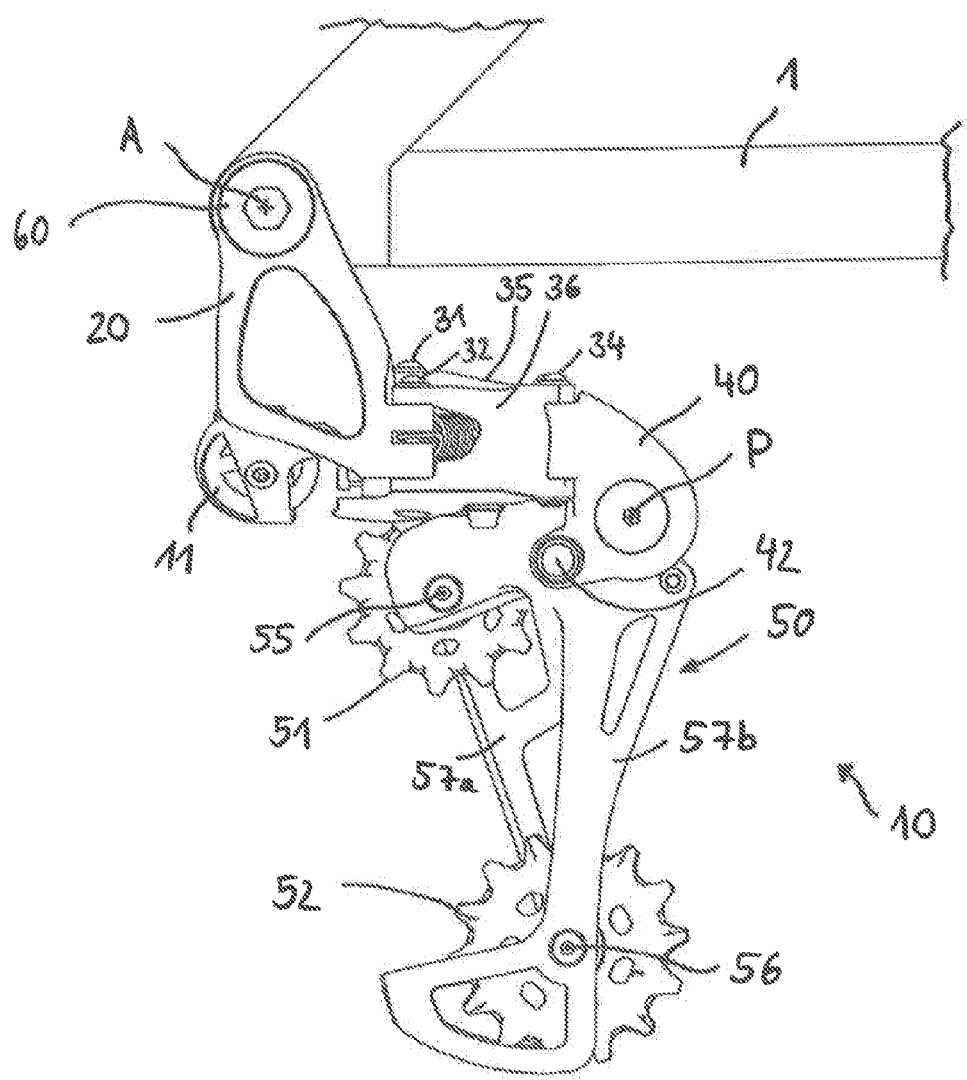

FIG. 3 shows a side view of the gearshift mechanism 10 according to the invention from FIG. 2 installed on the frame 1. FIGS. 1 to 3 each show the entire gearshift mechanism 10 with the base element 20, the pivot mechanism 30, the movable element 40 and the chain guide arrangement 50. On the base element 20, there is arranged a cable diverting means 11, in this case in the form of a cable diverting roller mounted rotatably at the attachment point 29c. The base element 20 is, at its first, upper attachment end, installed on the frame 1 coaxially with respect to the rear-wheel axle. For this purpose, two arms, which are spaced apart from one another in an axial direction, of the base element 20 engage around the dropout of the frame 1, such that one arm is arranged on the inner side of the frame 1 and the other arm is arranged on the outer side of the frame 1. The base element 20 is pre-installed on the frame 1 by means of the adapter 60. Furthermore, the base element 20 is coupled at its second, lower attachment end to the pivot mechanism 30. The pivot mechanism 30 is designed as a parallelogram four-joint mechanism with an inner pivot arm 35, an outer pivot arm 36 and four pivot axles 31, 32, 33, 34. The four pivot axles 31, 32, 33, 34 run in each case in planes which intersect the axis A at right angles. In other words, the pivot axles 31, 32, 33, 34 lie in planes which extend parallel to the sprocket planes (not shown here) (cf. FIGS. 11 to 13). The first and second pivot axles 31, 32 connect the pivot mechanism 30 to the base element 20. The third and fourth pivot axles 33, 34 connect the pivot mechanism 30 to the movable element 40. Both the base element 20 and the movable element 40 have in each case two receptacles for the pivot axles. The longitudinal axes L1, L2 of the receptacles on the base element 20 and the longitudinal axes of the receptacles on the movable element 40 are, like the pivot axles 31, 32, 33, 34 themselves, oriented orthogonally with respect to the rear-wheel axle 6 or the axis A (cf. FIGS. 4 to 9). The chain guide arrangement 50 is connected, so as to be rotatable about the axis P, to the movable element 40 and is preloaded clockwise (rearward), such that a chain (not shown here) which runs through the chain guide 50 in S-shaped fashion is tensioned. The chain guide arrangement 50 comprises an upper and a lower chain guide roller 51, 52, which chain guide rollers are each mounted rotatably between two cage halves 57a, 57b. The upper chain guide roller 51 is arranged, so as to be rotatable about the upper axis of rotation 55, with an upper spacing to the axis P. The lower chain guide roller 56 is arranged, so as to be rotatable about the lower axis of rotation 56, with a lower spacing to the P axis, wherein the upper chain guide roller 51 is arranged with a smaller spacing to the P axis than the lower chain guide roller 52. The movable element 40 has a locking element 42 which makes it possible for the preloaded chain guide arrangement 50 to be fixed relative to the movable element 40. It is thus possible for the gearshift mechanism 20 to be installed without the chain guide arrangement 50 snapping backwards owing to the preload.

During shifting to a smaller sprocket, the chain guide arrangement 50 rotates clockwise rearwards about the axis of rotation P of the movable element 40. Conversely, during shifting to a next larger sprocket, the chain guide arrangement 50 rotates anticlockwise forwards about the axis of rotation P. As a result of the rotational movement about the axis P, the upper chain guide roller 51 is moved radially towards or away from the sprockets. The chain guide arrangement 50 is moved in an axial direction by virtue of the pivot arms 35, 36 being pivoted about the pivot axles 31, 32, 33, 34. Depending on shifting direction, the upper chain guide roller 51 together with the entire chain guide arrangement 50 moves inwards or outwards in an axial direction.

Figure 4:
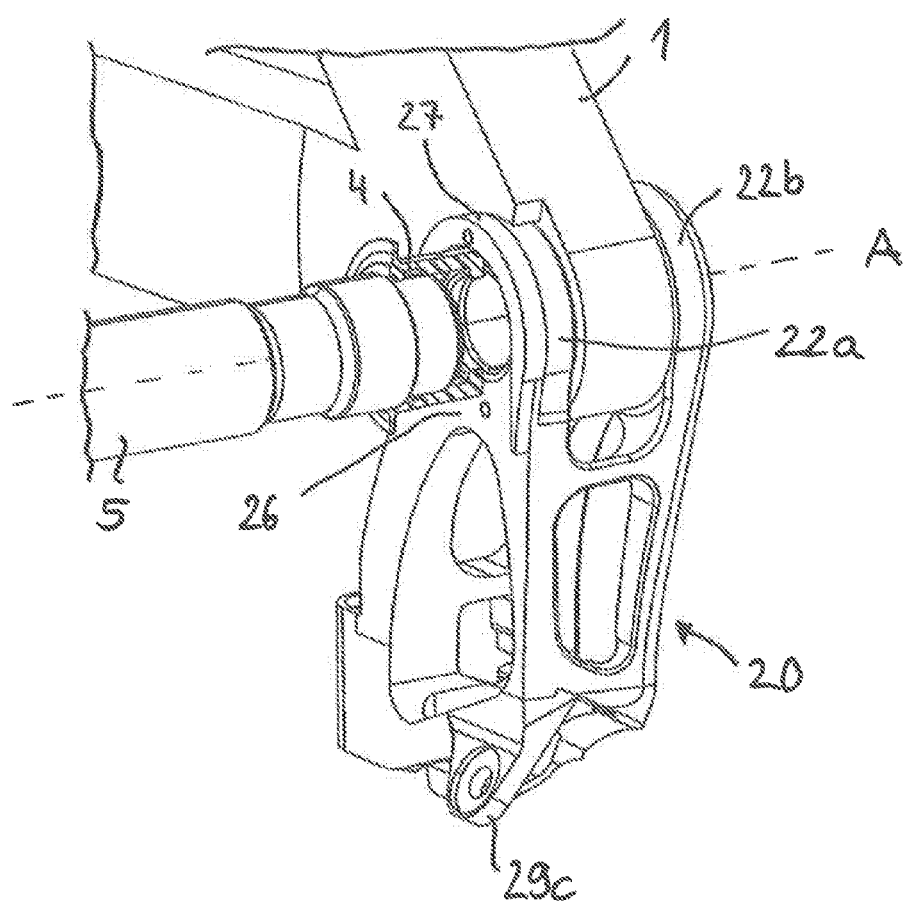
Figure 5:
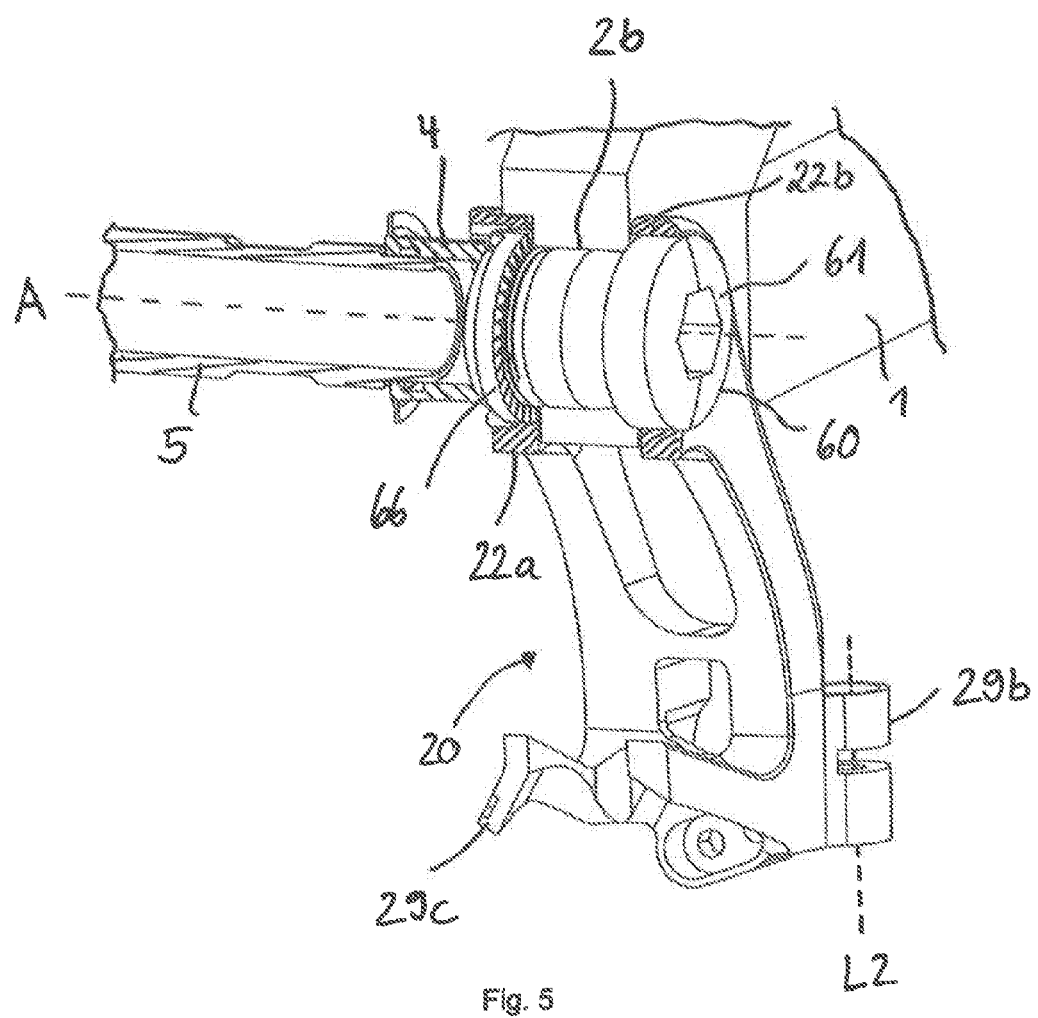

FIGS. 4 and 5 show in each case perspective partial sections of the base element 20 installed on the frame 1 by means of the adapter 60, and parts of the hub arrangement. The first arm 22a and the second arm 22b are positioned in each case on one side of the frame 1. For the installation of the rear wheel (not shown here), said rear wheel is guided together with the hub arrangement (only the hollow axle 5 is shown here) and the hub end cap 4 along the hub guide 27 on the inner side of the base element 20. The hub guide 27 is designed as a collar with guide surfaces which taper towards one another. In its end position, the hub end cap 4 bears radially against the hub guide 27. In an axial direction, the hub end cap 4 abuts against the axial hub abutment surface 26 on the inner side of the base element 20. The hub end cap 4 is illustrated in section.

FIG. 5 shows a section through the base element 20 with the two arms 22a, 22b which engage around the adapter 60. The adapter 60 is composed of the bolt 61 and the nut 66. The bolt 61 is screwed into the nut 66, such that the bolt head 62 and the nut 66 are clamped to the frame 1. The adapter 60 can thus be fixed relative to the frame 1. The base element 20 is centered on the adapter 60. In the rideable state, when the plug-in axle 7 has been tightened, the base element 20 is clamped rotationally fixedly between the hub end cap 4 and the adapter 60. In the fully installed state, the base element 20 bears in the axial direction only against the hub end cap 4 and against the adapter 60. The base element 20 is installed on the frame 1 indirectly by means of the adapter 60. The base element 20 and thus the gearshift mechanism 10 as a whole is referenced in relation to the hub 4—and not, as is conventional, in relation to the frame 1.

Figure 6:
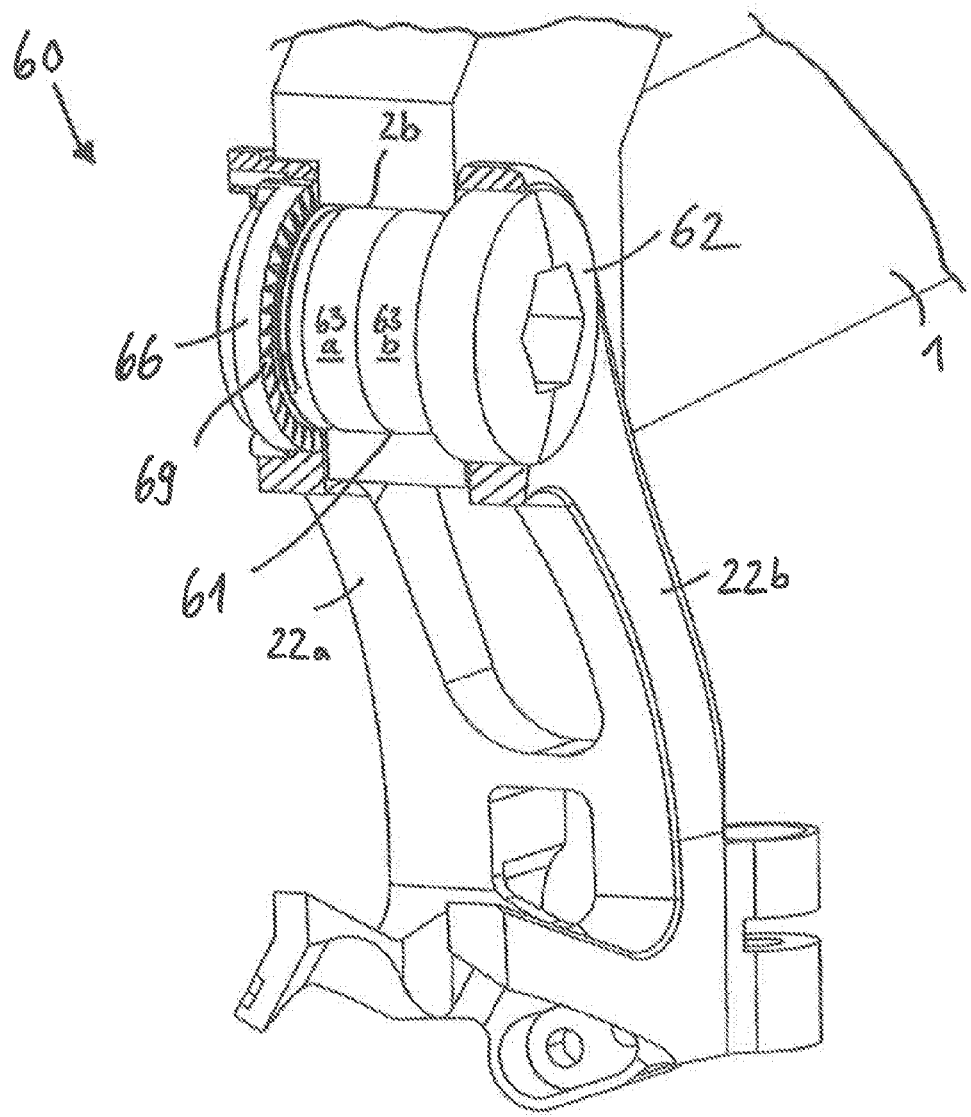

FIG. 6 shows the enlarged partial section of the base element 20 from FIG. 5 installed on the frame 1 by means of the adapter 60. The bolt head 62 and the nut 66 are dimensioned to be larger than the frame opening 2b. When the adapter 60 has been tightened, the bolt head 62 and the nut 66 bear in frictionally locking fashion against the frame 1. The nut 66 has a knurled surface 69 in order to additionally produce a positively locking connection with respect to the frame 1 and counteract a forwards (anticlockwise) rotation of the gearshift mechanism 10. The bolt body 63 has an abutment region 63a, which bears with a small amount of play against the frame opening 2b, and a compensation region 63b, which has a greater amount of play in relation to the frame opening 2b. The compensation region 63b makes it possible for the adapter 60 to align along the axis A in the frame opening 2b. The bolt 61 has an amount of play in the frame opening 2b and can tilt slightly therein if the frame opening is not exactly aligned with the axis A.

Figure 7:
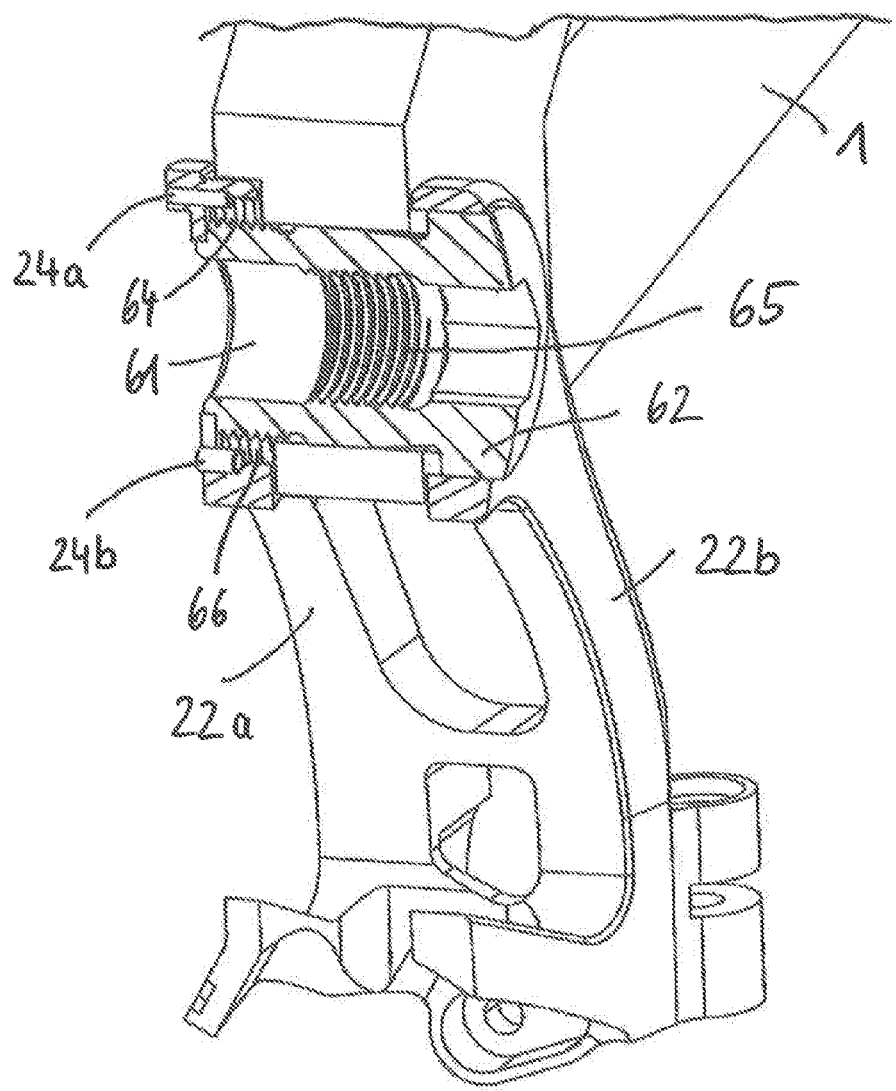

FIG. 7 shows the arrangement from FIG. 6 with the adapter 60 shown in section. The adapter 60 has two tasks: 1) The clamping on the frame 1 is produced by means of the screw connection between bolt 61 and nut 66. It would alternatively also be possible for the nut to be arranged on the outside and for the bolt to be arranged on the inside. It is important that the adapter 60 is fixable relative to the frame 1 and adaptable to said frame in an axial direction. The screw connection is tightened further in the case of a relatively thin frame than in the case of a relatively thick frame. 2) The adapter 60 is rotatable clockwise relative to the base element 20 only to a limited extent and thus constitutes a rotation prevention means. For this purpose, two abutments 68a, 68b are arranged on the nut 66, which abutments interact with two pins 24a, 24b on the base element 20. A forwards (anticlockwise) rotation of the gearshift mechanism 10 is possible only to a limited extent owing to the rotation prevention means between adapter 60 and base element 20. The rotation prevention means replaces the conventional B screw and protects against undesired forwards rotation of the gearshift mechanism.

The external thread 64 and the internal thread 65 of the bolt 61 are arranged in different regions along the bolt 61 in order to thereby be able to better accommodate forces. The plug-in axle 7 is screwed into the internal thread 65 and pulls the adapter 60, in particular the bolt head 62, against the outer side of the frame 1. In the exemplary embodiment shown, a washer is arranged between the bolt head 62 and the frame 1.

Figure 8:
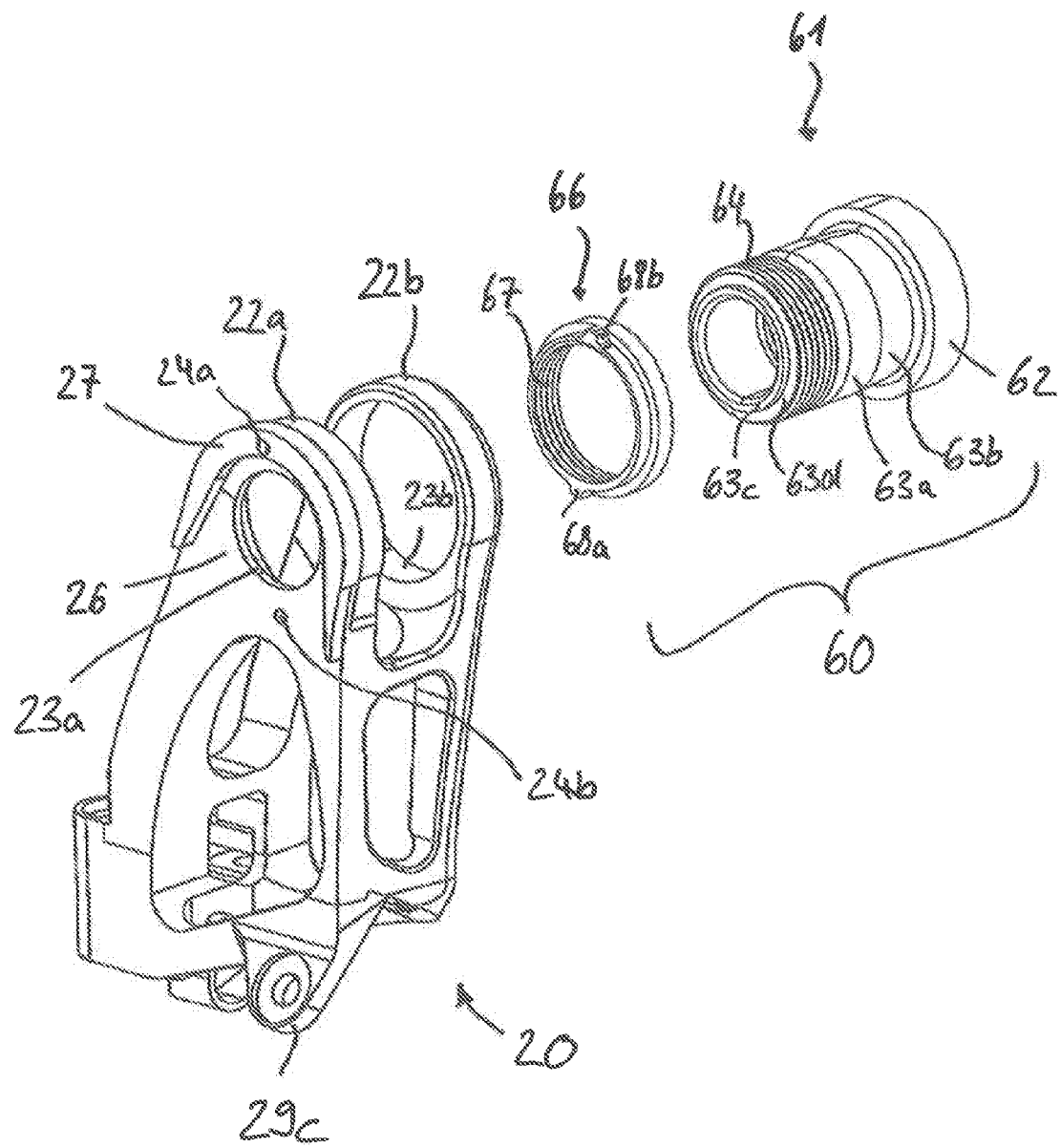

In this regard, see also FIG. 8, an exploded illustration of the non-installed base element 20 and of the adapter 60 from FIG. 7. In this view, the internal thread 67 of the nut 66 and the external thread 64 of the bolt 61, which together form the screw connection of the adapter 60, can be clearly seen. It would alternatively also be possible for the bolt to be screwed directly into a thread of the frame opening. Then, frame tolerances would however have a direct effect on the gearshift mechanism, which should be avoided. Furthermore, it is possible to see the bolt foot 63c adapted to the first centering opening 23a, and the bolt head 62 adapted to the second centering opening 23b. The abutment surface 63d of the bolt 61 interacts with the outer side, which is averted here, of the first arm 22a of the base element 20 (cf. FIG. 9a).

Figure 9A:
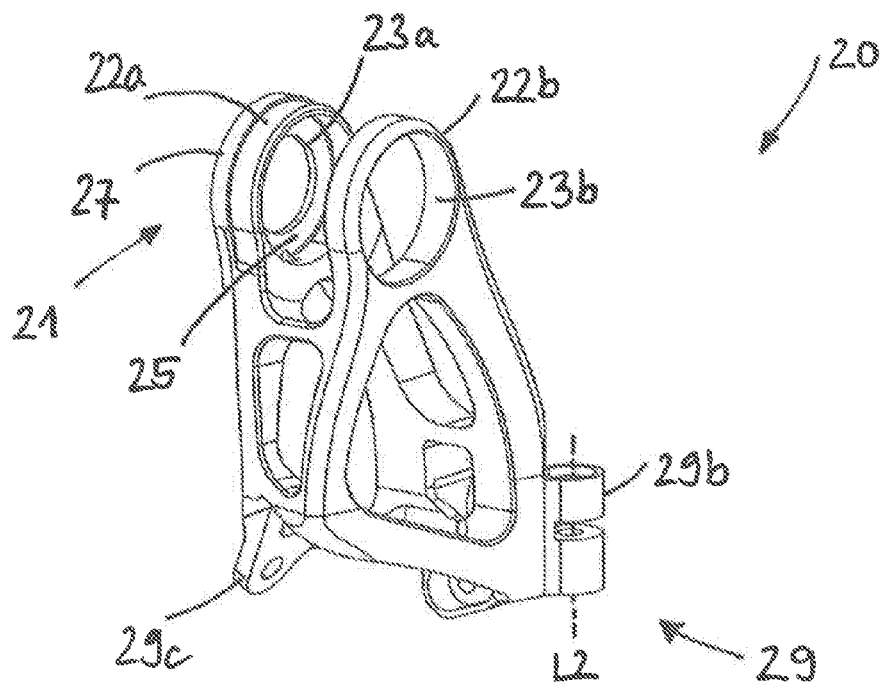
FIG. 9*a* shows a perspective outside view of the base element.
Figure 9B:
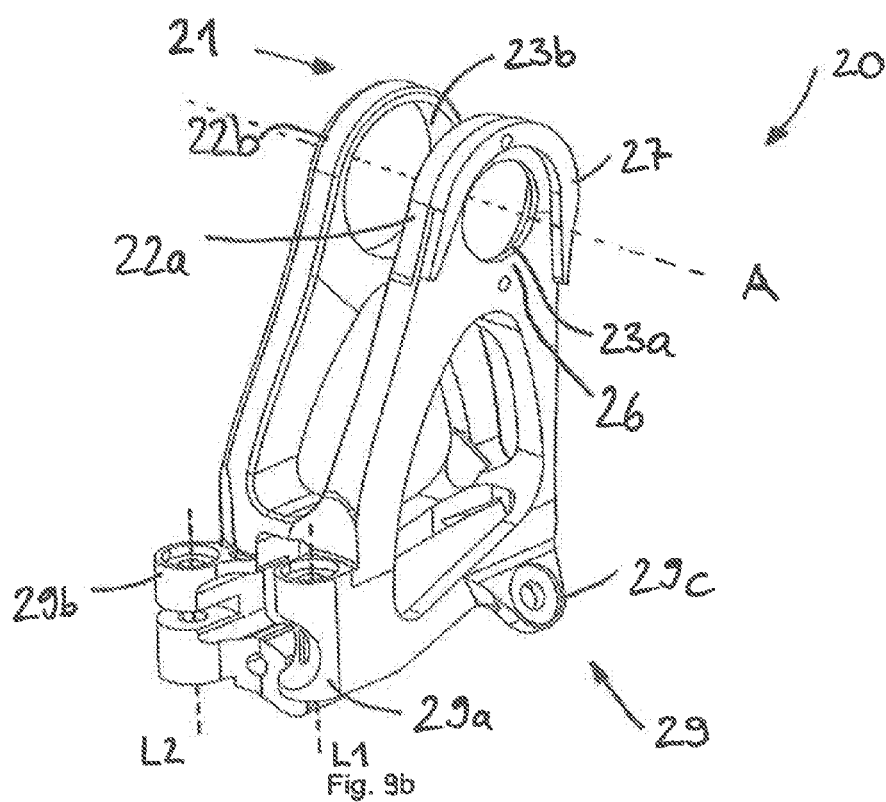
FIG. 9*b* shows a perspective inside view of the base element.

FIGS. 9a and 9b show a perspective outside and inside view of the base element 20 with the first and second centering openings 23a, 23b. The first centering opening 23a is adapted to the outer diameter of the bolt foot 63c of the bolt 61. The second centering opening 23b is adapted to the outer diameter of the bolt head 61. On the outer side of the first arm 22a, it is possible to see the adapter abutment surface 25, which interacts with the abutment surface 63d of the bolt 61. The hub abutment surface 26 is arranged on the opposite, inner side of the first arm 22a. In the rideable state, the bolt 61 is clamped with the bolt abutment surface 63d against the outer side, and the hub end cap 4 is clamped against the inner side, of the base element 20. Situated at the lower attachment end of the base element 20 is the attachment point 29c for a cable diverting means 11. Furthermore, the first receptacle 29a for the first pivot axle 31 and the second receptacle 29b for the second pivot axle 32 of the pivot mechanism 30 (not shown here) are situated at the lower attachment end of the base element 20. The longitudinal axes L1, L2 of the first and second receptacles 29a, 29b run in planes which intersect the rear-wheel axis A in each case at right angles. The four pivot axles 31, 32, 33, 34 of the parallelogram four-joint mechanism 30 are thus oriented orthogonally with respect to the common sprocket axis A irrespective of the selected relative position of the gearshift mechanism 10.

Figure 10:
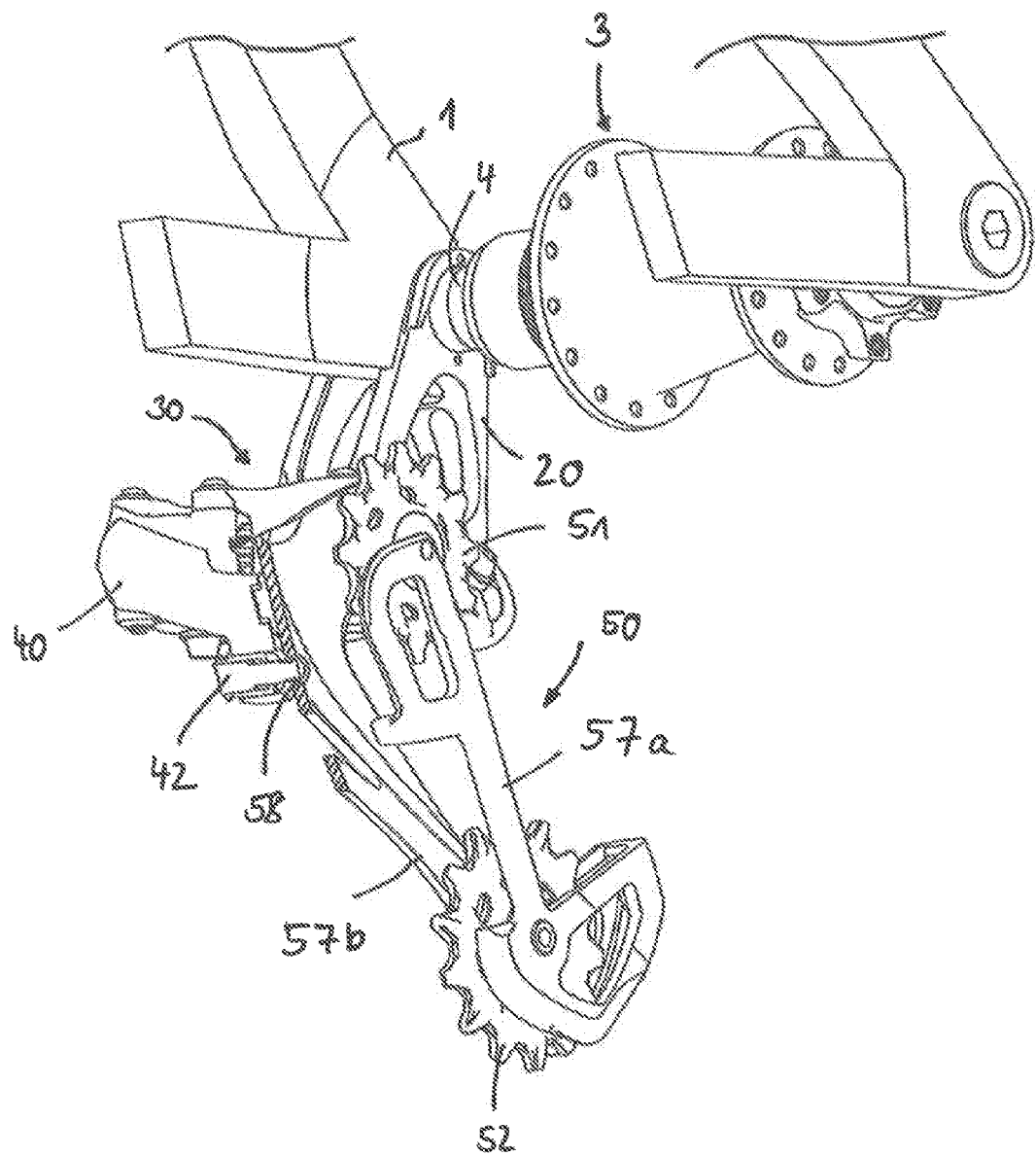

FIG. 10 shows a partial section through the second embodiment of the gearshift mechanism 10 according to the invention with a setting aid. The section runs through the movable element 40 and the chain guide arrangement 50. The setting aid is designed in the form of the locking element 42, which engages into the locking opening 58 in the outer cage half 57b. By means of the setting aid, the chain guide arrangement 50, which is preloaded clockwise, is fixed in a predetermined rotational position relative to the movable element 40. The predetermined rotational or angular position fixes the upper chain guide roller 51 with an ideal spacing to a reference sprocket of the sprocket assembly (not shown here). For the setting of the gearshift mechanism 10, said chain guide roller is locked by means of the setting aid. After the setting, the locking is released, such that the chain guide arrangement 50 can rotate relative to the movable element 40.

The installation steps and the setting of the gearshift mechanism 10 according to the invention will be described below with reference to FIGS. 1 to 10.

i) The gearshift mechanism 10 is pre-installed on the frame 1 by means of the base element 20 and the adapter 60. For this purpose, the base element 20 engages around the right-hand dropout of the frame 1, and the adapter 60 is inserted and screwed into the frame opening 2b and the centering openings 23a, 23b into the base element 20. The adapter 60 is screwed in to such an extent that it, together with the base element 20, is held on the frame 1 so as to still be rotatable (cf. FIGS. 6 and 7).

After the first installation step, the adapter 60 and the base element 20 have been pre-positioned in an axial and radial direction relative to the frame 1 but have not yet been tightened. Adapter 60 and base element 20 are rotatable relative to the frame 1 about the axis A.

ii) The rear wheel with the entire hub arrangement is inserted, and the plug-in axle 7 is screwed in, but is not yet fully tightened (cf. FIGS. 1 to 3, in which the rear wheel is not illustrated). In the not yet tightened state, the gearshift mechanism 10 can still rotate about the rear-wheel axis A.

iii) The adapter 60 is tightened. Here, the bolt 61 is, together with the nut 66, rotated clockwise relative to the base element 20 until the abutments 68a, 68b of the nut 66 abut against the counterpart abutments of the base element 20. Owing to the abutments, the base element 20 and the gearshift mechanism 10 as a whole are driven along during the further rotation until the chain has been tensioned. In the tensioned position, both the base element 20 and the nut 66 are fixed, such that the bolt 61 is screwed into the internal thread 67 of the nut 66 until the adapter 60 has been tightened against the frame 1.

A setting aid may optionally be used. A setting locking means as shown in FIG. 10 would be conceivable. The locking means 42/58 fixes the chain guide arrangement 50, which is rotatable about the axis P, in a determined angular position and thus predefines the desired spacing between the upper chain roller 51 and a reference sprocket. For this purpose, the gearshift mechanism 10 is shifted into a reference gear ratio or onto a reference sprocket, the chain guide 50 is locked, and the base element 20 together with the gearshift mechanism 10 as a whole is rotated rearwards about the rear-wheel axis A until the ideal chain tension is attained.

iv) In the set position, the plug-in axle 7 is tightened, and the locking is released. As a result of the tightening of the plug-in axle 7, the inner arm 22a is clamped between the hub end cap 4 and the adapter 60. In this way, the arm 22a together with the base element 20 as a whole and the gearshift mechanism 10 is aligned orthogonally with respect to the hub end cap 4 or with respect to the rear-wheel axis A. Any frame tolerances no longer play a role with regard to this alignment.

This simple setting is possible only owing to the coaxial installation of the gearshift mechanism 10 with respect to the axis of rotation A and the resulting constant spacing between a reference sprocket and the locked upper chain roller 51. In the case of a non-coaxially installed gearshift mechanism RD, the spacing between the upper chain roller and a reference sprocket would change during a rotation about the B axis, spaced apart from the rear-wheel axis A, of the base element (cf. FIG. 13).

When the plug-in axle 7 has been tightened, the base element 20 is also rotationally fixed relative to the frame 1. Only the pivot mechanism 30, the movable element 40 and the chain guide arrangement 50 of the gearshift mechanism 10 still move relative to the frame 1 during shifting. During uninstallation, the plug-in axle 7 is released, such that the gearshift mechanism 10 can rotate rearwards again and the rear wheel can be removed.

Figure 11:
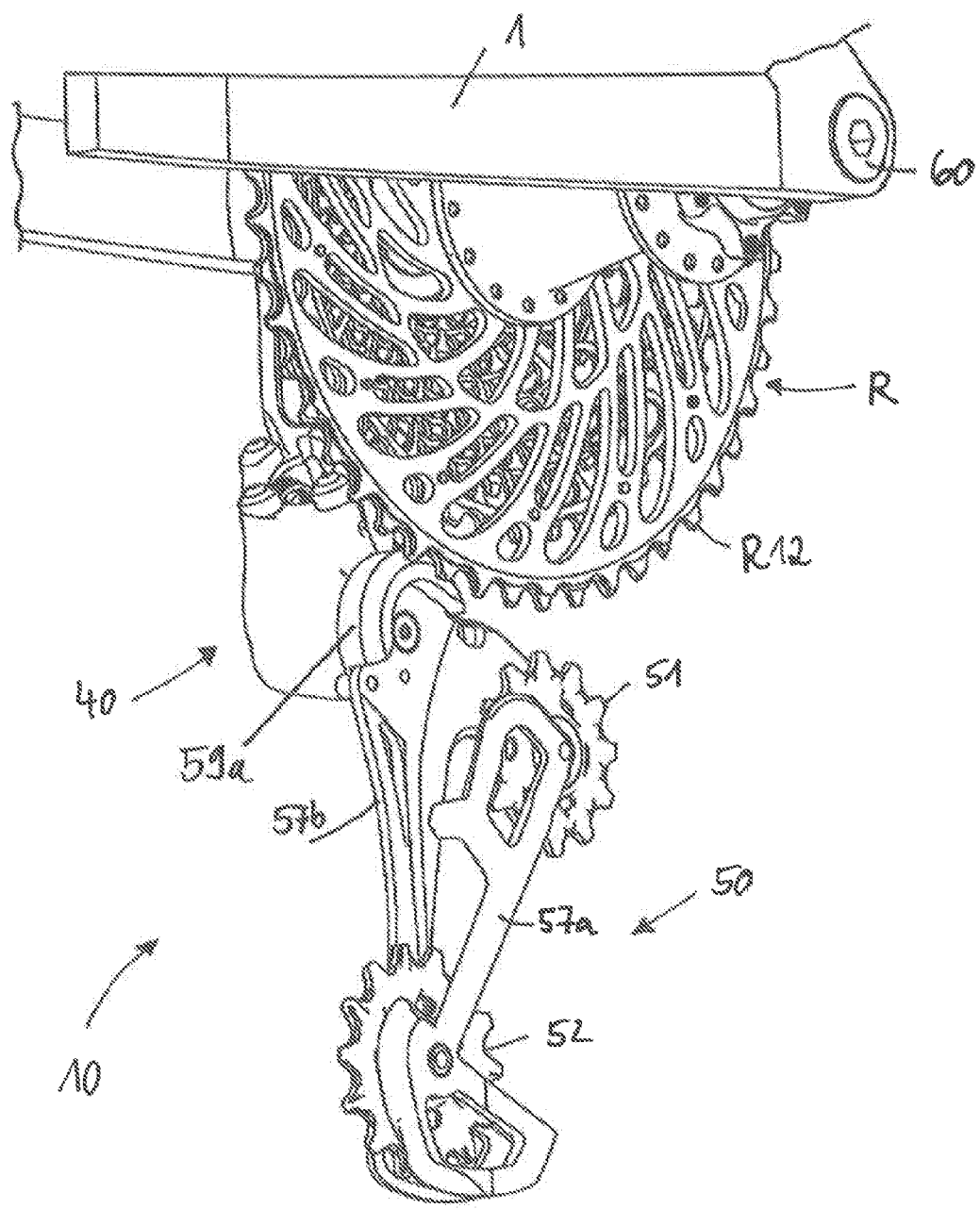
Figure 12:
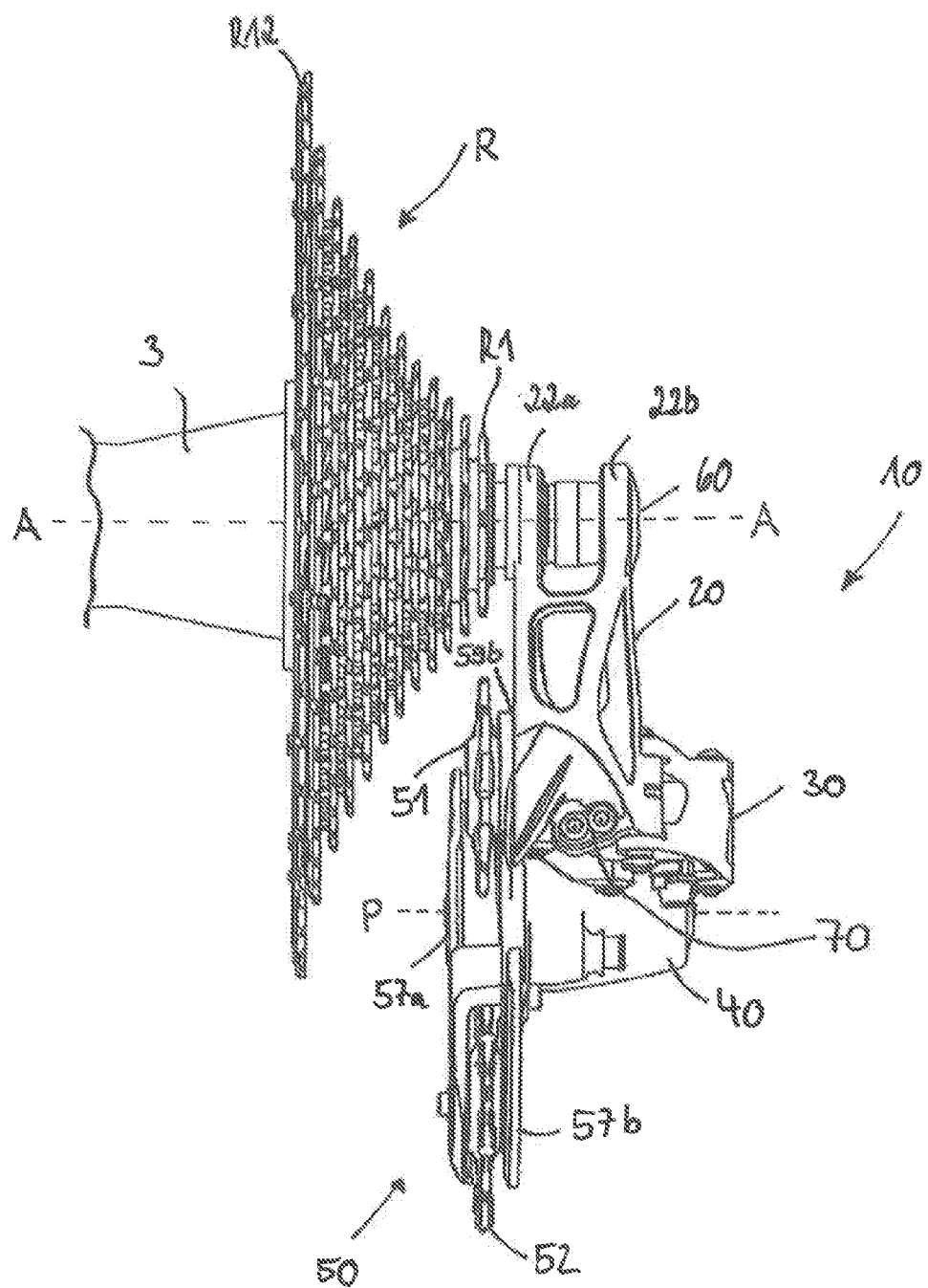

FIGS. 11 and 12 show third exemplary embodiments of the gearshift mechanism 10 according to the invention with limit abutments 59a and 59b, which make it possible to omit the conventional limit screws 70. For illustrative purposes, the limit screws 70 are still illustrated in FIG. 12.

In FIG. 11, the gearshift mechanism 10 is aligned with the largest sprocket R12 of the sprocket assembly R. This position constitutes the inner maximum position. The gearshift mechanism 10 should move no further inwards in an axial direction. For this purpose, the first limit abutment 59a is arranged on the chain guide arrangement 50, in particular on the inner side of the outer cage half 57b. The first limit abutment 59a is designed so as to interact with the largest sprocket R12. For this purpose, the inner limit abutment 59a projects beyond the cage 57b in the region of the P axis and, in the inner maximum position, abuts against the outer side of the sprocket R12. The chain guide arrangement 50 can then be moved no further inwards in an axial direction relative to the largest sprocket R12.

In other words, in the inner maximum position of the gearshift mechanism 10, the outer cage half 57b of the chain guide arrangement 50 extends in a radial direction into a region of the largest sprocket R12 which is situated within the radial outer diameter of the largest sprocket R12. In the inner maximum position of the gearshift mechanism 10, the outer cage half 57b extends in an axial direction between the largest sprocket R12 and the next smaller sprocket R11 adjacent thereto. In the inner maximum position of the gearshift mechanism 10, a chain (not shown here) engages with the largest sprocket R12. If the gearshift mechanism 10 is moved further inwards in an axial direction beyond the inner maximum position, the outer cage half 57b or the inner limit abutment 59a abuts against the largest sprocket R12 and thus limits the movement of the gearshift mechanism 10. The inner limit abutment 59a is in this case formed in one piece with the outer cage half 57b. Multi-part embodiments of cage and limit abutment are likewise conceivable.

Alternatively, instead of the cage arrangement, it is also possible for the movable element (P knuckle) to be designed so as to act as an inner limit abutment in the intended inner maximum position of the gearshift mechanism. The inner limit abutment interacts with the sprocket assembly, in particular with a sprocket or with some other suitable element assigned to the sprocket assembly, for example a chain guard disk.

In FIG. 12, the gearshift mechanism 10 is aligned with the smallest sprocket R1 of the sprocket assembly R. In relation to FIG. 11, the chain guide arrangement 50 has been rotated much further rearwards (clockwise). The upper chain guide roller 51 has approximately the same spacing in a radial direction to the sprocket R1 as it has to the sprocket R12 in FIG. 12. The position shown constitutes the outer maximum position of the gearshift mechanism 10. The gearshift mechanism 10 should move no further outwards in an axial direction. For this purpose, the second limit abutment 59b is arranged on the chain guide arrangement 50, in particular on the outer side of the outer cage half 57b. The second limit abutment 59a is designed so as to interact with the base element 20. More specifically, the outer side of the outer cage half 57b acts as a second limit abutment 59b in the region of the upper chain guide roller 51. In the outer maximum position, the second limit abutment 59b abuts against the inner side of the base element 20. The inner side of the base element 20 is simultaneously the inner side of the first arm 22a. The chain guide arrangement 50 can then be moved no further outwards in an axial direction relative to the base element 20.

An advantage of the limit abutments 59a, 59b is that these fixed abutments no longer have to be set, but rather are already adapted to the sprocket assembly R. The limit screws 70 for setting the abutments are no longer necessary.

The advantages of the gearshift mechanism 10 according to the invention are particularly great specifically in conjunction with the sprocket assembly R illustrated in FIGS. 11 and 12 with a large number of twelve sprockets R1-R12 and a large spread from in this case ten teeth on the smallest sprocket R1 and 50 teeth on the largest sprocket R12.

Figure 14:
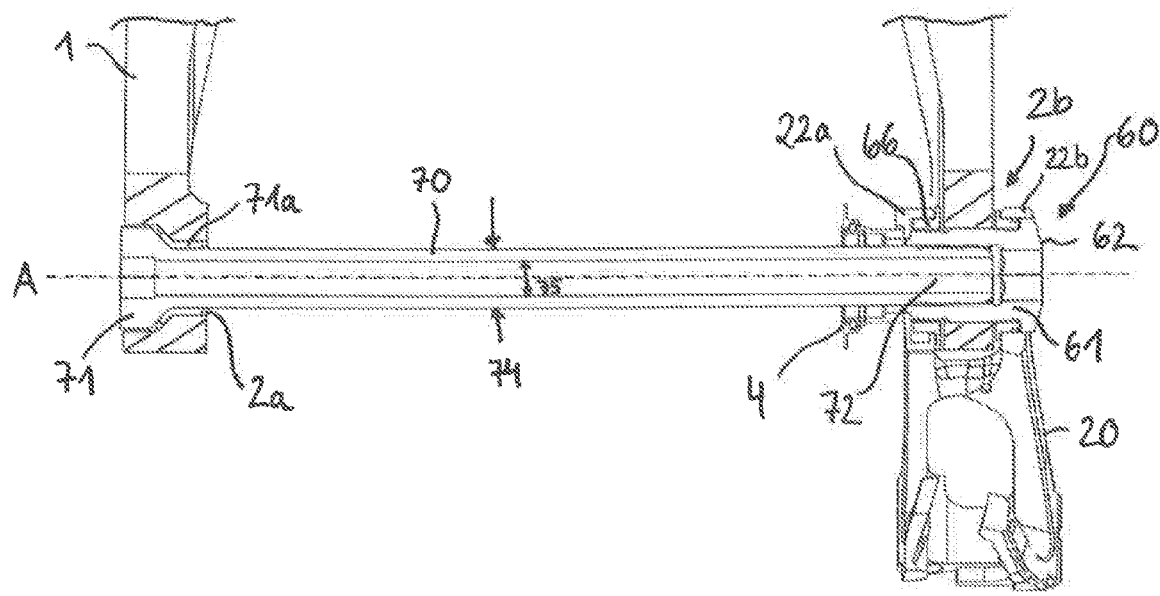

FIG. 14 is a sectional illustration of a fourth exemplary embodiment along the axis A in a rear view. For better clarity, this illustration shows only the frame 1, the plug-in axle 70, the right-hand hub end cap 4, and selected parts of the gearshift mechanism. All of the parts that are shown are illustrated in section.

The base element 20 is fastened to the right-hand dropout by means of the adapter 60. For this purpose, the bolt 61 engages through the right-hand frame opening 2b and is screwed together with the nut 66. The plug-in axle 70 is inserted with its first end 71 into the left-hand frame opening 2a and is screwed with its second end 72 into the bolt 61 of the adapter 60. The adapter 60 or the bolt 61 simultaneously serves as a counternut for the plug-in axle 70. When the plug-in axle 70 is tightened, it is screwed further into the bolt 61 and clamps the latter relative to the frame 1. The outer diameter 74 of the plug-in axle 70 is dimensioned to be smaller than the frame opening 2a. The intermediate space is compensated by means of a bushing 71a. The first plug-in axle end 71 has a head with a diameter larger than the frame opening 2a, and cannot slip through the frame opening 2a. The head diameter decreases continuously, from the first end 71 towards the body or shank of the plug-in axle 70, to the outer diameter 74. The transition runs at a 45 degree angle. Other angular dimensions, in particular 90 degrees, are likewise conceivable. As in the preceding exemplary embodiments, the inner arm 22a of the base element 20 is fixed in an axial direction between the right-hand hub end cap 4 and the bolt 61. Furthermore, the inner arm 22a of the base element 20 is centered in a radial direction on the centering region of the bolt 61 (cf. details in FIGS. 7 and 8) and the outer arm 22b is centered on the bolt head 62. The plug-in axle 70 which is shown has an outer diameter 74 of 12 mm and an inner diameter 75 of 7 mm. This yields a plug-in axle wall thickness of 2.5 mm. The exemplary embodiment of the plug-in axle 70 in FIG. 14 corresponds substantially to the previous figures, but here is shown once again directly alongside a plug-in axle 80 as per FIG. 15a with an enlarged outer diameter 84 and a different centering arrangement.

Figure 15A:
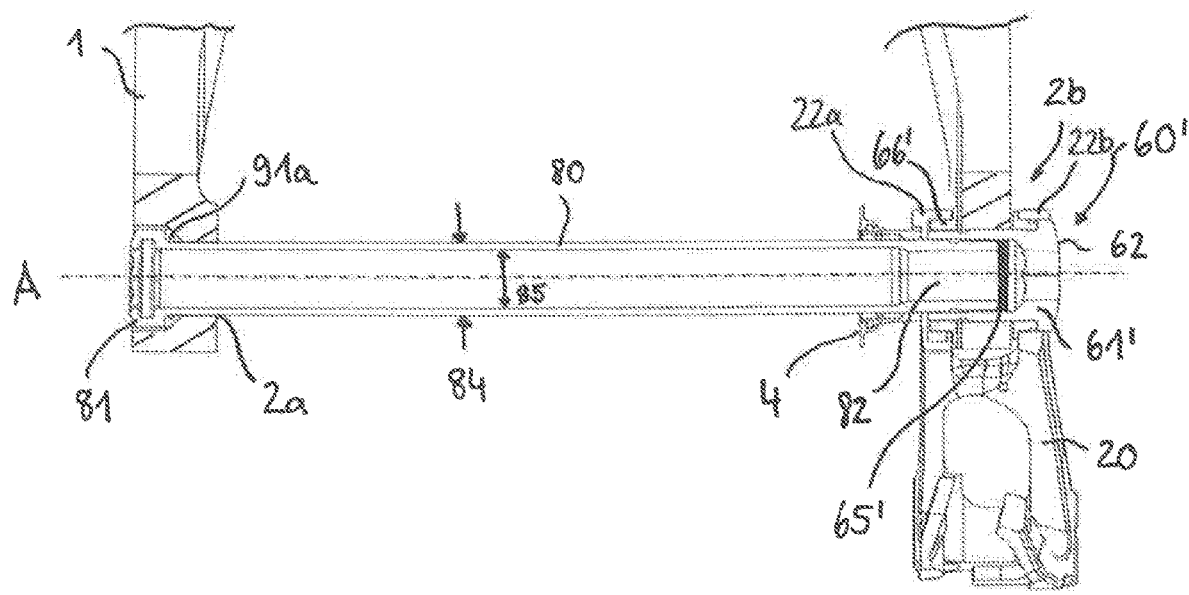
FIG. 15*a* is a sectional illustration of a fourth design variant (fifth embodiment) of the rear gearshift mechanism of the new (second) type in a state installed on the bicycle frame.

FIG. 15a is a sectional illustration of a fifth exemplary embodiment which, owing to the plug-in axle 80 with an enlarged outer diameter 84, differs in several aspects from the previous embodiment. The plug-in axle 80 which is shown has an outer diameter 84 of 15 mm and a first inner diameter 85 of 12 mm. This leads to a first wall thickness W85 of 1.5 mm. All of the parts that are shown are illustrated in section.

The frame 1 with its frame openings 2a and 2b, the in this case only partially shown hub arrangement with the hub end cap 4, and the base element 20 of the gearshift mechanism, are unchanged. Only the adapter 60' has to be adapted to the enlarged outer diameter 84 of the plug-in axle 80. To be able to accommodate the plug-in axle 80, the diameter of the internal thread 65' of the bolt 61' is adapted to the outer diameter 84 thereof. Furthermore, the centering region (cf. centering region 63c of the preceding embodiments) on the bolt 61' is omitted. This has the effect that the base element 20 makes direct contact with the outer circumferential surface of the plug-in axle 80. That is to say, the inner arm 22a of the base element 20 is centered directly on the plug-in axle 80 and not, as in the preceding examples, on the adapter 60. The outer arm 22b of the base element is, in an unchanged manner, centered on the outer circumference of the bolt head 62'. The referencing of the base element 20 in an axial direction and in a radial direction is independent of the frame 1. In an axial direction, the base element 20 is fixed between hub end cap 4 and the adapter 60', in particular the abutment surface 63d' of the bolt 61' (see FIG. 19). In a radial direction, the inner arm 22a of the base element 20 is centered directly on the plug-in axle 80 and the outer arm 22b is centered on the adapter 60', in particular on the bolt head 62'. The substantial independence of frame tolerances permits a precise alignment of the gearshift mechanism even if the two frame openings 2a and 2b are not exactly in alignment. The transition between the head at the first end 81 of the plug-in axle 80 to the plug-in axle body with the outer diameter 84 is in this case right-angled. The outer diameter 84 of the plug-in axle 80 corresponds approximately to the frame opening 2a. The plug-in axle 80 is led with a small amount of play through the opening 2a. The bushing 91a has a 45 degree angle and serves for the centering of the plug-in axle 80 in the frame opening 2a. Said bushing could also be formed with a different angle.

Figure 15B:
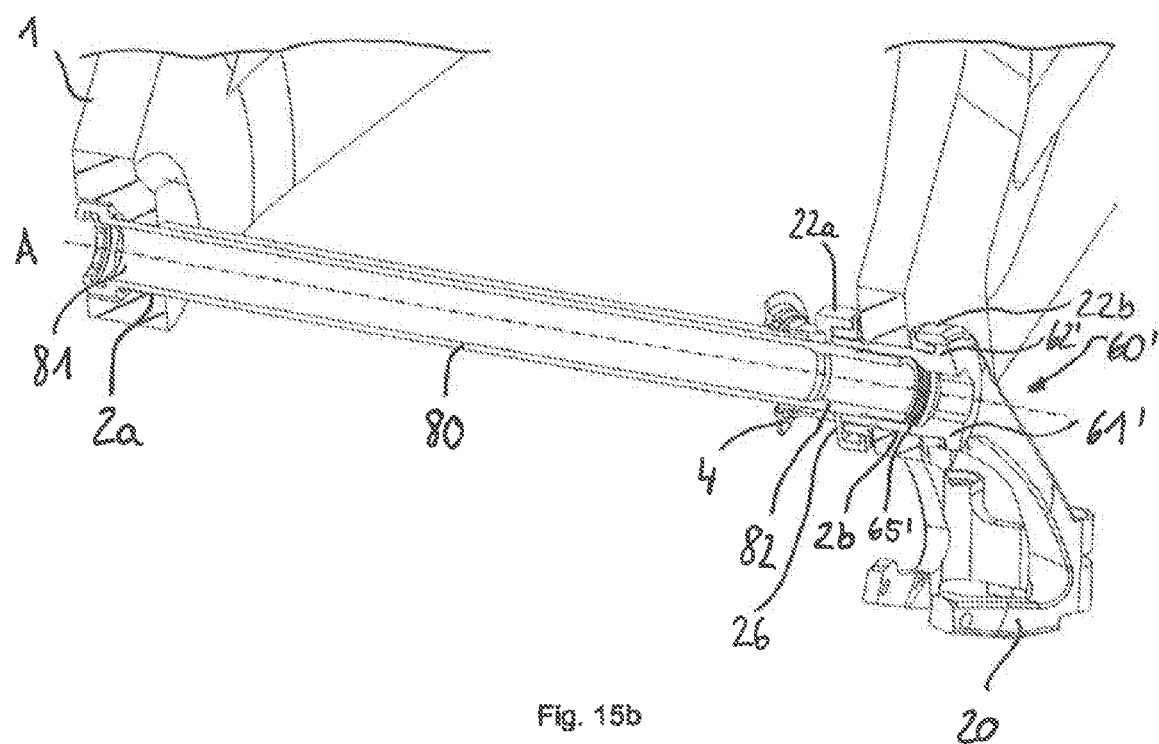
FIG. 15*b* shows a perspective outside view of the gearshift mechanism with an associated adapter as per FIG. 15*a*.

For illustrative purposes, FIG. 15b shows a perspective outside view of the sectional illustration from FIG. 15a. The hub end cap 4 bears axially against the hub abutment surface 26 of the base element 20.

Figure 16:
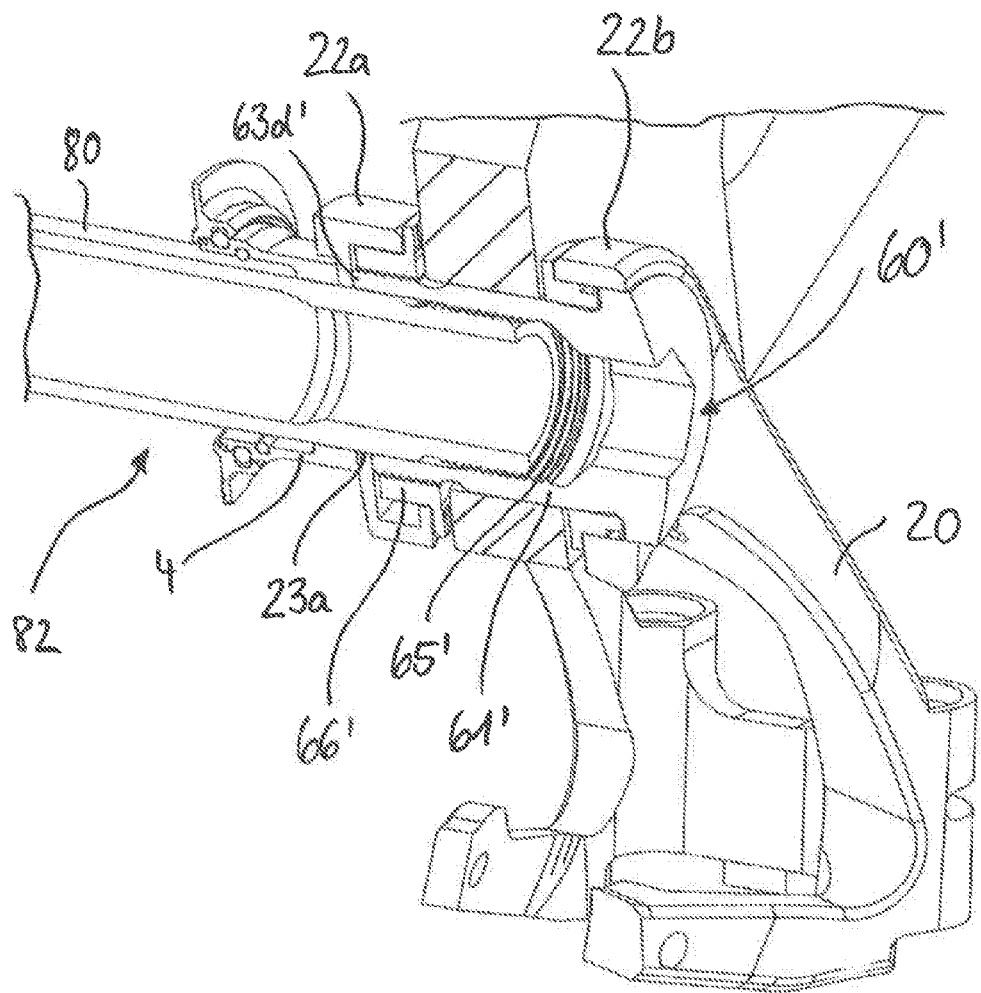

FIG. 16 illustrates an enlarged detail view of the right-hand dropout of the frame 1 from FIG. 15b. The second end 82 of the plug-in axle 80 has been screwed into the internal thread 65' of the bolt 61' of the adapter 60'. Here, the direct contact between base element 20 and plug-in axle 80 is particularly clear. The inner arm 22a of the base element 20 lies with its first centering opening 23a in a radial direction directly on the outer circumference of the plug-in axle 80. In an axial direction, the inner arm 22a is fixed between the hub end cap 4 and the abutment surface 63d' of the bolt 61'. The nut 66' corresponds substantially to the previous exemplary embodiments.

Figure 17:
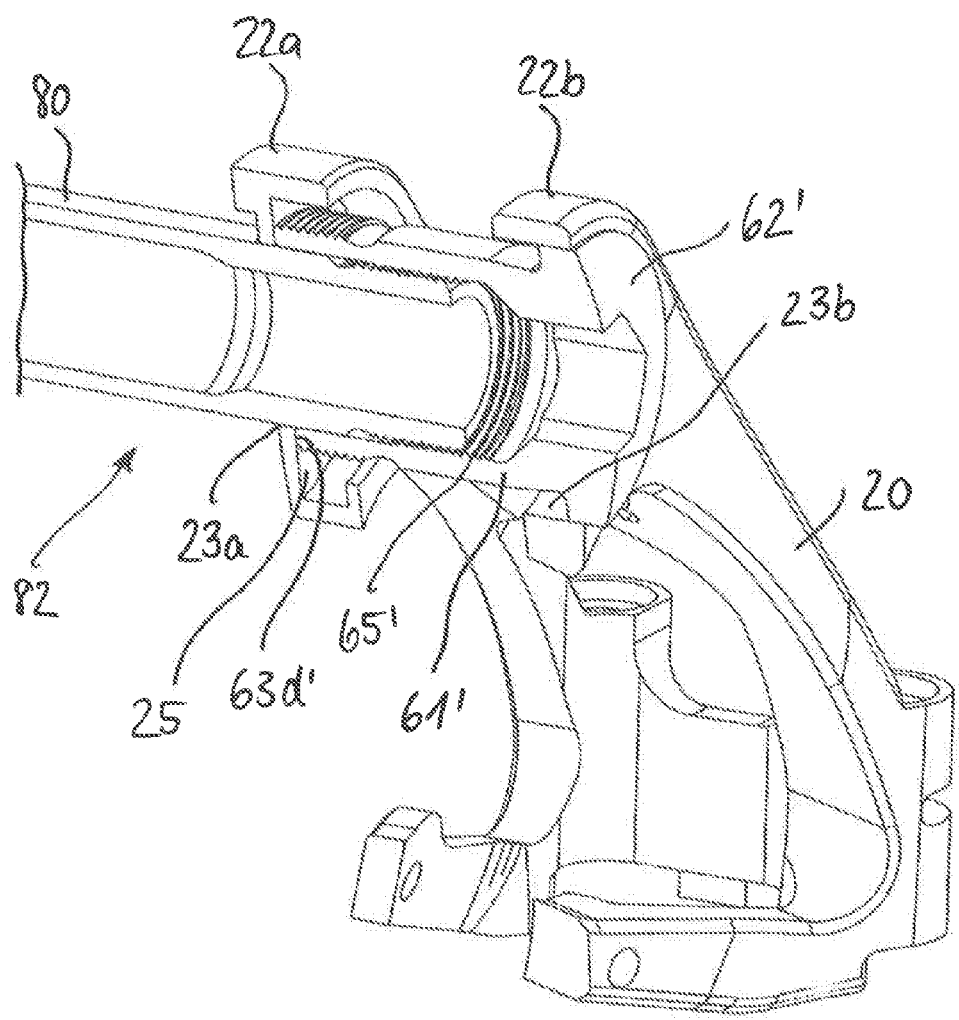

FIG. 17 corresponds to the view from FIG. 16, wherein, for better clarity, the hub end cap and the adapter nut have been omitted. The bolt 61' abuts in an axial direction with its abutment surface 63d' against the counterpart abutment surface 25 of the inner arm 22a. The outer arm 22b of the base element 20 is, in an unchanged manner, centered with its second centering opening 23b on the outer circumference of the bolt head 62'.

Figure 18:
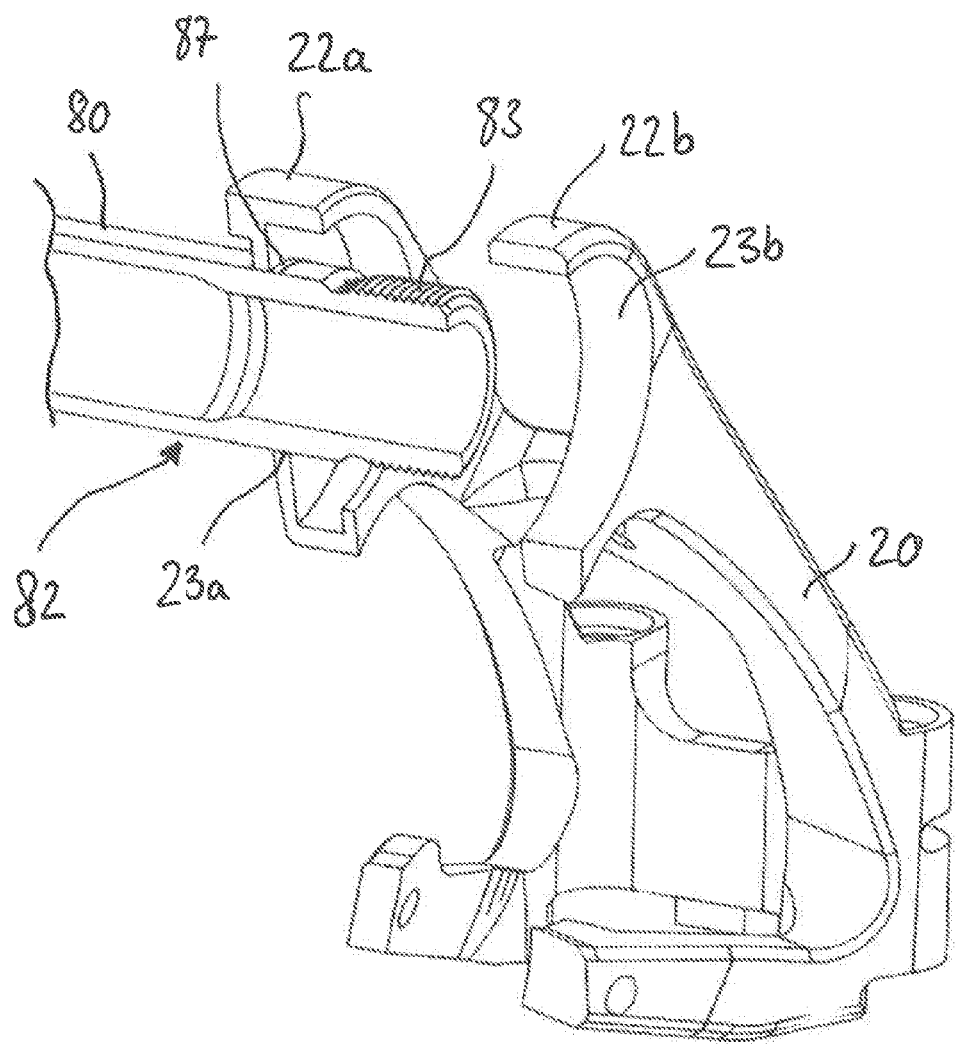

FIG. 18 shows the arrangement from FIG. 17 without the bolt. Here, the centering of the base element 20 on the plug-in axle 80 is particularly clear. The second end 82 of the plug-in axle 20 engages through the inner arm 22a of the base element 20. The external thread 83 of the plug-in axle 80 is, in the installed state, situated between the first and the second arm 22a, 22b of the base element 20. To achieve the most precise possible centering of the base element 20 on the plug-in axle 80, the surface 87 of the plug-in axle 80 has been machined at least in the contact region between base element 20 and plug-in axle 80. Said centering surface 87 is for example subjected to fine turning, is ground and/or is coated. Owing to the cumbersome machining, the centering surface 87 is kept as narrow as possible. The centering surface 87 must however be at least as wide as the first centering opening 23a of the first arm 22a of the base element 20.

In particular, the centering surface 87 of the plug-in axle 80 extends, in the installed state, at least as far as into the region of the bolt 61', such that the bolt foot comes to lie on the centering surface 87. This embodiment permits exact centering of the bolt 61' on the plug-in axle 80. The centering by virtue of the external thread 83 of the plug-in axle 80 being screwed into the internal thread 65' of the bolt 61' is not sufficiently precise on its own, owing to the thread play. The centering surface 87 eliminates the play between bolt 61' and plug-in axle 80. A particularly rigid connection between the plug-in axle 80 and the bolt 61' is thus possible. The centering surface 87 should have a minimum width in order that tolerances can be compensated in accordance with the screwing-in depth, in a manner dependent on the hub arrangement and frame width, and the base element 20 always comes to lie on the surface 87. An axial width of the centering surface 87 of approximately 2.5 mm (or greater) is sufficiently wide, and can be manufactured relatively quickly and inexpensively.

A further centering surface could be formed on the outermost second end of the plug-in axle, which further centering surface likewise interacts with the bolt and leads to an even more rigid connection. The outer surface of particularly high-grade plug-in axles could also be subjected entirely to finish machining.

Figure 19:
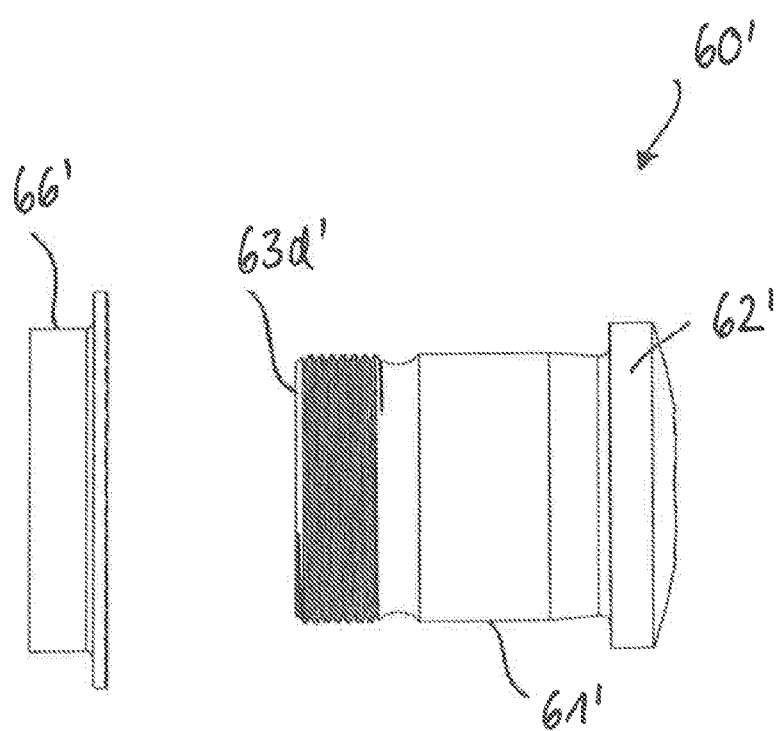

FIG. 19 shows an enlarged exploded illustration in the non-sectional rear view of the adapter 60', composed of the bolt 61' and the nut 66'. The adapter 60' corresponds substantially to the adapter 60 of the preceding exemplary embodiment in FIGS. 1 to 12, for which reason only the differences will be discussed here. The internal thread, which is enlarged in terms of its diameter and adapted to the 15 mm plug-in axle 80, is not visible in the rear view. The abutment 63d' forms the inner axial end of the bolt 61'. The other outer dimensions of the bolt 61' are unchanged and adapted to the base element 20.

Figure 20A:
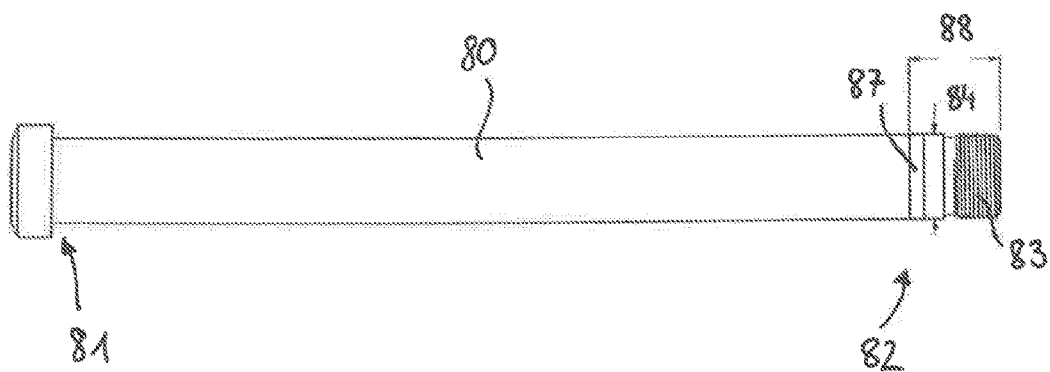
FIG. 20*a* shows a plug-in axle according to the fourth design variant.
Figure 20B:
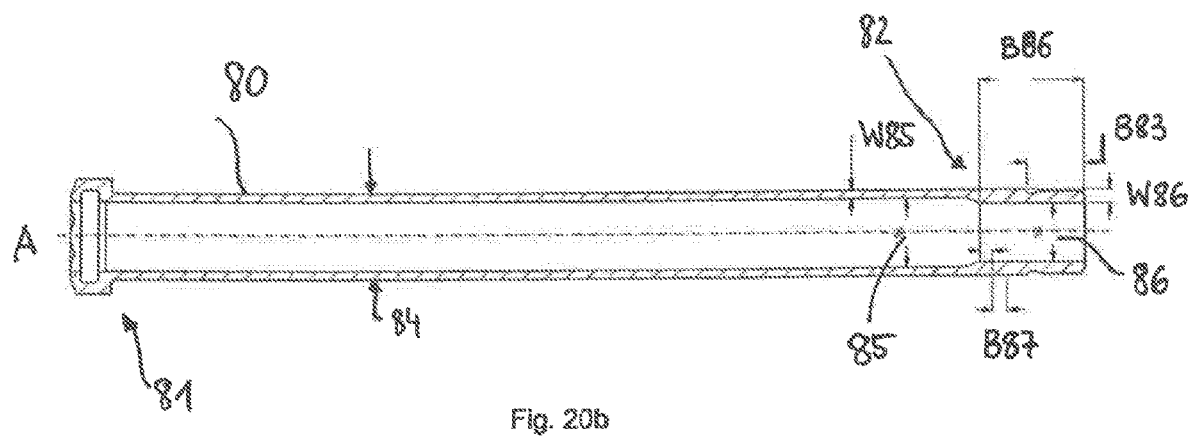
FIG. 20*b* is a sectional illustration of the plug-in axle from FIG. 20*a*.

A plug-in axle 80 according to the fifth exemplary embodiment is shown in a non-sectional rear view in FIG. 20a and in a sectional view along the axis A in FIG. 20b. The plug-in axle 80 has an outer diameter 84 of 15 mm. The axial overall width from the first end 81 to the second end 82 varies in accordance with the hub standard used and the boundary conditions. Typical hub widths from left-hand to right-hand hub end cap are 142 to 148 mm. The external thread 83 and the centering surface 87 are arranged in the region of the second plug-in axle end 82. The centering surface 87 is situated axially further to the inside than the external thread 83. The centering surface 87 begins with a spacing 88 of approximately 13.5 mm, and ends with a spacing 88 of approximately 16 mm, to the second plug-in axle end 82. The centering surface 87 has an axial width B87 of approximately 2.5 mm. The axial width B83 of the external thread 83 amounts to approximately 10 mm.

The plug-in axle 80 has an outer diameter 84 of 15 mm. Only the first end 81 has a relatively large head diameter. A first inner diameter 85 of the plug-in axle 80 amounts to 12 mm. This yields a first wall thickness W85 of approximately 1.5 mm. The first wall thickness W85 extends over a major part of the axial width of the plug-in axle 80. In the region of the second plug-in axle end 82, said plug-in axle has a second inner diameter 86 which amounts to approximately 10 mm. The second inner diameter 86 is smaller than the first inner diameter 85. The second inner diameter 86 yields a second wall thickness W86, which is greater than the first wall thickness W85. In the exemplary embodiment shown, the second wall thickness W86 is dimensioned to be approximately 2.4 mm. The second inner diameter 86 or the enlarged second wall thickness W86 is arranged specifically in those regions of the plug-in axle 80 which are subjected to high load, in particular in the region of the external thread 83. The region of the centering surface 87 also has an increased wall thickness W86, because it is here that the base element 20 lies on the plug-in axle 80 and correspondingly greater forces act. The transition between the first and second inner diameters W85, W86 is continuous. The second inner diameter 86 extends from the outermost second plug-in axle end 82 in an axial direction over a width B86 of approximately 18 mm.

From the first end 81 to the second end 82 of the plug-in axle 80, the following regions are arranged in series: first end 81 with enlarged head diameter, right-angled transition to the outer diameter 84, first inner diameter 85 with the resulting wall thickness W85, transition from the first inner diameter 85 to the second inner diameter 86 with the resulting wall thickness W86, centering surface 87, external thread 86 and second plug-in axle end 82.

Figure 21:
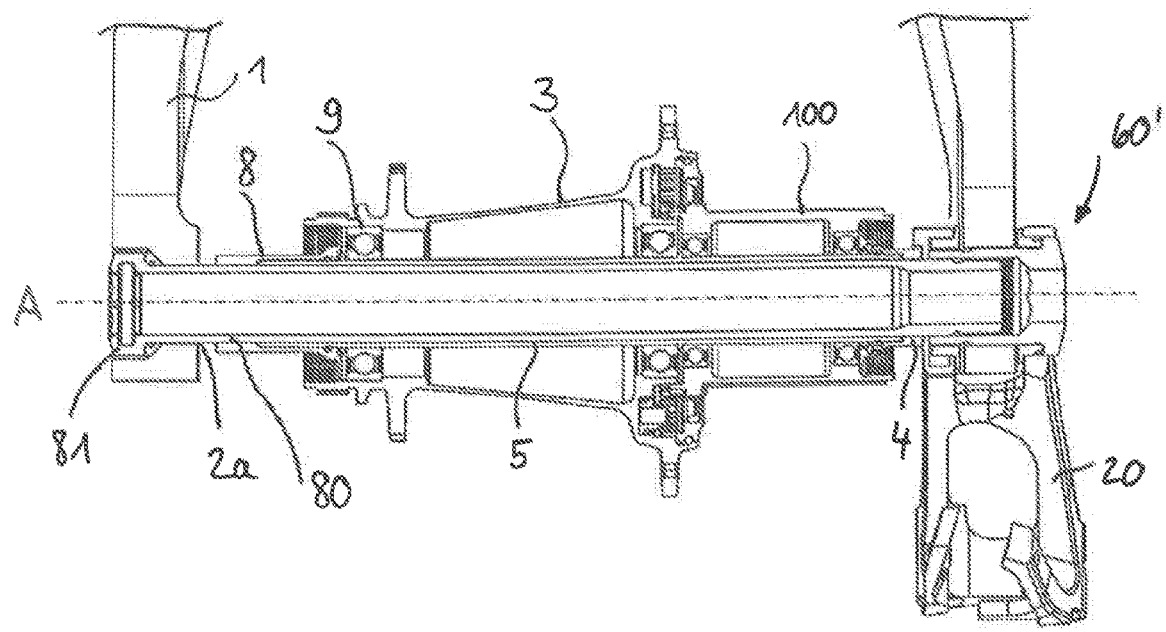

FIG. 21 shows a sectional illustration of a rear-wheel axle arrangement with a plug-in axle 80 as per the fifth exemplary embodiment. All of the parts are illustrated in section. In the installed state, the plug-in axle 80 engages through the frame opening 2a, the hub arrangement and the driver 100, and is screwed into the gearshift mechanism, in particular the adapter 60'. The gearshift mechanism (only partially shown here) is fastened to the right-hand dropout of the frame 1 by means of the base element 20 and the adapter 60'. The hub arrangement is fastened to the frame 1 by means of the plug-in axle 80. By virtue of the plug-in axle 80 being screwed into the thread of the adapter 60', the base element 20 is clamped in an axial direction against the hub arrangement, in particular the right-hand hub end cap 4. If the plug-in axle 80 is removed, the gearshift mechanism together with adapter 60' and base element 20 remains on the frame 1. The hub arrangement comprises inter alia the left-hand hub end cap 8, the hub bearing arrangement 9, the hub sleeve, the hub axle 5 and the right-hand hub end cap 4.

Figure 22:
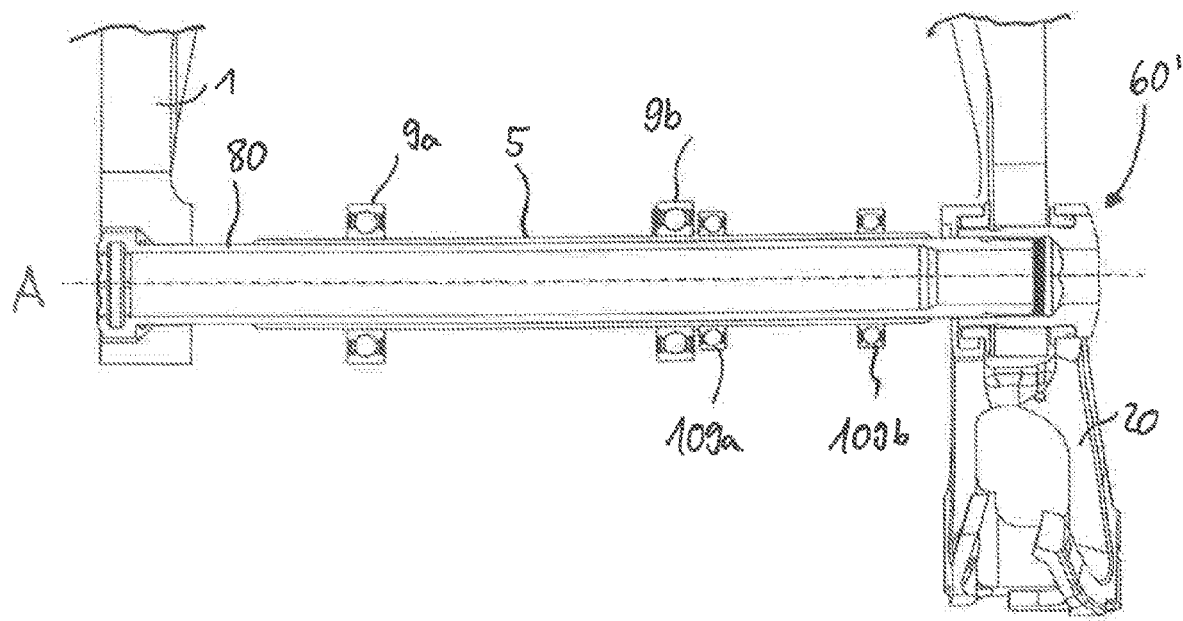

FIG. 22 shows selected parts of the rear-wheel axle arrangement from FIG. 21. For better clarity, the driver and most of the parts of the hub arrangement have been removed here. Only the hub axle 5 and the hub bearing arrangement 9, composed of the hub bearings 9a, 9b in the form of rolling bearings, of the hub arrangement are illustrated. The plug-in axle 80 is inserted with a small amount of play into the hub axle 5. The hub bearings 9a, 9b and the driver bearings 109a, 109b are fitted onto the hub axle 5. All of the parts are illustrated in section.

Figure 23:
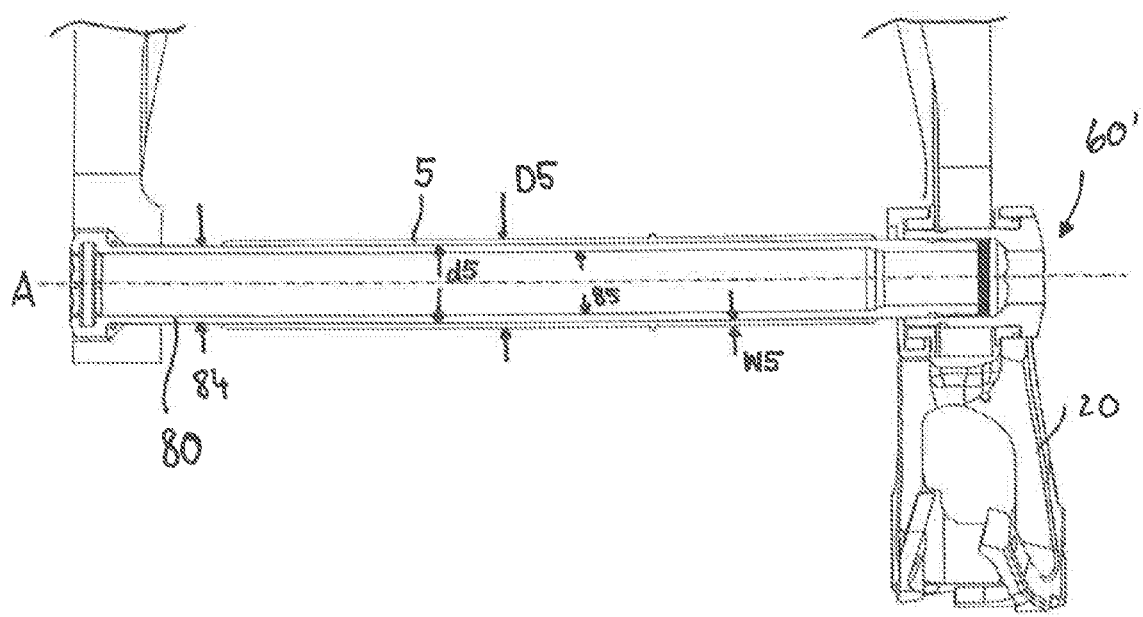

FIG. 23 shows the sectional illustration of the rear-wheel axle arrangement from FIG. 22 without the bearings. The plug-in axle 80 with an outer diameter 84 of 15 mm is inserted with a small amount of play into the hub axle 5. The inner diameter d5 of the hub axle 5 amounts to slightly more than 15 mm. The outer diameter D5 of the hub axle 5 amounts to approximately 17 mm. This yields a wall thickness W5 of the hub axle 5 of approximately 1 mm. The wall thickness W85 of the plug-in axle 80 is greater than the wall thickness W5 of the hub axle 5. In particular, the wall thickness W85 of the plug-in axle 80 amounts to approximately 1.5 mm, and thus to 1.5 times that of the hub axle 5. This leads to a relatively balanced ratio of the second moments of area.

Figure 24A:
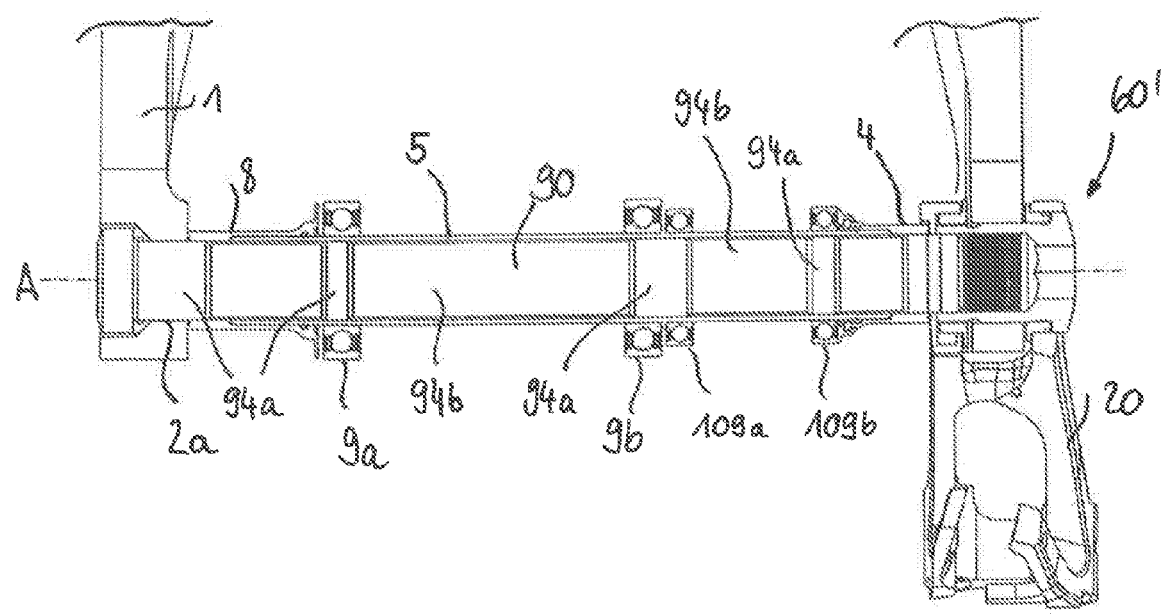
FIG. 24*a* is a partially sectional illustration of selected parts of a rear-wheel axle arrangement with a plug-in axle for use with the rear gearshift mechanism of the new (second) type according to a fifth design variant (sixth embodiment)
Figure 24B:
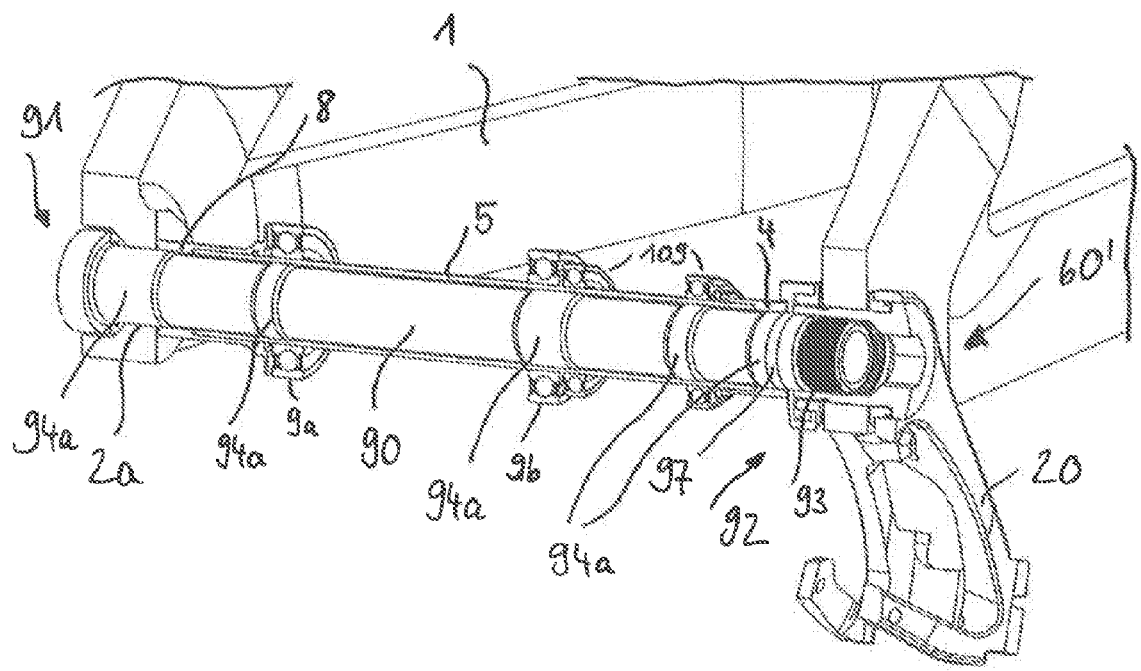
FIG. 24*b* shows a perspective outside view of the arrangement of FIG. 24*a*.

FIG. 24a shows a partial section through selected parts of a rear-wheel axle arrangement having a plug-in axle 90 according to the sixth exemplary embodiment. Aside from the plug-in axle 90, all of the parts are illustrated in section. FIG. 24b shows the partial section from FIG. 24a in a perspective outside view. The plug-in axle 90 engages through the left-hand frame opening 2a, the hub end caps 8, 4 and the hub axle 5 with a small amount of play. The second plug-in axle end 92 is screwed with the external thread 93 into the adapter 60' of the gearshift mechanism. The first outer diameter 94a of the plug-in axle 90 is slightly smaller than the inner diameter of the hub axle 5. In the regions with increased load, the plug-in axle 90 has the first outer diameter 94a. These are in particular the plug-in axle ends 91, 92 and the regions of the bearings 9a, 9b, 109a, 109b. The other regions of the plug-in axle 90 have a second, reduced outer diameter 94b.

Figure 25A:
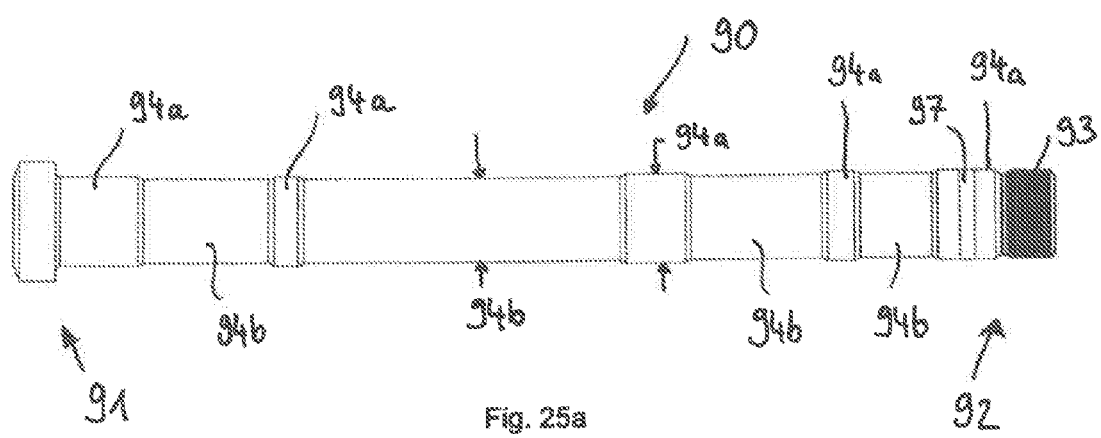
FIG. 25*a* shows the plug-in axle according to the fifth design variant.
Figure 25B:
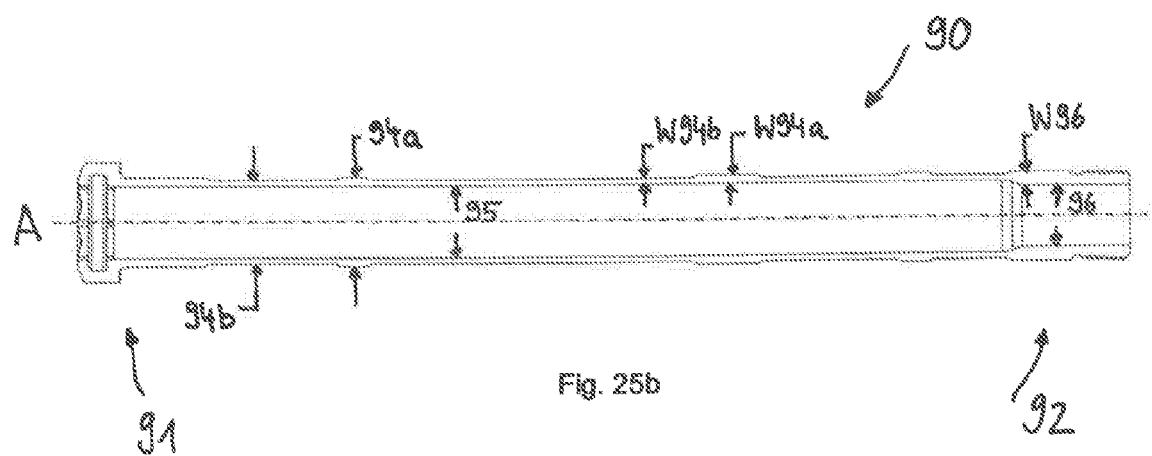
FIG. 25*b* is a sectional illustration of the plug-in axle from FIG. 25*a*.

The plug-in axle 90 according to the sixth embodiment is shown in a non-sectional rear view in FIG. 25a and in a sectional view along the axis A in FIG. 25b.

The plug-in axle 90 differs from the plug-in axle 80 primarily in that it has a reduced wall thickness W94b in extensive regions for the purposes of saving weight. The plug-in axle 90 has a first outer diameter 94a of 15 mm and a first inner diameter 95 of 12 mm. The first outer diameter 94a of 15 mm has been reduced to a second outer diameter 94b of 14 mm. The first inner diameter 95 remains unchanged. This yields a first wall thickness W94a of 1.5 mm in the region of the first outer diameter 94a and a second, reduced wall thickness W94b of 1 mm in the region of the reduced outer diameter 94b. The plug-in axle 90 has the relatively large outer diameter 94a and the relatively large wall thickness W94b only in those axial regions which are subjected to relatively high load.

As in the preceding embodiment, the plug-in axle 90 has, in the region of the second end 92, a second, relatively small inner diameter 96, which amounts to approximately 10 mm. The second inner diameter 96 yields a third wall thickness W96, which is greater than the first and the second wall thickness W94a, W94b. The second inner diameter 96 or the enlarged second wall thickness W96 is arranged in the highly loaded region of the external thread 93 and of the centering surface 97.

From the first end 91 to the second end 92 of the plug-in axle 90, the following regions are arranged in series: first end 91 with enlarged head diameter, right-angled transition to the first outer diameter 94a, first inner diameter 95 with the resulting wall thickness W94a in the relatively highly loaded regions, and in between the reduced outer diameter 94b with the resulting reduced wall thickness W94b, transition from the reduced outer diameter 94b to the second inner diameter 96 with the resulting wall thickness W96, centering surface 97, external thread 96 and second plug-in axle end 92.

The reduced outer diameter 94b can be produced particularly easily by removal of the excess material on the outer side of the plug-in axle 90 by turning.

Alternatively, a reduced wall thickness could also be realized by means of a third, enlarged inner diameter. Here, material is removed or saved on the inner side of the plug-in axle, and not on the outer side. The effect of the weight saving would be the same.

It is basically to be noted that the plug-in axles 80, 90 with an enlarged outer diameter of 15 mm have, despite a relatively small wall thickness of 1 mm to 2 mm, a greatly increased second moment of area in relation to the plug-in axles 70 with a 12 mm outer diameter. The stiffness is increased and/or the weight is reduced.

In relation to conventional rear-wheel axle arrangements, it is possible with the plug-in axle 80 according to the fifth exemplary embodiment to achieve a second moment of area of the overall system which is greater by approximately 30%, and at the same time a weight which is lower by approximately 21%.

A further exemplary embodiment which is not shown here, and which could be used specifically for electric bicycles, is a plug-in axle with an outer diameter of 15 mm and an inner diameter of 11 mm. In relation to conventional rear-wheel axle arrangements for electric bicycles with a considerably greater wall thickness, the second moment of area is duly reduced somewhat, but a considerable weight saving is achieved. In addition, the more uniform distribution of the second moment of area on the plug-in axle and hub axle leads to an altogether more stable axle arrangement, because the maximum stresses at the outer skin of the hub axle are lower.

A further factor is the distribution of tensile and compressive stresses, which are superposed on the bending stresses. The tensile and compressive stresses are also dependent on the thread pitch of the external thread of the plug-in axle. A thread pitch of 1 mm axial movement per revolution has proven to be advantageous in the case of a conventional tightening moment. A thread pitch of 1.5 mm would be less advantageous because, with the same tightening moment, a lower tensile stress is built up in the plug-in axle. The tensile stress in the plug-in axle equates to the compressive stress in the hub axle. There is a high compressive stress on the hub axle because the latter has a thinner wall thickness or a smaller cross section.

Through the selection of the material, it is possible to further influence both the stiffness and the weight. Preferred materials for the plug-in axle are aluminum, titanium or steel.

The modular system permits a simple and inexpensive exchange of the plug-in axle 70, 80, 90. Depending on bicycle type and load, it is possible for either a relatively stiff or relatively lightweight plug-in axle to be selected. Only the adapter 60, 60' has to be adapted to the selected plug-in axle 70, 80, 90, and the hub arrangement, the driver 100, the base element 20 and the remaining parts of the gearshift mechanism can be utilized unchanged and are not influenced by the change of the plug-in axle.

The wall thicknesses of the hub and plug-in axles mentioned in the exemplary embodiments described above are configured for manufacturing from aluminum. The statements made relating to the second moment of area continue to apply irrespective of the material. As long as the same material is used for the plug-in axle and the hub axle, the stated wall thickness ratios can be maintained.

If different materials are used for the hub axle and the plug-in axle, the wall thicknesses can be adapted in accordance with the maximum stresses. For example, a plug-in axle composed of titanium and a hub axle composed of aluminum could be manufactured. It would then be possible for the plug-in axle to be of thinner-walled design in accordance with the admissible yield strengths.

It is to be noted that the above-described design variants of the rear gearshift mechanism according to the invention of the new (second) type 10 can scarcely be installed on a conventional bicycle frame which is designed for the attachment of a conventional rear gearshift mechanism by means of a derailleur hanger non-coaxially with respect to the axle. A rear gearshift mechanism according to the invention of the new type (hereinafter referred to primarily as rear gearshift mechanism of the second type) will thus not be able to replace the conventional rear gearshift mechanism of the bicycle as per FIG. 13 (hereinafter referred to primarily as rear gearshift mechanism of the first type). Aside from the rear gearshift mechanism 10 of the second type, it is then also not possible for associated components, such as specifically the adapter 60, to be installed on the conventional frame of FIG. 13. The plug-in axle 7, the hollow axle 5 and the hub end cap 4 and thus the entire hub arrangement and consequently the rear wheel of the described embodiments will also, owing to the lack of installability of the adapter 60, not be able to be installed on the conventional bicycle frame of FIG. 13.

The invention based on the rear gearshift mechanism of the second type thus entails a special design of the bicycle frame 1 to be used therewith at its rear bracket portions (dropouts) for the rear-wheel axle arrangement in order to enable the adapter 60 to be installed and in order to enable the first arm 22a, arranged at the inside, of the base element 20 together with the other components, associated with or assigned to the hub, to be received and installed between the dropouts. It is to be noted here that, in the case of an expertly dimensioned embodiment, the first arm 20a of the base element 20 will generally be axially thicker (for example with an axial thickness in the range from approximately 7 to 9 mm, more specifically for example with an axial thickness of approximately 8 mm, in each case with conventional tolerances) than a conventional derailleur hanger to be positioned on the inner side of the associated dropout, which derailleur hanger could typically have an axial thickness of approximately 4.5 to 5.5 mm, for example an axial thickness of approximately 5 mm. Proceeding from the frame of FIG. 13, it is thus not only necessary for the right-hand dropout to be further developed according to the invention such that the adapter can be installed into a frame opening, but it is also necessary for the axial spacing of the two dropouts to be enlarged if the same rear-wheel axle arrangement is taken as a basis for both types of rear gearshift mechanisms. In the case of a plug-in axle assumed here, the axial spacing between the abutment elements, which accommodate the clamping forces between the dropouts, of the rear-wheel axle arrangement (for example the ends of the hollow axle or the so-called hub end caps or axle nuts or similar functional parts) could typically amount to approximately 142 mm, to give an example for this also.

The present invention thus provides not only the rear gearshift mechanism 10 of the second type with the adapter 60 as advantageous innovations, but at least implicitly also the bicycle frame 1 provided for the installation of the adapter 60 and of the rear gearshift mechanism 10 of the second type. On the basis of these components, the invention provides a set of components, and here, with reference to FIGS. 1 to 12 and 14 to 26, discloses multiple exemplary embodiments for such a set, which each comprise at least one rear gearshift mechanism 10 of the second type, at least one adapter 60 and one bicycle frame 1 suitable for the installation of these components. The respective set of components may also include the associated further components of the hub and rear-wheel axle arrangement, such as the plug-in axle 7, the hollow axle 5 and the hub end cap 4 of the embodiment of FIGS. 1 to 9b or the corresponding components of the other embodiments. On the basis of such a set of components, it is possible to provide a bicycle which is equipped with a derailleur system implemented with a rear gearshift mechanism of the second type.

As stated, the conventional bicycle frame as per FIG. 13 can scarcely be equipped with a rear gearshift mechanism of the second type. Conversely, the bicycle frame provided by means of the invention and designed for the installation of the rear gearshift mechanism of the second type can scarcely be equipped with a rear gearshift mechanism of the first type, at least using a conventional derailleur hanger. Specifically, a conventional derailleur hanger will not have an axial thickness sufficient to be able to impart, between the dropouts, the clamping force required for clamping the rear-wheel axle arrangement. Also, in the case of conventional derailleur hangers, owing to a lack of suitable interrelated interfaces of the derailleur hanger, on the one hand, and of the associated dropout, on the other hand, said derailleur hangers are scarcely positionable, and correctly installable, in a fitting manner on the inner side of the dropout.

Figure 26:
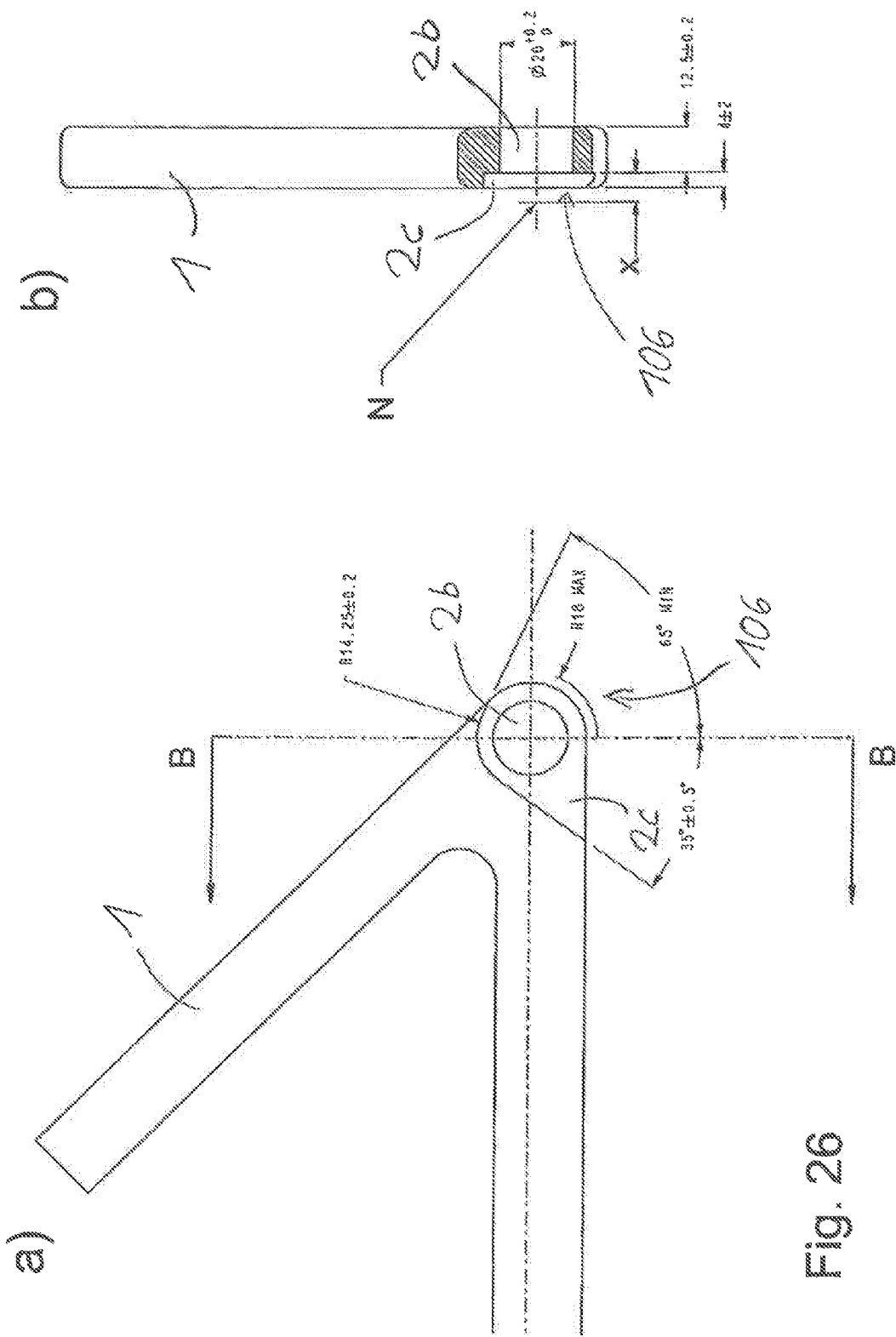

FIG. 26 shows an example of a preferred embodiment of the rear right-hand dropout of a bicycle frame which is provided for the installation of the rear gearshift mechanism according to the invention of the new (second) type. An installation opening 2b with an opening diameter of approximately 20 mm is provided, which, forming a perpendicular body edge on the inner side, widens to form a receiving aperture 2c which forms an interface for the first (inner) arm 22a of the base element 22. The aperture 2c may for example have an axial depth of approximately 4 mm, and that region of the dropout which has the opening 2b may for example have an axial depth of approximately 12.5 mm, corresponding to an overall thickness of the dropout end in said region of approximately 16.5 mm. In accordance with the above-mentioned design possibilities, with regard to the axial dimension x between the body edge, which delimits the aperture 2c in regions, and the abutment element N, which accommodates the clamping force between the dropouts, of the rear-wheel axle arrangement (for example the facing end of the hollow axle or hub end cap or axle nut or a similar functional part), an axial spacing of approximately 7 to 9 mm, more specifically for example an axial spacing of approximately 8 mm, between the body edge and the abutment element N is envisaged for the first (inner) arm 20a of the base element 20. Specifically, a thickness of 8 mm for the first arm of the base element 20, that is to say a dimension x of 8 mm, is particularly favored. The first arm 20a is preferably designed in the region of the aperture 2c such that, in the not yet tightened, pre-installed state, a rotatability of the base element 20 over a certain angle range relative to the adapter 60 received in the installation opening 2b, or relative to the dropout, is realized, as described above.

According to the invention, a set of components provided by the invention now additionally also comprises a rear gearshift mechanism of the conventional first type (for example as per FIG. 13), and an associated derailleur hanger, which permits correct installation of the rear gearshift mechanism of the first type on the frame which is in fact provided for the installation of a rear gearshift mechanism of the second type. For this purpose, the invention specifically provides the derailleur hanger (also referred to here as bracket element) which performs, as it were, an adapter function for adapting the rear gearshift mechanism of the first type to the bicycle frame designed for the installation of the rear gearshift mechanism of the second type. Such a derailleur hanger provided by the invention is however also advantageous and of interest independently of this adapter function, such that, according to an aspect which is independent of the provision of the rear gearshift mechanism of the second type and of the associated bicycle frame, the invention also proposes this derailleur hanger generally for the non-coaxial installation, in relation to the rear-wheel axle, of conventional rear gearshift mechanisms (of the first type) on a bicycle frame. Such a bicycle frame does not need to be suitable for the installation of a rear gearshift mechanism of the second type.

Figure 27:
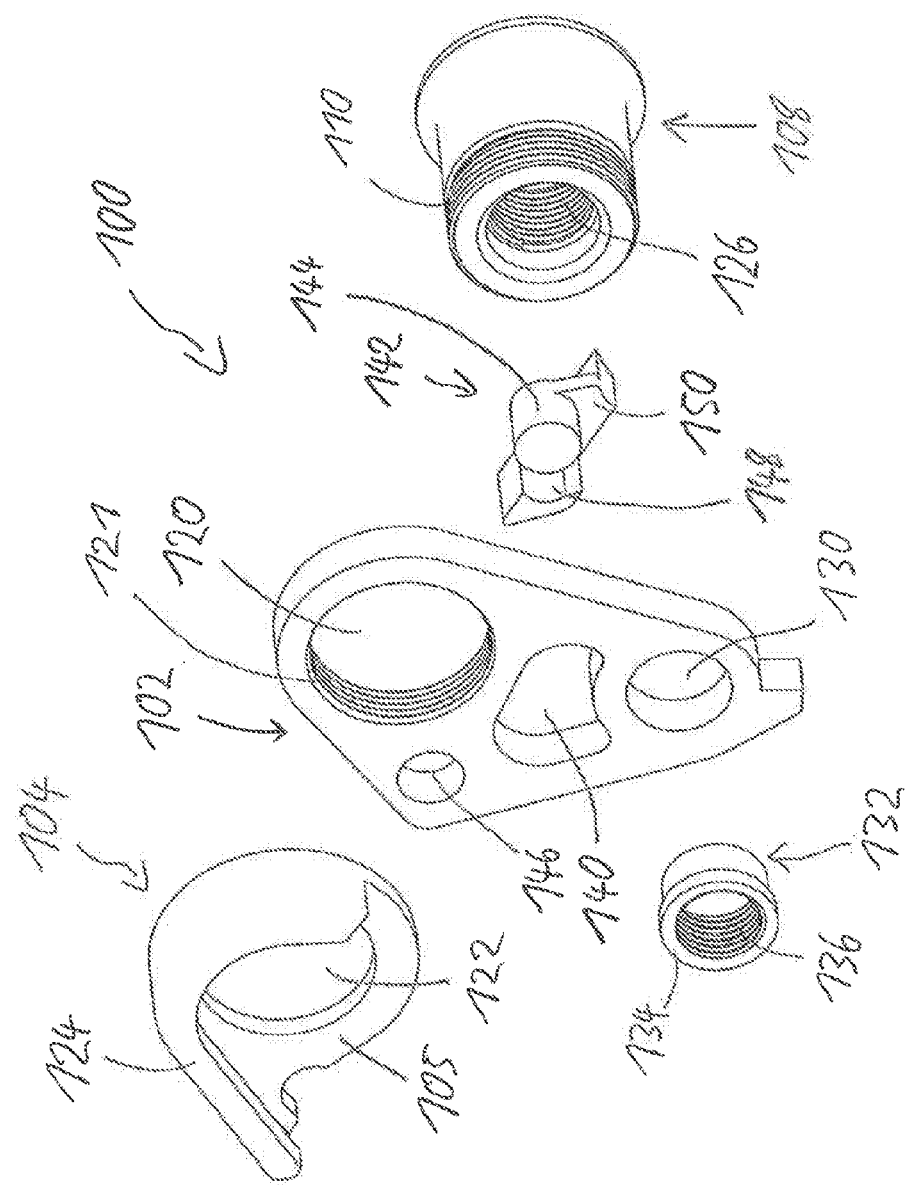
Figure 28:
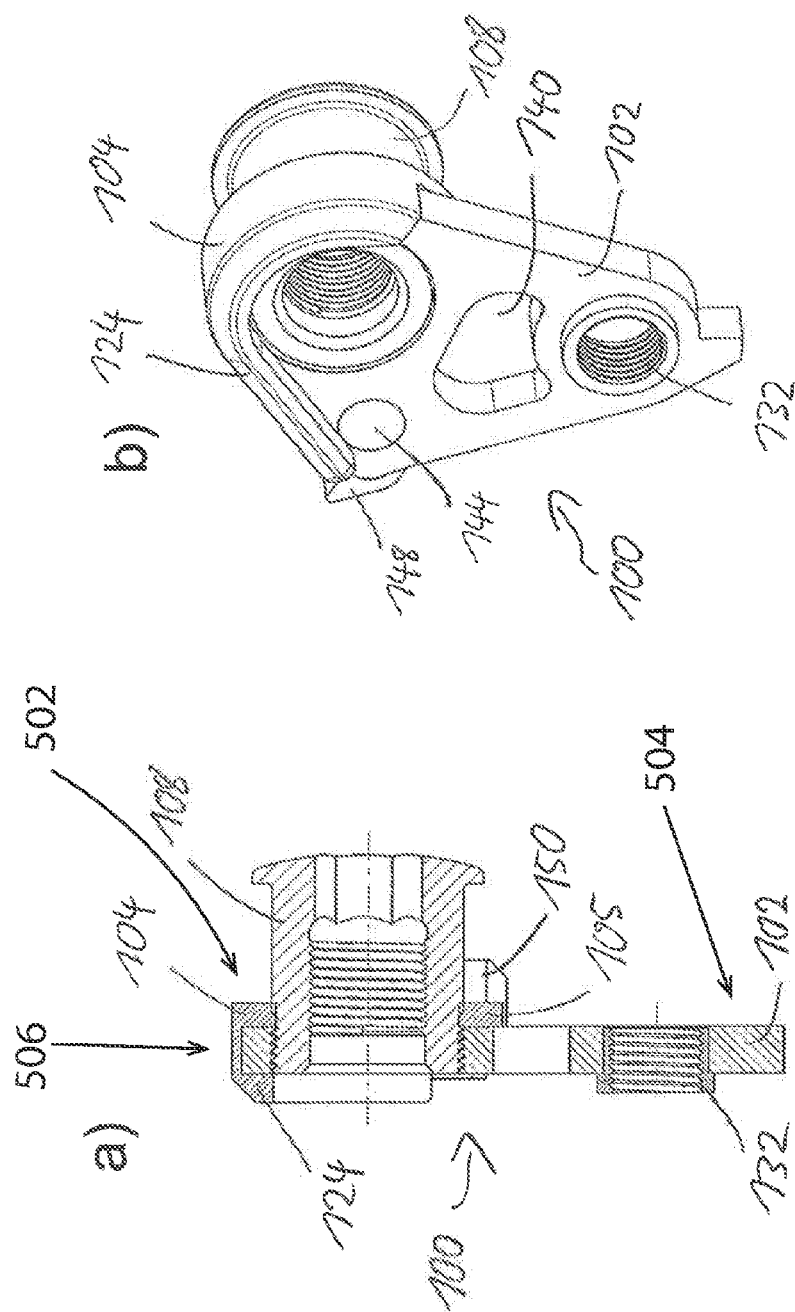

FIGS. 27 and 28 show a preferred exemplary embodiment of a bracket element or derailleur hanger 100 according to the invention. According to this exemplary embodiment, the derailleur hanger 100 is advantageously of multi-part design, having a lug-like metal part 102 and having a spacer part 104 which increases the axial thickness of the derailleur hanger 100 in the region of the clamping between the bracket portions or dropouts of the frame, which spacer part has a spacer portion 105 which lies on the inner side of the metal part. In the present case, according to a particularly preferred but not imperative embodiment, the spacer part as designed as a plastics part, and can perform not only the function of adapting the axial thickness to the circumstances of the respective bicycle frame, but also advantageous additional functions, as are realized in this initial example.

Accordingly, the spacer part or plastics part 104 serves for adaptation to the interface of the associated rear dropout 106 of the frame. Referring to the example of FIG. 26, the plastics part 104 serves for adaptation to the geometry of the aperture 2c. For this purpose, the plastics part 104 has an outer circumference which just fits into the inner circumference of the aperture 2c, such that the derailleur hanger 100, when in the installed state on the frame, is secured against rotation relative to the frame. The fastening of the derailleur hanger 100 to the frame is realized by means of a stud-bolt-like adapter 108 which, from the outer side of the frame, is screwed with its external thread portion 110 into an internal thread 121 of an installation opening 120 of the metal part 102 and which, for this purpose, extends through an associated passage opening 122 of the spacer portion 105 of the plastics part 104.

The plastics part 104 has a collar 124 which projects in an axial direction towards the other rear dropout and which serves as an installation and positioning aid for the hub arrangement, or the hollow axle thereof, during the course of the installation of the rear wheel. For this purpose, the collar 124, which is coherent in unipartite fashion with the spacer portion 105 and which engages over an edge of the metal part 102, provides a guide and positioning surface on which the hollow axle can slide in order for the latter to be moved into the correct position, in which the installation can then be completed by virtue of the associated inner axle, designed preferably as a plug-in axle, being inserted through the hollow axle and the plug-in axle being screwed together with the adapter 108. Here, the plug-in axle is screwed with a screwing-in end into an internal thread 126 of the adapter 108, similarly to the situation during the described installation of a rear gearshift mechanism of the new (second) type.

In a manner known per se, the metal part 102 has a holding opening 130 in a lower region, into which holding opening a screw-in sleeve 132, 232, 432 is fixed, for example is held by means of an interference fit. The screw-in sleeve 132, 232, 432 has, on an axially inner end, a radially projecting collar 134 234 which is seated on the inner side of the metal part 102 and which thus makes it possible for the base element of a rear gearshift mechanism of the conventional (first) type to be screwed firmly onto the outer side of the metal part 102 in a manner known per se. The screw connection is realized with the internal thread 136, 236 of the screw-in sleeve 132, 232, 432. Depending on the thickness and material of the metal part 102, it would however also be possible for a screw connection to an internal thread of the holding opening 130 to be provided, with the screw-in sleeve being omitted.

As is realized in the exemplary embodiment, the metal part 102 may have one or more openings or apertures which serve for saving weight. Such an opening 140 is shown in the figures in a central region of the derailleur hanger 100. Depending on the interface of the rear dropout, at least one further additional part, assigned to the derailleur hanger, may be provided, as illustrated in the initial example on the basis of the additional part 142, also referred to as auxiliary part. This may likewise be a plastics part. In the initial example, the auxiliary part 142 is designed with a holding portion 144, 244, which is inserted into a holding opening 146, provided adjacent to the installation opening 120, of the metal part 102. Said auxiliary part 142 likewise serves for adaptation to the interface of the dropout, and specifically for supporting, on the frame, rotational forces which act on the derailleur hanger relative to the dropout. For this purpose, the auxiliary part 142 has adaptation and abutment portions 148 and 150 which project from the holding portion 144, 244.

With regard to one type of lug-like metal part 102, it is possible for multiple alternative spacer parts 104 and/or multiple alternative auxiliary parts 142 to be provided in order to be able to adapt to different frame interfaces. It would accordingly be possible for the spacer parts 124, in particular plastics parts 124, to have different axial thicknesses of the spacer portion 105 and differently designed collars 124.

The metal part 102, which constitutes the load-bearing part of the derailleur hanger 100, is preferably designed as a punched part, and is punched for example out of sheet metal with a thickness of approximately 5 mm. It is generally envisaged for the wall thickness ratios to be configured such that even high-grade alloys (for example AL 7075 T6) can be processed. In a typical failure situation, specifically bending or breakage of the metal part 102 in the region between the hub axle and the base element of the gearshift mechanism, only the universal and cheap punched part 102 has to be exchanged. The above-discussed opening 140 in the central region of the metal part 102 can also perform a targeted weakening function in order to provide a type of predetermined breaking point or predetermined bending point for the metal part 102, such that damage at some other location, specifically of the gearshift mechanism and of the bicycle frame, are avoided as far as possible.

With reference to the bicycle frame of FIG. 26, it is proposed that the common axial thickness of the metal part 102 with the spacer portion 105 corresponds exactly to the axial spacing dimension x, such that the derailleur hanger 100 can replace the first (inner) arm 20a of the base element 20 of the new (second) type, ensuring substantially identical clamping and tightening conditions. In the initial example of FIGS. 27 and 28, the inner end of the adapter 108, which can also be referred to as axle bolt, is flush with the inner side of the metal part 102. The abutment element N of the rear-wheel axle arrangement can then abut against the inner end of the adapter 108 and/or against the inner side of the metal part 102. The abutment element N preferably abuts against an abutment surface of the inner end of the adapter 108.

It is also possible for alternative types of adapters or axle bolts 108 to be provided in order to provide an adaptation to different plug-in axles, for example to a plug-in axle with a diameter of 12 mm and alternatively to a plug-in axle with a diameter of 15 mm.

Figure 29:
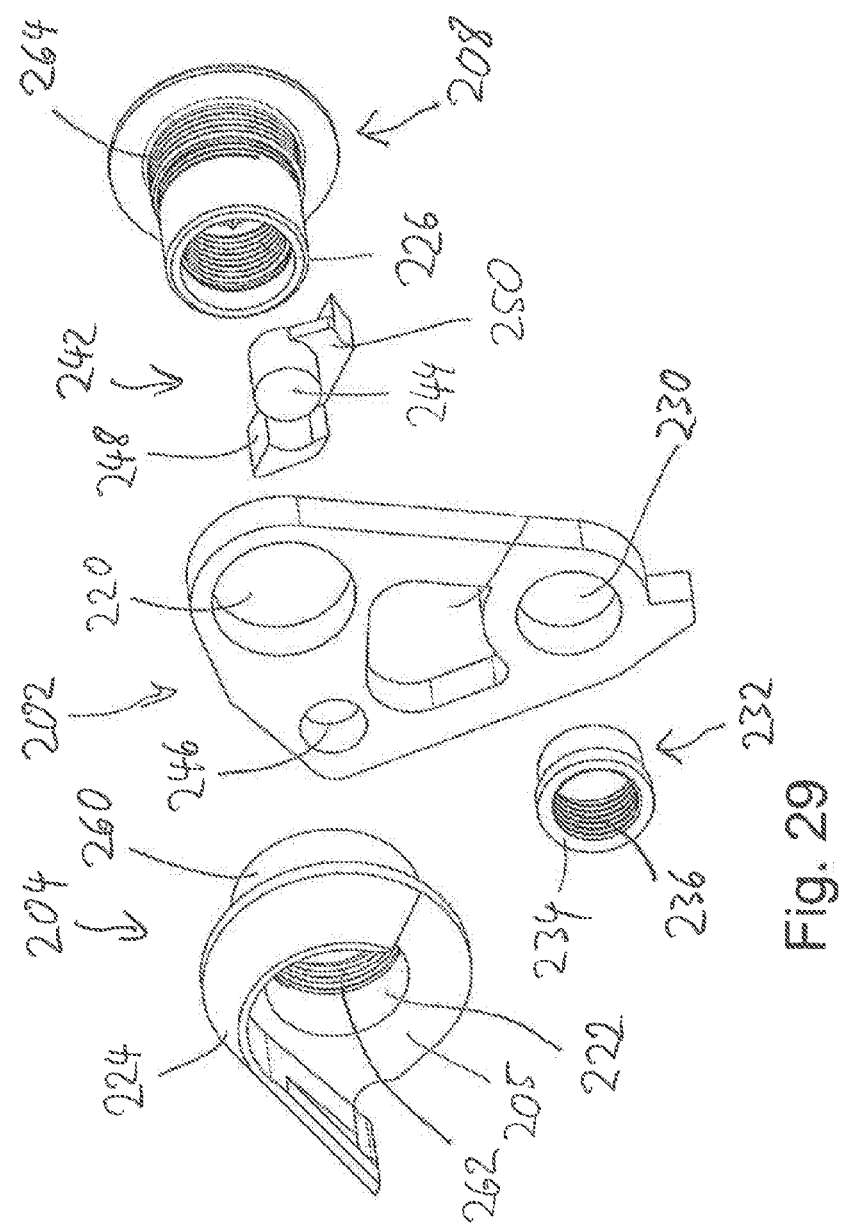
Figure 30:
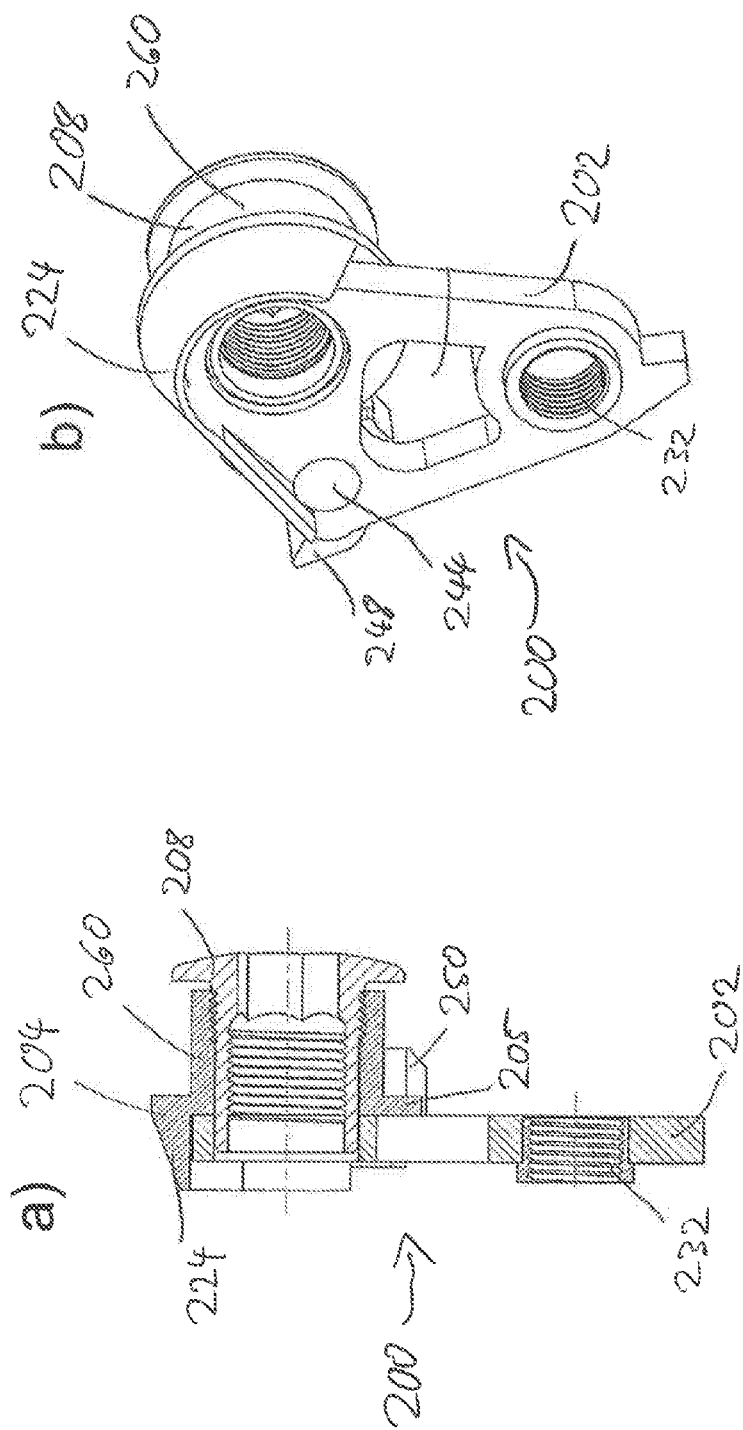

FIGS. 29 and 30 show a further exemplary embodiment. In these figures, in relation to FIGS. 27 and 28, the same reference designations have been used having been increased in each case by 100, and only the differences in relation to the exemplary embodiment of FIGS. 27 and 28 will be discussed below.

In this exemplary embodiment, the internal thread in the opening 220 of the metal part 202 has been omitted. Instead, the spacer part 204, in particular plastics part 204, has been implemented with a sleeve portion 260, which is provided for being inserted or is inserted, possibly is provided for being led through or is led through, the associated frame opening 2b, and which has an internal thread 262, into which an external thread 264 of the adapter or axle bolt 208 is screwed.

Instead of the clamping of the plastics part 104 at its spacer portion 105 between the frame and the metal part 102 by means of the adapter 108, as is provided in the exemplary embodiment of FIGS. 27 and 28, direct fixed clamping of the plastics part 204 on the frame by means of the adapter 208 is realized. Here, the metal part 202 is not fixedly clamped by means of the adapter 208. The plastics part 204 however holds the metal part in a defined rotational position in relation to the dropout of the frame. The clamping of the metal part 202 is realized in the installed state by means of the plug-in axle and the abutment element N, which abuts against the metal part 202, of the rear-wheel axle arrangement. The inner end of the adapter 108 is not flush with the inner side of the metal part 202, but rather is offset somewhat in relation thereto in an outwards direction. Owing to the omission of the internal thread in the opening 220 of the metal part 202, a cost reduction is realized, and, owing to a reduction of the wall thickness of the adapter 208, a weight reduction in relation to the exemplary embodiment of FIGS. 27 and 28 is realized.

Figure 31:
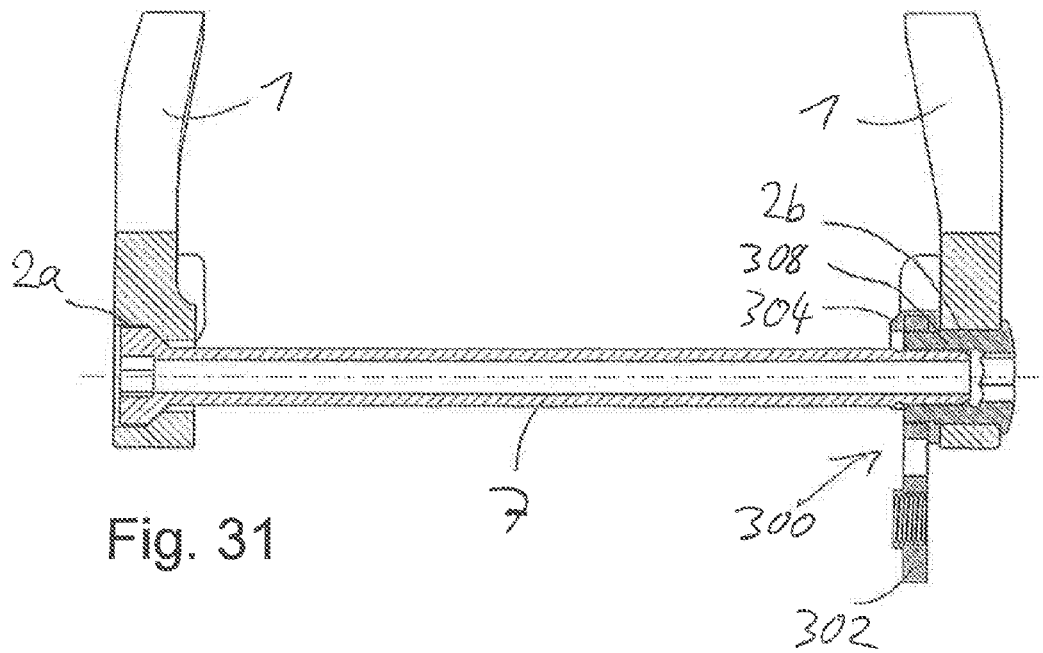
Figure 32:
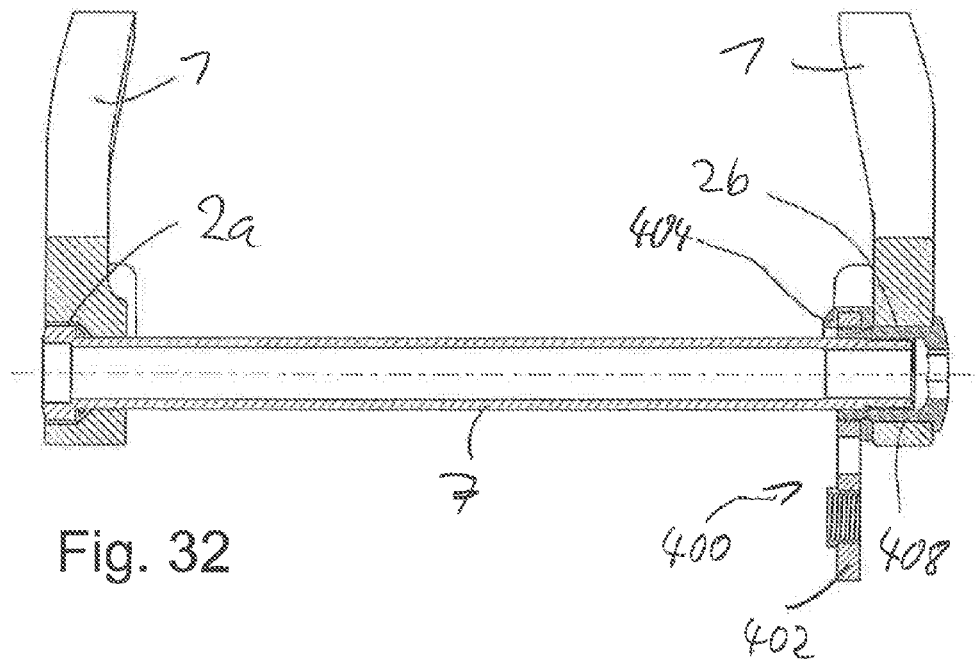
Figure 33:
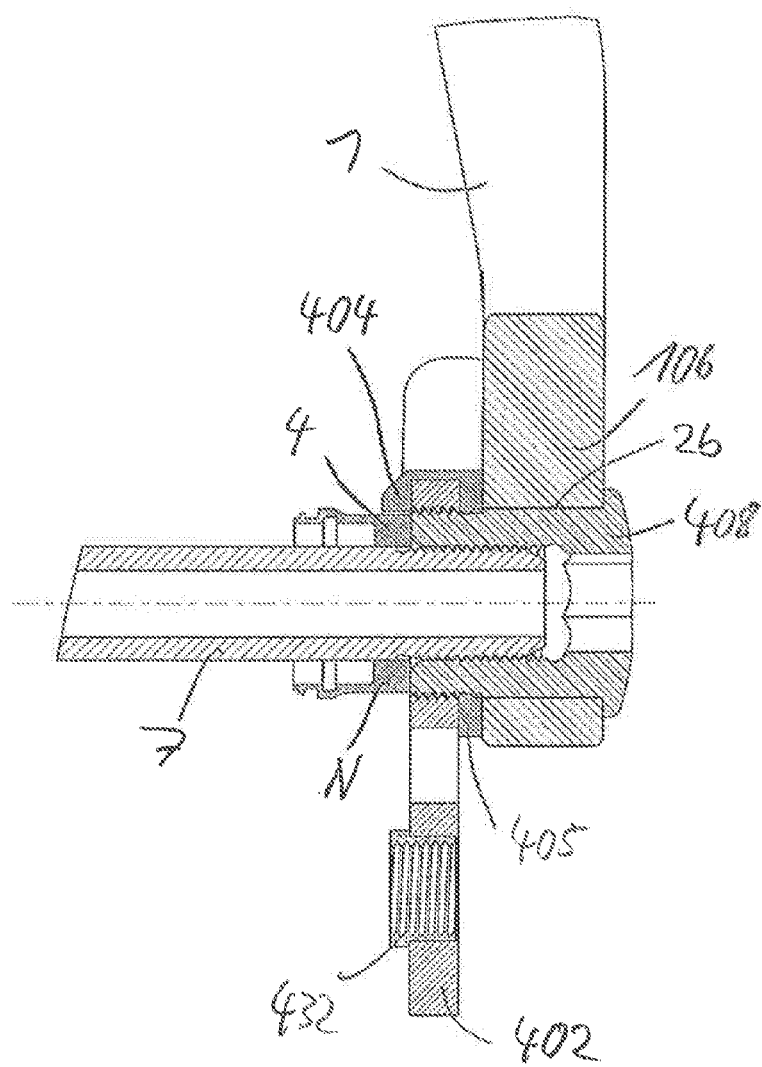

FIGS. 31 and 32 show two further design variants of a bracket element or derailleur hanger 300 or 400, which are of very similar design to the embodiment of FIGS. 27 and 28. The frame 1 is, at its rear right-hand dropout, of slightly different design than in the exemplary embodiment of FIG. 26. A plug-in axle 7 inserted through a left-hand frame opening 2a and screwed together with the adapter 308 or 408 inserted into the right-hand frame opening 2b is shown in each case, which plug-in axles differ by different outer diameters and wall thicknesses. Accordingly, the wall thicknesses of the adapters 308 and 408 are also different. FIG. 33 is an enlarged illustration of the region of the right-hand dropout, wherein a hub end cap 4 as abutment element N of the rear-wheel axle arrangement is additionally illustrated. The hub end cap 4 bears against an inner abutment surface on the inner end of the adapter 408 and supports the acting clamping force on said adapter, which in turn supports the clamping force via the metal part 402 and the spacer portion 405 of the plastics part 404 on the inner side of the dropout of the frame 1.

With regard to the components of the derailleur hanger or bracket element 304 and 404, FIGS. 31 to 33 again use the reference designations of the preceding exemplary embodiments, in each case increased by 100. The numerically single-digit reference designations refer to components corresponding to the exemplary embodiments of FIGS. 1 to 26.

By means of the derailleur hanger or bracket element according to the invention, it is possible for a conventional rear gearshift mechanism of the discussed first type to be installed reliably and in the correct position on a bicycle frame which is in fact provided for the installation of a rear gearshift mechanism of the discussed new second type. From the above description, it should however have become clear that a bracket element or derailleur hanger according to the invention is also advantageous independently of a rear gearshift mechanism of the second type and of a bicycle frame designed specifically for the same, and is thus to be regarded as an independent aspect of the invention. Aspects which are of particular interest, because they are generally advantageous, are in this case inter alia the different axial thicknesses of the bracket element, which is preferably of multi-part design, the adaptation of a lug-like metal part, which performs the actual load-bearing function, by means of at least one associated additional part composed in particular of plastic, and the different ways of fastening the bracket element to the frame. With regard to the auxiliary part 142 or 242, which is optionally to be provided, of the exemplary embodiments of FIGS. 27 to 30, reference is additionally made to FIG. 34, which shows an auxiliary part of said type in various views, without restricting the general nature. Depending on the associated dropout interface, such an auxiliary part may also be of an entirely different design.

Without restricting the general nature, the following technical proposals as example embodiments, and/or the following subjects provided in accordance with these proposals, inter alia, are disclosed herein:

1. Set of components for providing a bicycle equipped with a derailleur system, wherein the derailleur system can be implemented selectively with a rear gearshift mechanism of a first type (RD) or with a rear gearshift mechanism of a second type (10), comprising: at least one rear wheel with a stator arrangement (4, 5, 6, 7, 8), which comprises a rear-wheel axle arrangement (4, 5, 6, 7, 8), and with a rotor arrangement (3), which is mounted or mountable so as to be rotatable relative to the stator arrangement and which comprises a rotor hub (3) which bears a sprocket assembly (R) of the derailleur system; at least one bicycle frame (1) which has a left-hand rear bracket portion and a right-hand rear bracket portion for an inner axle (7; 70; 80) of the rear-wheel axle arrangement of the rear wheel, which bracket portions have a predetermined defined axial spacing along a geometrical axis (A) of the inner axle installed on the frame (1) by means of the bracket portions, and which bracket portions form in each case one counterbearing for a component group (4, 5, 8) which is arranged on the inner axle and which in the installed state is clamped between the bracket portions and which comprises an assembly of the stator arrangement; at least one rear gearshift mechanism of the first type (RD) for non-coaxial installation in relation to the geometrical axis (A), comprising: a base element, a motion mechanism, a movable element, and a chain guide arrangement.

The motion mechanism connects the base element to the movable element, and the chain guide arrangement is connected, so as to be rotatable about an axis of rotation, to the movable element, and wherein the base element comprises a first attachment end for installation on the bicycle frame (1) in a manner radially offset with respect to the geometrical axis (A), and a second attachment end for coupling to the motion mechanism.

At least one bracket element (100; 200; 300; 400) which is separate in relation to the bicycle frame (1) and which is positionable on an axial inner side of an associated one of the rear bracket portions and which serves for the installation of the rear gearshift mechanism of the first type (RD) on the bicycle frame (1), wherein, in the case of the rear gearshift mechanism of the first type (RD) being installed on the bicycle frame (1), the bracket element (100; 200; 300; 400) belongs to the component group which in the installed state is clamped between the bracket portions, and an installation opening (130; 230) of the bracket element, by means of which the first attachment end of the base element is fixable to the bracket element, is radially offset with respect to the geometrical axis (A).

At least one rear gearshift mechanism of the second type (10) for coaxial installation in relation to the geometrical axis (A), may include a base element (20),—a motion mechanism (30), a movable element (40), and a chain guide arrangement (50). The motion mechanism (30) connects the base element (20) to the movable element (40), and the chain guide arrangement (50) is connected, so as to be rotatable about an axis of rotation (P), to the movable element (40), and wherein the base element (20) comprises a first attachment end (21) for coaxial installation on the rear-wheel axle (A) and a second attachment end (29) for coupling to the motion mechanism (30), wherein the first attachment end (21) has a clamping portion (22a) which, in the case of the rear gearshift mechanism of the second type (10) being installed on the bicycle frame (1), is positioned on the axial inner side of the associated one of the rear bracket portions and which belongs to the component group which in the installed state is clamped between the bracket portions.

2. Set of components according to proposal 1, characterized in that the first attachment end (21) has a first arm (22a), which forms the clamping portion, and a second arm (22b), which arms are arranged spaced apart from one another in an axial direction, preferably such that the second arm (22b) is positioned on an axial outer side of the frame (1) in the case of the rear gearshift mechanism of the second type (10) being installed on the bicycle frame (1).

3. Set of components according to proposal 1 or 2, characterized by at least one adapter, which adapter is insertable into a frame opening (2b) of that one of the rear bracket portions which is assigned to the bracket element (100; 200; 300; 400) and to the clamping portion (22a), which adapter is fixable by means of a positively locking connection designed preferably as a screw connection to said bracket portion, which adapter is provided, in the case of the rear gearshift mechanism of the first type (RD) being installed on the bicycle frame (1), for engaging into or extending through an associated opening or aperture (120, 122; 220, 222) of the bracket element (100; 200; 300; 400), and which adapter is provided, in the case of the rear gearshift mechanism of the second type (10) being installed on the bicycle frame (1), for engaging into or extending through an associated opening or aperture of the clamping portion (22a) or of the first arm (22a).

4. Set of components according to proposal 1 or 2, characterized by at least one adapter of a first type (108; 208; 308; 408), which adapter of a first type is insertable into a frame opening (2b) of that one of the rear bracket portions which is assigned to the bracket element (100; 200; 300; 400) and to the clamping portion (22a), which adapter of a first type is fixable by means of a positively locking connection designed preferably as a screw connection to said bracket portion, and which adapter of a first type is provided, in the case of the rear gearshift mechanism of the first type (RD) being installed on the bicycle frame (1), for engaging into or extending through an associated opening or aperture (120, 122; 220, 222) of the bracket element, and characterized by at least one adapter of a second type (60), which adapter of a second type is insertable into a frame opening (2b) of that one of the rear bracket portions which is assigned to the bracket element (100; 200; 300; 400) and to the clamping portion (22a), which adapter of a second type is fixable by means of a positively locking connection designed preferably as a screw connection to said bracket portion, and which adapter of a second type is provided, in the case of the rear gearshift mechanism of the second type (10) being installed on the bicycle frame (1), for engaging into or extending through an associated opening or aperture of the clamping portion (22a) or of the first arm (22a).

5. Set of components according to proposal 3 or 4, characterized in that the adapter or the adapter of the first type (108; 208; 308; 408), on the one hand, and the associated opening or aperture (120, 122; 220; 222) of the bracket element (100; 200; 300; 400), on the other hand, are dimensioned relative to one another such that the adapter or the adapter of the first type, in the installed state, centres the bracket element in relation to the geometrical axis (A).

6. Set of components according to proposal 2 and according to any of proposals 3 to 5, characterized in that the adapter or the adapter (60) of the second type, in the case of the rear gearshift mechanism of the second type (10) being installed on the bicycle frame (1), engages into or extends through an associated opening or aperture of the second arm (22b).

7. Set of components according to any of proposals 3 to 6, characterized in that the adapter or the adapter of the second type (60), on the one hand, and the associated opening or aperture of the clamping portion (22a) or first arm (22a) and/or the associated opening or aperture of the second arm (22b), on the other hand, are dimensioned relative to one another such that the adapter or the adapter of the second type (60), in the installed state, centres the attachment end (21) of the base element (20) in relation to the geometrical axis (A).

8. Set of components according to any of proposals 1 to 7, characterized in that, in the installed state, the inner axle (7; 70; 80), which is if desired designed as a quick-release axle or—preferably—as a plug-in axle (7; 70; 80), extends at least in portions through the axial region of the bracket element (100; 200; 300; 400) or of the clamping portion (22a) or first arm (22a), preferably through or into a/the opening or aperture (120, 122; 220, 222) of the bracket element (100; 200; 300; 400) or through or into a/the opening or aperture of the clamping portion (22a) or first arm (22a).

9. Set of components according to proposal 8, characterized in that the inner axle (7; 70; 80) is, at a thread engagement end, screwed or screwable together with an associated thread of the adapter or of the adapter of the first type (108; 208; 308; 408) or of the adapter of the second type (60), wherein, preferably, the clamping force which in the installed state clamps the component group comprising the assembly of the stator arrangement between the bracket portions can be applied by virtue of the thread engagement end being screwed together with the associated thread (65; 126; 226) of the adapter or of the adapter of the first type or of the adapter of the second type.

10. Set of components according to proposal 9, characterized in that the adapter or the adapter of the first type (108; 208; 308; 408) and the bracket element (100; 200; 300; 400) are axially fixable to one another by means of positively locking engagement, for example are screwable to one another, and/or in that the adapter or the adapter of the second type and the clamping portion (22a) or the first arm (22a) are axially fixable to one another by means of positively locking engagement, for example are screwable to one another.

11. Set of components according to any of proposals 8 to 10, characterized in that the plug-in axle (80) has a centring surface on an outer circumference, which centring surface, in the installed state, interacts with a centring surface on an inner circumference of the clamping portion (22a) or first arm (22a) in the region of the opening or aperture thereof for the purposes of centring the base element in relation to the plug-in axle.

12. Set of components according to any of proposals 3 to 11, characterized in that the stator assembly has an abutment element (4) or abutment end which, in the case of the derailleur system being implemented with the rear gearshift mechanism of the first type (RD), bears in the installed state against an abutment surface of the adapter or of the adapter of the first type (108; 308; 408) and supports the acting clamping force on said abutment surface, wherein the adapter or the adapter of the first type supports the clamping force directly or indirectly preferably via the bracket element (100; 300; 400), fixed axially to said adapter, on the associated one of the rear bracket portions, and/or which, in the case of the derailleur system being implemented with the rear gearshift mechanism of the second type (10), bears in the installed state against an abutment surface of the adapter or of the adapter of the second type and supports the acting clamping force on said abutment surface, wherein the adapter or the adapter of the second type supports the clamping force directly or indirectly preferably via the clamping portion or first arm on the associated one of the rear bracket portions.

13. Set of components according to proposal 12, characterized in that, in the case of the derailleur system being implemented with the rear gearshift mechanism of the first type (RD), the adapter or adapter of the first type (108; 308; 408) is, in the installed state, screwed directly together with the bracket element (100; 300; 400), wherein the abutment surface of the adapter or of the adapter of the first type (108; 308; 408) is preferably flush with a surface of the bracket element (100; 300; 400) at a portion which is subjected to the clamping force which clamps the component group between the bracket portions.

14. Set of components according to any of proposals 3 to 11, characterized in that the stator assembly has an abutment element (4) or abutment end which, in the case of the derailleur system being implemented with the rear gearshift mechanism of the first type (RD), bears in the installed state against an abutment surface of the bracket element (200) and supports the acting clamping force directly or indirectly on said abutment surface and thus via the bracket element (200) on the associated one of the rear bracket portions, and/or which, in the case of the derailleur system being implemented with the gearshift mechanism of the second type (10), bears in the installed state against an abutment surface of the clamping portion (22*a*) or first arm (22*a*) and supports the acting clamping force directly or indirectly on said abutment surface and thus via the clamping portion or first arm on the associated one of the rear bracket portions.

15. Set of components according to any of proposals 1 to 14, characterized in that the clamping portion (22*a*) or first arm (22*a*) has, adjacent to or in the region of its opening or aperture, a guide and/or centring surface or guide and/or centring structure for the guidance and/or centring of the stator assembly in particular at its abutment element (4) or abutment end.

16. Set of components according to any of proposals 1 to 15, characterized in that the clamping portion (22*a*) or first arm (22*a*), on the one hand, and the bracket element (100; 200; 300; 400), on the other hand, have in each case at least approximately the same axial thickness at their portions which in the installed state are subjected to the clamping force which clamps the component group between the bracket portions.

17. Set of components according to any of proposals 1 to 15, characterized in that that portion of the clamping portion (22*a*) or first arm (22*a*) which in the installed state is subjected to the clamping force which clamps the component group between the bracket portions is axially thicker than that portion of the bracket element which in the installed state is subjected to the clamping force which clamps the component group between the bracket portions.

18. Set of components according to proposal 17, characterized by at least one spacer element which is assigned to or associated with the bracket element and which, in the case of the rear gearshift mechanism of the first type being installed on the bicycle frame, belongs to the component group which in the installed state is clamped between the bracket portions, and is subjected to the clamping force which clamps the component group between the bracket portions, wherein that portion of the bracket element which in the installed state is subjected to the clamping force which clamps the component group between the bracket portions has, together with the at least one spacer element, an axial thickness which is at least approximately equal to the axial thickness of that portion of the clamping portion (22*a*) or first arm (22*a*) which in the installed state is subjected to the clamping force which clamps the component group between the bracket portions.

19. Set of components according to any of proposals 1 to 18, characterized in that the bracket element (100; 200; 300; 400) is axially thicker at its portion which in the installed state is subjected to the clamping force which clamps the component group between the bracket portions than at its portion which has the installation opening, such that an abutment surface of said portion, which abutment surface surrounds the installation opening (130; 230) and on which abutment surface the first attachment end of the base element of the gearshift mechanism of the first type (RD) is seated in the installed state, is axially offset in relation to an abutment surface of the portion subjected to the clamping force, which abutment surface supports the clamping force in the installed state directly or indirectly on the associated one of the rear bracket portions, said offset being in the direction of the other of the rear bracket portions.

20. Set of components according to any of proposals 1 to 19, characterized in that the bracket element (100; 200; 300; 400), in an edge region, directly adjacent to the associated one of the rear bracket portions, of its portion which in the installed state is subjected to the clamping force which clamps the component group between the bracket portions, is designed with a collar (124; 224) which projects axially in the direction of the other of the rear bracket portions.

21. Set of components according to proposal 19 or according to proposals 19 and 20, characterized in that the bracket element (100; 200; 300; 400) is of multi-part design, having a lug-like metal part (102; 202; 302; 402) which is planar preferably on both sides, which metal part, in a first region, which in the installed state is subjected to the clamping force which clamps the component group between the bracket portions, has an opening or aperture (120; 220) assigned to the adapter or adapter of the first type (108; 208; 308; 408) and/or to the inner axle (7; 70; 80), and which metal part, in a second region, has the installation opening (130; 230), and having at least one plastics part (104; 204; 304; 404) which is combined or combinable with the metal part at its first region and which has a spacer region (105; 205), which spacer region is planar preferably on both sides and has an opening or aperture (122; 222) assigned to the adapter or adapter of the first type (108; 208; 308; 408) and/or to the inner axle (7; 70; 80) and which spacer region, in the installed state, lies on the first region of the metal part and is subjected to the clamping force which clamps the component group between the bracket portions.

22. Set of components according to proposal 20 and 21, characterized in that the plastics part (104; 204; 304; 404) has the axially projecting collar (123; 224) and, with a transition region 506 between the collar and the spacer region, overlaps an edge region of the metal part (102; 202; 302; 402) at least in portions.

23. Set of components according to proposal 21 or 22, characterized in that the adapter or adapter of the first type (108; 308; 408) is, in the installed state, screwed together with the lug-like metal part (102; 302; 402).

24. Set of components according to proposal 21 or 22, characterized in that the adapter or adapter of the first type (208) is, in the installed state, screwed together with the plastics part (204), which preferably has an axially projecting sleeve portion (260), which in the installed state is inserted into the frame opening (2b) of the associated rear bracket portion and has an internal thread (262) for screwing together with the adapter or adapter (208) of the first type.

25. Set of components according to any of proposals 19 to 24, characterized in that the bracket element is of multi-part design, having a/the lug-like metal part (102; 202) which is planar preferably on both sides, which metal part, in a/the first region which in the installed state is subjected to the clamping force which clamps the component group between the bracket portions, has an/the opening or aperture (120; 220) assigned to the adapter or adapter of the first type (108; 208) and/or to the inner axle (7; 70; 80), and which metal part, in a/the second region, has the installation opening (130; 230), and having at least one auxiliary part (142; 242) which is combined or combinable with the metal part at its first region or at a third region, adjacent to said first region, of the metal part, which auxiliary part serves for adaptation to an interface of the associated rear bracket portion and/or as a rotational abutment for the support of rotational forces on at least one associated abutment surface of the associated rear bracket portion, and is preferably formed as a plastics part.

26. Set of components according to proposal 25, characterized in that the auxiliary part (142; 242) has a holding portion (146; 246), which is inserted or insertable into a holding opening or holding aperture (146; 246) of the lug-like metal part, and at least one adaptation and/or abutment portion (148, 150; 248, 250), which is connected integrally to said holding portion.

27. Set of components according to proposal 25 or 26 and according to any of proposals 21 to 24, characterized in that the auxiliary part (142; 242) is a plastics part which is separate from the plastics part (104; 204) which has the spacer region (105; 205).

28. Set of components according to any of proposals 21 to 27, characterized by at least one lug-like metal part (102; 202; 302; 402) and a set of plastics parts (104; 204; 304; 404), which are alternatively combinable with the metal part and which have the spacer region and which are adapted to different use or installation situations, and/or a set of auxiliary parts (142; 242), which are alternatively combinable with the metal part and which are adapted to different use or installation situations.

29. Bracket element (100; 200; 300; 400) which is positionable on an axial inner side of an associated bracket portion of the rear bracket portions, which serve for holding an axle (7; 70; 80) of a rear-wheel axle arrangement (4, 5, 6, 7, 8) of a rear wheel, of a bicycle frame (1) for the purposes of installing a rear gearshift mechanism (RD) of a derailleur system on the bicycle frame, comprising a first portion, which has an opening or aperture (120, 122; 220, 222) assigned to the axle and which, in the installed state, with the cooperation of further components, is subjected to a clamping force which acts between the rear bracket portions, and comprising a second portion, which second portion has an installation opening (130; 230) which is radially offset in relation to the opening or aperture in the installed state with respect to the axis and to which an attachment end of a base element of the rear gearshift mechanism (RD) is fixable, characterized in that an abutment surface 504 of the second portion, which abutment surface 504 surrounds the installation opening (130; 230) and is provided for forming a support surface for the attachment end of the installed base element, is offset in relation to an abutment surface 502 of the first portion, which abutment surface 502 surrounds the opening or aperture (120, 122; 220, 222) and is on the same side of the bracket element, said offset being in the direction of the other side of the bracket element.

30. Bracket element according to proposal 29, characterized in that the other side of the bracket element (100; 200; 300; 400) is of planar design over a surface region which encompasses at least one surface portion of the first portion and at least one surface portion of the second portion, and/or in that the first region is axially thicker than the second region.

31. Bracket element according to proposal 29 or 30, characterized in that the bracket element (100; 200; 300; 400) is designed with an axially projecting collar (124; 224) in an edge region of the first portion on the other side.

32. Bracket element according to any of proposals 29 to 31, characterized in that the bracket element (100; 200; 300; 400) is of multi-part design, having a lug-like metal part (102; 202; 302; 402) which is planar preferably on both sides, which metal part, in a first region assigned to the first portion, has an opening or aperture (120; 220) assigned to the axle (7; 70; 80), and in a second region assigned to the second portion, has the installation opening (130; 230), and having at least one plastics part (104; 204; 304; 404), which plastics part is combined or combinable with the metal part at its first region and has a spacer region, which spacer region is assigned to the first portion and is planar preferably on both sides and has an opening or aperture (122; 222) assigned to the axle and which spacer region, in the installed state, lies on the first region of the metal part in order to form the first portion of the bracket element.

33. Bracket element according to proposal 32, characterized in that the plastics part (104; 204; 304; 404) has the axially projecting collar (124; 204) and, with a transition region between the collar and the spacer region, overlaps an edge region of the metal part (102; 202; 302; 402) at least in portions.

34. Bracket element according to proposal 32 or 33, characterized in that the lug-like metal part (103; 302; 402) has a thread arrangement for screwing together with a fastening element (108; 308; 408) for the purposes of fixing to the rear bracket portion of the frame.

35. Bracket element according to proposal 32 or 33, characterized in that the plastics part (204) has a thread arrangement (262) for screwing together with a fastening element (208) for the purposes of fixing to the rear bracket portion of the frame.

36. Bracket element according to proposal 35, characterized in that the plastics part (204) has an axially projecting sleeve portion (260) which is insertable into a frame opening (2b) of the associated rear bracket portion and which has an internal thread (262) for screwing together with the fastening element (208).

37. Bracket element according to any of proposals 29 to 36, characterized in that the bracket element (100;200) is of multi-part design, having a/the lug-like metal part (102; 203) which is planar preferably on both sides, which metal part, in a/the first region, has an/the opening or aperture (120; 220) assigned to the axle (7; 70; 80), and which metal part, in a/the second region, has the installation opening (130; 230), and having at least one auxiliary part (142; 242) which is combined or combinable with the metal part at its first region or at a third region, adjacent to said first region, of the metal part, which auxiliary part serves for adaptation to an interface of the associated rear bracket portion and/or as a rotational abutment for the support of rotational forces on at least one associated abutment surface of the associated rear bracket portion, and is preferably formed as a plastics part.

38. Bracket element according to proposal 37, characterized in that the auxiliary part (142; 242) has a holding portion (146; 246), which is inserted or insertable into a holding opening or holding aperture (146; 246) of the lug-like metal part, and at least one adaptation and/or abutment portion (148, 150; 248, 250), which is connected integrally to said holding portion.

39. Bracket element according to proposal 37 or 38 and according to any of proposals 32 to 36, characterized in that the auxiliary part (142; 242) is a plastics part which is separate from the plastics part (104; 204) which has the spacer region (105; 205).

40. Set of components, comprising at least one lug-like metal part (102; 202; 302; 402) and a set of plastics parts (104; 204; 304; 404) which are alternatively combinable with the metal part and which are adapted to different use or installation situations, wherein the combination of the lug-like metal part and any of the plastics parts yields in each case one bracket element (100; 200; 300; 400) according to any of proposals 32 to 36; and/or comprising at least one lug-like metal part (102; 202) and a set of auxiliary parts (142; 242) which are alternatively combinable with the metal part and which are adapted to different use or installation situations, wherein the combination of the lug-like metal part and any of the auxiliary parts yields in each case one bracket element (100; 200) according to proposal 37 or 38; and/or comprising at least one lug-like metal part (102; 202) and a set of plastics parts (104; 204) which are alternatively combinable with the metal part and a set of auxiliary parts (142; 242) which are alternatively combinable with the metal part and which are separate in relation to the plastics parts, wherein the plastics parts and the auxiliary parts are each adapted to different use or installation situations, and the combination of the lug-like metal part and one plastics part, assigned to the respective use or installation situation, of the plastics parts and one auxiliary part, assigned to the respective use or installation situation, of the auxiliary parts yields in each case one bracket element (100; 200) according to at least one of proposals 32 to 39.

41. Bicycle, which has a bicycle frame (1) having a left-hand rear bracket portion and a right-hand rear bracket portion for an axle (7; 70; 80) of a rear-wheel axle arrangement (4, 5, 6, 7, 8) of a rear wheel, which bracket portions have a predetermined defined axial spacing along a geometrical axis (A) of the axle installed on the frame by means of the bracket portions, and which bracket portions form in each case one counterbearing for a component group (4, 5, 8) which is arranged on the axle and which in the installed state is clamped between the bracket portions; wherein the bicycle is equipped with a derailleur system, the rear gearshift mechanism (RD) of which is installed on the frame non-coaxially in relation to the geometrical axis (A), wherein a base element of the rear gearshift mechanism has an attachment end which is installed on the bicycle frame, so as to be radially offset with respect to the geometrical axis, by means of a bracket element (100; 200; 300; 400) which is separate with respect to the frame and which is positioned on an axial inner side of an associated one of the rear bracket portions, characterized in that, as bracket element, a bracket element (100; 200; 300; 400) according to any of proposals 29 to 39 is installed, and/or in that the bicycle is or can be constructed using selected components including the bicycle frame (1), the bracket element (100; 200; 300; 400) and the rear gearshift mechanism of the first type (RD) of a set of components according to any of proposals 1 to 28.

42. Bicycle according to proposal 41, characterized by further features specified in proposals 1 to 28, which relate to the components of the proposed set of components and/or to the installed state in conjunction with the use of the rear gearshift mechanism of the first type (RD).

43. Bicycle, which has a bicycle frame (1) having a left-hand rear bracket portion and a right-hand rear bracket portion for an axle (7; 70; 80) of a rear-wheel axle arrangement (4, 5, 6, 7, 8) of a rear wheel, which bracket portions have a predetermined defined axial spacing along a geometrical axis (A) of the axle installed on the frame by means of the bracket portions, and which bracket portions form in each case one counterbearing for a component group (4, 5, 8) which is arranged on the axle and which in the installed state is clamped between the bracket portions; wherein the bicycle is equipped with a derailleur system (10), the rear gearshift mechanism of which is installed on the frame coaxially in relation to the geometrical axis (A), characterized in that the bicycle is or can be constructed using selected components including the bicycle frame (19) and the rear gearshift mechanism of the second type (10) of a set of components according to any of proposals 1 to 28.

44. Bicycle according to proposal 43, characterized by further features specified in proposals 1 to 28, which relate to the components of the proposed set of components and/or to the installed state in conjunction with the use of the rear gearshift mechanism of the second type (10).

45. Method for producing a bicycle, comprising: providing or stocking bicycle components which together comprise a set of components according to any of proposals 1 to 28; deciding whether the bicycle is to be provided with a derailleur system having a rear gearshift mechanism of the first type or with a derailleur system having a rear gearshift mechanism of the second type; constructing the bicycle, with installation of the rear gearshift mechanism of the first type (RD) of the set of components using the bracket element (100; 200; 300; 400) of the set of components, or with installation of the rear gearshift mechanism of the second type (10) of the set of components on the bicycle frame of the set of components, depending on the decision made.

While the present invention has been described above by reference to various embodiments, proposals, and/or examples, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A bracket element configured for installation on an axial inner side of an associated rear bracket portion of a bicycle frame for the purposes of installing a rear gearshift mechanism of a derailleur system on the bicycle frame, comprising:
 a first portion, which has an opening or aperture assigned to an axle and which, in an installed state, is subjected to a clamping force which acts between rear bracket portions, a second portion having an installation opening which is radially offset in relation to the opening or aperture in the installed state with respect to an axis and to which an attachment end of a base element of the rear gearshift mechanism is fixable,
 wherein the bracket element includes a first side and a second side, an abutment surface of the second portion on the second side, which the abutment surface of the second portion surrounds the installation opening and is provided for forming a support surface for the attachment end of the installed base element, is offset in relation to an abutment surface of the first portion on the second side, which the abutment surface of the first portion surrounds the opening or aperture on the second side of the bracket element, said offset being in a direction towards the first side of the bracket element, wherein the abutment surface of the first portion is configured to at least partially abut the bicycle frame.

2. The bracket element according to claim 1, wherein the first portion is subjected to the clamping force with the cooperation of further components.

3. The bracket element according to claim 1, wherein the first side of the bracket element is of planar design over a surface region which encompasses at least one surface portion of the first portion and at least one surface portion of the second portion, and/or in that a first region is axially thicker than a second region.

4. The bracket element according to claim 1, wherein the bracket element is designed with an axially projecting collar in an edge region of the first portion on the first side.

5. The bracket element according to claim 1, wherein the bracket element is of multi-part design.

6. The bracket element of claim 5, wherein one part of the multipart design is a metal part which is planar on both sides, the metal part making up a first part of both the first portion and the second portion.

7. The bracket element of claim 6, wherein the metal part, in a first region assigned to the first portion, includes the opening or aperture assigned to the axle, and in a second region assigned to the second portion, has the installation opening.

8. The bracket element of claim 6, wherein a second part of the multipart design is a plastic part, the plastic part making up a second part of the first portion.

9. The bracket element of claim 8, wherein the plastic part is combined, or combinable, with the metal part at a first region, the first region being a top region of the metal part.

10. The bracket element of claim 9, wherein the plastic part includes a spacer region, which the spacer region is assigned to the first portion.

11. The bracket element of claim 10, wherein the spacer region is planar on both sides.

12. The bracket element of claim 10, wherein the plastic part includes the opening or aperture assigned to the axle.

13. The bracket element of claim 12, wherein the spacer region of the plastic part, in the installed state, lies on the first region of the metal part in order to form the first portion of the bracket element.

14. The bracket element according to claim 8, characterized in that the plastic part has an axially projecting collar.

15. The bracket element according to claim 14, wherein the plastic part further includes a transition region between the axially projecting collar and a spacer region.

16. The bracket element according to claim 14, wherein the plastic part overlaps an edge region of the metal part.

17. The bracket element according to claim 8, wherein the lug like metal part has a thread arrangement for screwing together with a fastening element for the purposes of fixing to an associated rear bracket portion of the bicycle frame.

18. The bracket element according to claim 8, wherein the plastic part has a thread arrangement for screwing together with a fastening element for the purposes of fixing to an associated rear bracket portion of the bicycle frame.

19. The bracket element according to claim 8, wherein the plastic part has an axially projecting sleeve portion which is insertable into a frame opening of an associated rear bracket portion.

20. The bracket element according to claim 19, wherein the axially projecting sleeve portion includes an internal thread for screwing together with a fastening element.

* * * * *